United States Patent
Parkman et al.

(10) Patent No.: US 12,340,668 B1
(45) Date of Patent: Jun. 24, 2025

(54) SECURITY CAMERA DEVICE FOR VEHICLES

(71) Applicant: Amazon Technologies, Inc., Seattle, WA (US)

(72) Inventors: Jon-Christopher Parkman, San jose, CA (US); Todd Royce, Emerald Hills, CA (US); Venkatesh Viswanathan, Coppell, TX (US); Roman Moshin, Kyiv (UA)

(73) Assignee: Amazon Technologies, Inc., Seattle, WA (US)

( * ) Notice: Subject to any disclaimer, the term of this patent is extended or adjusted under 35 U.S.C. 154(b) by 11 days.

(21) Appl. No.: 17/955,281

(22) Filed: Sep. 28, 2022

(51) Int. Cl.
| | | |
|---|---|---|
| *G08B 13/196* | (2006.01) | |
| *G10L 15/08* | (2006.01) | |
| *H04N 23/51* | (2023.01) | |

(52) U.S. Cl.
CPC . *G08B 13/19619* (2013.01); *G08B 13/19608* (2013.01); *G08B 13/1963* (2013.01); *G08B 13/1966* (2013.01); *G10L 15/08* (2013.01); *H04N 23/51* (2023.01); *G10L 2015/088* (2013.01)

(58) Field of Classification Search
CPC ........ G08B 13/19619; G08B 13/19608; G08B 13/1963; G08B 13/1966; G10L 15/08; G10L 2015/088; H04N 23/51
See application file for complete search history.

(56) References Cited

U.S. PATENT DOCUMENTS

| | | | | |
|---|---|---|---|---|
| 6,239,736 | B1* | 5/2001 | McDonald | G01S 13/18 342/28 |
| 11,385,525 | B1* | 7/2022 | Wu | G03B 11/043 |
| 2014/0248045 | A1* | 9/2014 | Wada | G03B 17/561 396/534 |
| 2016/0105598 | A1* | 4/2016 | Zeira | H04N 23/51 348/143 |
| 2016/0165116 | A1* | 6/2016 | Robinson | H04N 23/73 348/362 |

(Continued)

FOREIGN PATENT DOCUMENTS

| | | | | |
|---|---|---|---|---|
| CN | 213693880 U | * | 7/2021 | ............ G03B 11/04 |
| CN | 214110422 U | * | 9/2021 | |

(Continued)

OTHER PUBLICATIONS

Clark, Mitchell, "We May Have our First Look at Ring's Car Cam," The Verge, Jun. 18, 2021, 3 pages.

*Primary Examiner* — Michael Lee
(74) *Attorney, Agent, or Firm* — Eversheds Sutherland (US) LLP

(57) ABSTRACT

A device includes a first housing and a second housing pivotably coupled to the first housing. The second housing has a first camera disposed on a first side of the first housing and a second camera disposed on a second side of the first housing. The first camera has a first field of view (FoV) that is adjustable via pivoting the second housing, and the second camera has a second FoV that is adjustable via pivoting the second housing. The second FoV is different than the first FoV. A privacy cover is coupled to the second housing and is configured to transition between a first position in which the first camera is unobstructed and a second position in which the first camera is obstructed.

33 Claims, 32 Drawing Sheets

(56) References Cited

U.S. PATENT DOCUMENTS

| | | | | |
|---|---|---|---|---|
| 2016/0196823 | A1* | 7/2016 | Yellambalase | G10L 15/22 348/148 |
| 2018/0191930 | A1* | 7/2018 | Jeong | H04N 23/51 |
| 2020/0020493 | A1* | 1/2020 | Weaver | G06F 1/1686 |
| 2020/0339042 | A1* | 10/2020 | Hodge | B60R 11/00 |
| 2021/0081003 | A1* | 3/2021 | Bristol | G06F 21/83 |
| 2022/0407996 | A1* | 12/2022 | Goh | H04N 23/55 |

FOREIGN PATENT DOCUMENTS

| | | | |
|---|---|---|---|
| CN | 214225990 U | * | 9/2021 |
| CN | 214376630 U | * | 10/2021 |
| CN | 214901048 U | * | 11/2021 |

* cited by examiner

SECURITY CAMERA DEVICE FOR VEHICLES

BACKGROUND

Vehicles may include cameras that capture a portion of an environment of the vehicle. For example, cameras may be exterior facing, so as to capture an environment outside of the vehicle. In some instances, the camera may be useful in capturing accidents involving the vehicle. However, an internally-facing camera may also be useful to capture crimes (e.g., break-ins) and to apprehend such offenders.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The systems depicted in the accompanying figures are not to scale and components within the figures may be depicted not to scale with each other.

DETAILED DESCRIPTION

Figure 1:
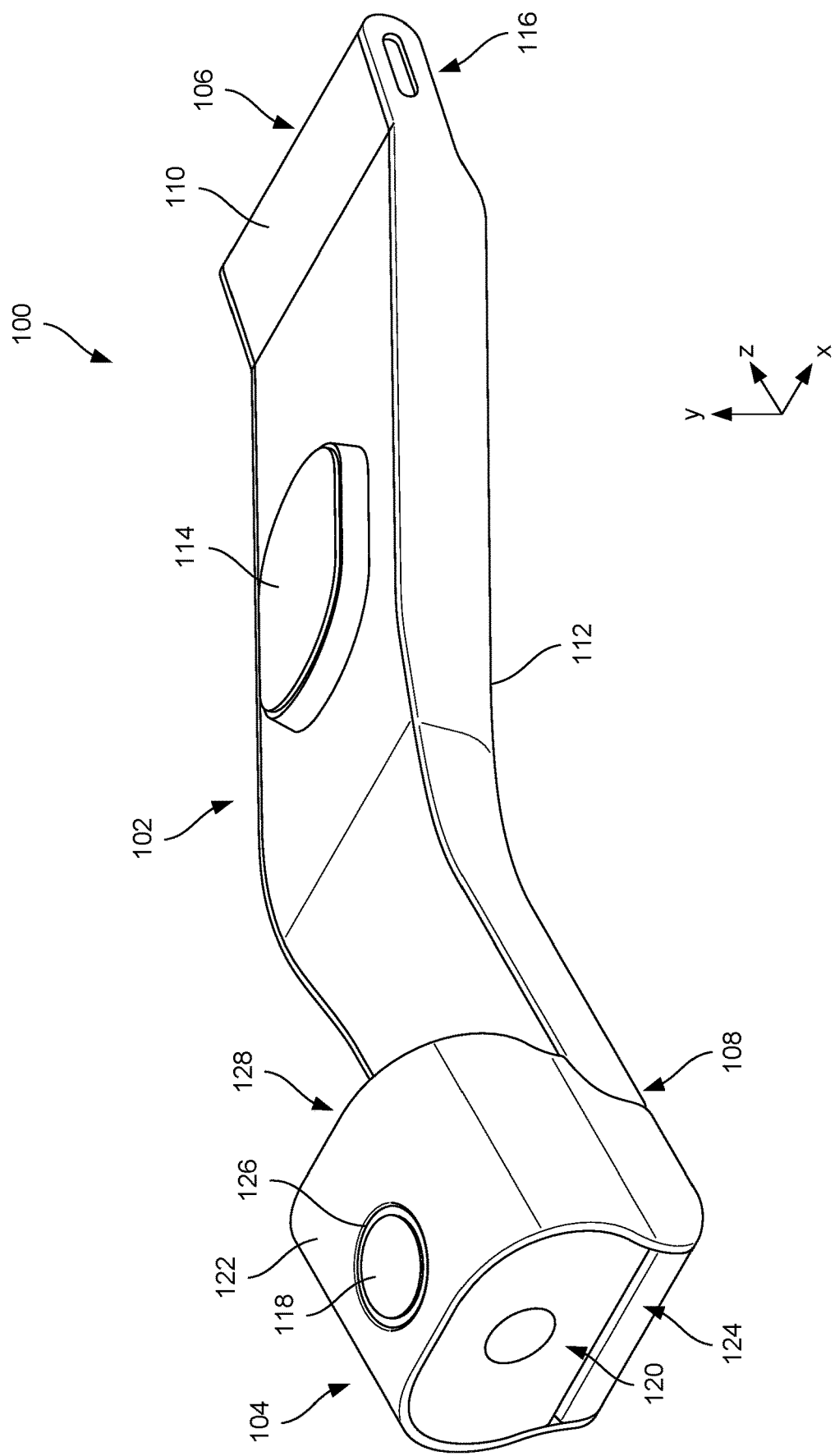
FIG. 1 illustrates a first perspective view of an example security camera device for vehicles, according to an example of the present disclosure.

This application is directed, at least in part, to a security camera device that may find use in a vehicle. In some instances, the security camera device may include a body and a head pivotably coupled to the body. The head may include multiple cameras for capturing image data and/or video data of an environment of the vehicle. For example, a first camera may be an interior-facing camera so as to capture an environment within the vehicle (e.g., cabin). Light emitting diode(s) LEDs may be disposed on the head for illuminating the environment within the vehicle, and for capturing discernable image data and/or video data. A second camera may be an exterior-facing camera so as to capture a portion of the environment exterior to the vehicle. In some instances, the second camera may be forward facing, relative to a direction of the vehicle, in order to capture an environment in front of the vehicle. Meanwhile, the body may couple to the vehicle to secure the security camera device within the vehicle. The security camera device therefore protects users (e.g., occupants, passengers, drivers, etc.) by recording video while the vehicle is driving and parked.

In some instances, the body may secure to portions of the vehicle, such as between a dashboard and a windshield of the vehicle, within the interior of the vehicle. For example, a foot of the body may wedge between the dashboard and the windshield of the vehicle. In some instances, additionally or alternatively, the body may be adhered to the windshield using tape, suction, putty, etc. For example, a top of the body may face or be oriented towards the windshield, while a bottom of the body may face or be oriented towards the dashboard. The top of the body may include an adhesive that secures to the windshield. In some instances, the body (such as the bottom) may abut and/or rest on the dashboard of the vehicle. The security camera device is also removable from the vehicle, for example, to make the security camera device transportable.

The body, in some instances, may include a shape and/or a contour that follows (e.g., mirrors) a curvature of the dashboard. The shape of the body may dispose the head of the security camera device away from the windshield and closer to the interior of the vehicle. The head couples to an end of the body, opposite the foot, for positioning the first camera and the second camera. By disposing the head away from the windshield, the first camera is able to capture image data and/or video data of the interior of the vehicle, while the second camera is able to capture image data and/or video data of the exterior of the vehicle. In this sense, the body spaces the first camera closer to the interior of the camera (e.g., outward from the windshield and/or dashboard). In some instances, spacing the second camera away from the windshield may reduce a glare perceived by the second camera.

The pivotable coupling of the head and the body adjusts a field of view (FoV), orientation, directionality, and so forth of the first camera and the second camera. In some instances, pivoting the head adjusts both the FoV of the first camera and the second camera. In some instances, the pivotable nature of the head may accommodate different environments or configurations of vehicles. For example, on a larger or higher dashboard, the head may be tilted downward to capture the interior of the vehicle. The first camera and the second camera may be any type of suitable camera, such as a red, green, blue, depth (RGBD) camera(s) and/or three-dimensional (3D) camera.

The head may include various LEDs for illuminating an environment of the security camera device. For example, flood LEDs (e.g., visible light) and/or infrared (IR) LEDs may be disposed around or proximate to the first camera (e.g., interior facing camera). The flood LEDs and/or IR LEDs may be oriented towards the interior of the vehicle. Any number of flood LEDs and/or IR LEDs may be included (e.g., two, four, six, etc.). The head may also include one or more button(s) for controlling an operation of the security camera device (e.g., power on, power off, record, mute, etc.). In some instances, a LED encircles the one or more buttons and at least partially indicates an operation of the security camera device (e.g., recording, outputting audio, outputting sound, configuring, etc.). Additionally, one or more LEDs may indicate when the first camera, the second camera, or other components of the security camera device (e.g., microphone) are recording and capturing data. In some instances, the LEDs are disposed beneath a translucent cover on the head to provide the security camera device with an aesthetic appearance. In such instances, the LEDs are configured to output light through the cover.

The head may additionally or alternatively include a microwave proximity sensor (MPS) may be disposed around the first camera, and oriented towards the interior of the vehicle. For example, the MPS may at least partially encircle the first camera. The MPS may detect moving objects within the interior of the vehicle via sensing presence. In some instances, the first camera may capture (or begin capturing) image data and/or video data in response to motion being detected within the interior. For example, upon detecting motion, the first camera may be triggered to begin capturing image data and/or video data within the vehicle.

In some instances, the MPS may include a transmitter configured to transmit a signal (e.g. generate an electromagnetic wave) in the microwave frequency range (and corresponding microwave wavelength range). The MPS includes a receiver configured to receive a reflected signal (electromagnetic wave). The MPS is configured to analyze received reflected signals and determine based thereon whether the reflected signal includes frequency shifts that indicate motion (i.e. based on the Doppler effect).

In some instances, the MPS is configured to operate in the 5.8 GHz frequency spectrum. In some instances, a MPS comprises an antenna that corresponds with the desired transmitter/receiver signal frequency, and an RF Mixer that serves to be a non-linear device which produces sum and difference frequencies of original frequencies injected, e.g. RF and LO inputs. A microwave proximity sensor may comprise a local oscillator (LO), which may be a Colpitts oscillator, or may utilize an external modulation with high frequency coupling. A MPS may comprise a low pass front end that filters out high frequency radio frequency (RF) content, outside the intermediate frequency (IF), to prevent saturation and improve signal to noise ratio (SNR) of the gain stage. In some instances, the MPS may comprise a high gain intermediate frequency amplifier providing dual-stage amplification to convert a microvolt IF signal generated by the RF mixer into a signal with sufficient FSR to maximize measurement precision given some analog to digital converter (ADC) resolution.

In some instances, a MPS or another radar unit may additionally be configured to determine a range and angle to detected objects, e.g., using frequency modulated continuous wave radar. An example MPS may include an RTC60XX series unit available from Richwave Technology, such as an RTC6012.

In some instances, the camera security device includes a passive infrared sensor (PIR) or other motion detector. The PIR sensor may include, for example, two pyroelectric sensing elements. Each pyroelectric sensing element comprises a pyroelectric crystal. Each pyroelectric sensing element generates an electrical charge in response to heat.

Radiation (e.g. infrared light) received at a surface of a pyroelectric sensing element generates heat, which in turn generates an electrical charge. Put another way, an absorbing layer of a pyroelectric sensing element transforms radiation flux change into a change in temperature and a pyroelectric component performs a thermal to electrical conversion. One or more low-noise and low leakage current field-effect transistors (e.g. JFET) or operational amplifiers are used to convert charge into a signal voltage.

The PIR sensor may include pyroelectric sensing elements electrically coupled together with opposite polarization to produce an output. In this way, an equal change in temperature at both of the pyroelectric sensing elements will cancel out in the output signal, thus filtering out temperature changes in the environment. However, a change in temperature at only one of the pyroelectric sensing elements will result in an output signal that is positive or negative (depending on which pyroelectric sensing element experienced the change, or greater change, in temperature).

In some instances, the PIR sensor may include two slots, each providing an optical path to one of the pyroelectric sensing elements. The PIR sensor may have one or more lenses configured to direct light received at the one or more lenses onto one of the pyroelectric sensing elements. The PIR sensor may include one or more lenses configured to direct light received at a first portion of the one or more lenses (e.g. a left portion) onto a first of the pyroelectric sensing elements (e.g. a left sensing element), and to direct light received at a second portion of the one or more lenses (e.g. a right portion) onto a second of the pyroelectric sensing elements (e.g. a right sensing element). The one or more lenses may comprise one or more Fresnel lenses having one or more features configured to direct light. The pyroelectric elements may be positioned side by side and aligned along an axis (e.g. a horizontal axis or a vertical axis).

In some instances, the PIR sensor may be analog, with an analog signal output, or may be digital, with digital data output generated utilizing an analog-to-digital converter (ADC). The security camera device may include one or more PIR sensors that the security camera device uses to detect objects. In some instances, each PIR sensor may output a signal or sensor data, where the security camera device uses a characteristic determined using the signal or sensor data to determine whether the PIR sensor detected an object. The characteristic may include a voltage represented by the signal or sensor data, an amplitude of a wave generated or determined using the signal or sensor data, an angle of the wave generated using the signal or sensor data, and/or the like.

For example, a first PIR sensor may have a first field-of-view (FOV) that extends a first distance from the electronic device. In some examples, the first FOV is created based on placing the first PIR sensor in a first direction and/or using one or more lenses (which may be a lens of the PIR sensor or which may be used in addition to or in replacement of a lens of the PIR sensor).

The security camera device may include one or more lenses configured to direct light received at various first portions of the one or more lenses onto the PIR sensor(s). The one or more lenses may comprise one or more Fresnel lenses having one or more features configured to direct light.

A PIR sensor or other motion detector sensor may be positioned in the security camera device to face exterior to a vehicle (e.g., having a field of view through a windshield) or interior to a vehicle (e.g., having a field of view of the interior of the vehicle). In some instances, if motion is detected in an environment monitored by a motion sensor, such as a PIR sensor, this may affect initiation of recording or sending of a notification or message.

In some instances, the security device includes a privacy cover (e.g., cover) movable between a retracted position (e.g., unengaged state) and an extended position (e.g., engaged state) for obscuring the first camera. For example, in the retracted position, the first camera may be unobscured by the privacy cover and permitted to capture image data and/or video data of the interior of the vehicle. In the extended state, the first camera may be obscured by the privacy cover and restricted from capturing image data and/or video data of the interior of the vehicle. The privacy cover may toggle between the retracted position and the extended position to provide a snap-like response. In some instances, such response is provided by a spring (e.g., coil spring) that transitions the privacy cover between the retracted position and the extended position. Additionally, the spring may keep the privacy cover in the retracted position and the extended position, respectively, until a certain amount of rotation is provided to knock the privacy cover over center and into the retracted position or the extended position, respectively.

In some instances, the privacy cover may include a magnetic element that interacts with a hall effect sensor disposed in the head. When the hall effect sensor senses a magnetic field of the magnetic element, such as when the privacy cover moves into the extended position, the first camera may be deactivated. In this sense, the hall effect sensor may act as a switch to control an operation of the first camera. The user may toggle the privacy cover between the retracted position and the extended position to power on and power off the first camera.

The security camera device includes one or more loudspeaker(s) (e.g., tweeter, mid-range, subwoofer, etc.) for outputting sound to users. In some instances, the sound may be associated with alerting the users, eliciting user feedback, issuing alarms, and so forth. The security device may also include one or more microphone(s) for capturing audio. In some instances, the one or more loudspeaker(s) are disposed within the body of the security camera device, while the one or more microphone(s) are disposed within the head of the security camera device. In some instances, the one or more loudspeaker(s) may be oriented towards the dashboard. In some instances, the one or more microphone(s) may be oriented towards the interior of the vehicle. Additionally, in some instances, activation of the privacy cover may also control an operation of the one or more microphones. For example, the hall effect sensor may be used to disable the one or more microphones capturing audio.

The security camera device may communicatively couple to one or more devices, such as a mobile device of the user, a remote system (e.g., cloud), and so forth. In some instances, such connections may be wireless and/or wired. The security camera may include various network interfaces, such as Wi-Fi, Bluetooth, LTE, Cellular, and so forth to permit connections with the mobile device and systems. For example, upon detection of an event (e.g., motion), a video of the event may be wirelessly sent to a mobile device of the users. Additionally, or alternatively, the video of the event may be sent to, and saved by, the remote system. Setting(s) of the security camera device may also be controlled via the mobile device and/or the remote system. The mobile device may also allow the users to engage with the security camera device and have a live view of the first camera and/or the second camera.

In some instances, the security camera device may include an on-board diagnostics (OBD) port and connection with the vehicle. The OBD port and connection may provide power to the security camera device, and/or transfer vehicle information to the security camera device. Such information, in some instances, may be usable by the security camera device for at least partially controlling an operation thereof based on an operational state of the vehicle (e.g., when to record, when to output sound, when to capture audio, etc.). As an example, knowing an acceleration or deacceleration of the vehicle may be used to capture image data and/or video data by the first camera and/or the second camera. In some instances, the security camera device may include a wired or wireless connection with the OBD port of the vehicle. An LED may be included to indicate when the security camera device is communicatively coupled to the vehicle via the OBD port.

As introduced above, in some instances, the first camera, the second camera, and/or the one or more microphones may be configured to generate data in response to certain events. For example, the first camera and/or the second camera may record image data and/or video data based on an acceleration and/or deacceleration of the vehicle. Here, the security camera device may include board accelerometer(s) and/or gyroscopes to detect such movement. In some instances, the security camera device may include an accelerometer, and based on a sensed acceleration/deacceleration, the first camera and/or the second camera may record image data and/or video data. Such deacceleration, for example, may be in response to a collision involving the vehicle and accordingly, the first camera and/or the second camera may record image data and/or video data. In some instances, the first camera may record during non-movement of the vehicle (e.g., when the vehicle is parked) while the second camera may record during movement of the vehicle. For example, the first camera may be used as a security measure to capture potential crimes while the vehicle is unoccupied. The second camera may record accidents, or a scene of the environment, external to the vehicle. The one or more microphones, meanwhile, may capture audio based on detecting certain sounds (e.g., sound indicative of a crash, break-in, etc.). In some instances, the audio may be captured based on the sounds exceeding a predetermined threshold sound (e.g., glass breaking). In some instances, the one or more microphones may capture audio data in response to commands or certain keywords issued by the user (e.g., "awake," "turn on," etc.). Still, in some instances, the first camera, the second camera, and/or the one or more microphones may be configured to generate data based on the information received via the OBD port and connection.

As noted above, the first camera may capture image data and/or video data when the vehicle is not in use (e.g., parked). In some instances, the security camera device may include a battery, a supercapacitor, or the like for storing energy that is used by the security camera device when the vehicle is not in use. Such battery or supercapacitor may be charged and/or store energy while the vehicle is in use via power received from the OBD port and connection. In some instances, the battery or the supercapacitor may provide power to the securing camera device for up to a week between charges.

The security camera device may include one or more flexible connections between the body and the head. For example, given that certain computing components are disposed in the body, and certain computing components are disposed in the head, the flexible connections may communicatively couple the respective computing components. In some instances, one or more flexible printed circuit assemblies (FPCAs) and/or one or more flex circuits may be used to transfer data (e.g., image data and/or video data, data indicative of a press of the one or more button(s), etc.) and/or power between the components disposed within the body and the head. In some instances, the FPCAs and/or the flex circuits may route through the pivotably connection (e.g., hinge) between the body and the head.

The body and the head may include housings that accommodate the components of the body and the head, respectively. The housings compactly secure the components within the head and the body and provide an aesthetic appearance of the security camera device. In some instances, the housings of the head and the body may include portions, pieces, and the like that couple (e.g., snap, fasten, adhere, etc.) together. In some instances, the housings are manufactured from non-reflective materials to increase a quality of image data and/or video capture by the first camera and/or the second camera. The housings of the head and the body also include various mounting ports, posts, pins, tabs, and so forth for receiving the components respectively disposed therewithin.

In some instances, one or more heat dissipating elements are also disposed in the body and/or the head for dispersing heat generated by components within the body (e.g., printed circuit board(s)) and/or the head (e.g., camera(s)). Additionally, foam or other padding may be disposed within the body and/or the head, between components, to reduce vibrations of the vehicle negatively affecting an operation thereof. Although certain components are described, the security camera device may include additional or alternative components disposed throughout the body and/or the head. For example, a location sensor may also generate data indicative of a location of the security camera device.

As such, the security camera device may protect users of the vehicle, as well as bystanders, by recording image data and/or video while the vehicle is in operation (e.g., driving) as well as while the vehicle is not being operated (e.g., parked). Such image data and/or video data may be used to record accidents, break ins, and other related events. Such image data and/or video data may be useful for liability, apprehending offenders, deterring potential criminal activity, as well as providing a sense of comfort to users.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIG. 1 illustrates an example security camera device 100, such as a top and/or front of the security camera device 100, according to examples of the present disclosure. The security camera device 100 may include a body 102 and a head 104 pivotably coupled to the body 102. The body 102 may include a first end 106 and a second end 108. In some instances, the first end 106 may represent a toe of the body 102 that wedges between a dashboard and a windshield of a vehicle in which the security camera device 100 resides. The second end 108 may represent a neck that pivotably couples to (e.g., receives) the head 104. As such, when the first end 106 of the body 102 wedges into a space between the dashboard and the windshield, the head 104 may be disposed away from the windshield of the vehicle. The body 102 therefore serves to extend the head 104 into the interior (e.g., cabin) of the vehicle.

The body 102 is shown generally including an elongated shape having a top 110 and a bottom 112. The top 110 is oriented towards the windshield and the bottom 112 is oriented towards the dashboard when the security camera device 100 resides within the vehicle. When wedged in the vehicle, the top 110 may contact the windshield while the bottom may contact the dashboard. In some instances, the top 110 includes an adhesive 114 (e.g., a very high bond (VHB) adhesive) for securing the security camera device 100 to the windshield. However, the security camera device 100 is configured to be removably coupled from the vehicle, such that the security camera device 100 may be removed from the vehicle (e.g., for cleaning, repair, transferred between vehicles, etc.). As shown, the adhesive 114 may be ovular shaped, however, other shapes may be envisioned. Additionally, or alternatively, although a since piece of the adhesive 114 is shown, the body 102 may include multiple pieces of adhesive. The adhesive 114 may also reside within a basin that extends from the top 110 of the body 102.

The body 102 is further shown including a port 116. The port 116 may receive a cable that communicatively couples to an OBD of the vehicle. For example, a cable may route from a OBD port of the vehicle (e.g., below a steering wheel) to the port 116. The port 116 may be disposed proximate to the first end 106, on a side of the body 102 (e.g., right hand side). In some instances, power is supplied to the security camera device 100 via the cable, as well as information associated with the vehicle (e.g., speed, acceleration, which users are wearing seatbelts, security system, etc.). However, although discussed as including a wired connection between the security camera device 100 and the vehicle, the security camera device 100 may additionally or alternatively include a wireless connection with the vehicle. In some instances, the port 116 may be a USB port (e.g., A, C, etc.), an auxiliary port, an HDMI port, and so forth.

The head 104 includes a button 118 and a first camera 120. The button 118 may be located on a top 122 of the head 104, while the first camera 120 (or a lens of the first camera 120) may be located on a front 124 of the head 104, opposite a back 128 of the head 104. When the security camera device 100 is disposed in the vehicle, the front 124 is oriented towards an interior (e.g., cabin) of the vehicle in order to capture image data and/or video data of the interior of the vehicle, while the button 118 may be oriented towards a ceiling and/or the windshield of the vehicle. As such, in some instances, the first camera 120 may be considered an interior-facing camera.

The button 118 may at least partially control an operation of the security camera device 100. For example, pressing the button 118 may cause the first camera 120 to capture image data and/or video data. The button 118 may also be used to mute the security camera device 100, control a set-up of the security camera device 100, and so forth. In some instances, the button 118 (or an actuation direction of the button 118), may be oriented substantially perpendicular to the first camera 120.

The head 104 pivotably couples to the second end 108 of the body 102. The head 104 may be configured to rotate about one or more axes (e.g., about the x-axis). In some instances, the coupling between the head 104 and the body 102 represents a hinged connection, however, a ball joint or other type connections may pivotably couple the head 104 and the body 102. The pivotable nature of the head 104 may adjust a FoV, orientation, and so forth of the first camera 120.

In some instances, a light ring 126 may encircle the button 118 and illuminate according to an operational state of the security camera device 100. The light ring 126, which may represent a light indicator, may provide visual feedback regarding a task or operation being performed by the security camera device 100. The light ring 126 may be illuminated by one or more light sources, such as light emitting diodes (LEDs), residing within the head 104 of the security camera device 100. In some instances, a light diffuser may be interposed between the light sources and the light ring 126 to reduce "hot spots" and/or assist in diffusing light from the light sources to increase internal reflection within the light ring. In some instances, the light ring 126 may take a wide range of visual appearances by varying which light sources are on/off, the respective colors of the light sources, and the timing of activating the light sources.

While a single button is shown, the security camera device 100 may include additional buttons, and/or the button 118 may perform operations other than those described. For example, button(s) may correspond to a power button, a wireless connectivity button, a mute button, volume buttons, sync buttons, or any other type of button or control. The button(s) may also be located on sides of the head 104 other than the top 122. In some instances, the buttons may be mechanical (e.g., having physically movable components) and/or electronic (e.g., capacitive sensors, optical sensors, touch screen, or the like). In some instances, the button 118 may be located closer to the front 124 of the head 104 than the back 128 of the head 104 (e.g., spaced apart in the z-direction).

In some instances, the security camera device 100 may be configured to support speech interactions with one or more users and respond to user requests. For instance, a user may verbally request the security camera device 100 to perform a particular task, such as to capture image data and/or video data via the first camera 120 (or other camera(s) of the security camera device 100). One or more microphones of the security camera device 100 may capture sound associated with the user speech. In some examples, the user may indicate a request by prefacing the request with a predefined keyword, such as a wake word or trigger expression. The security camera device 100 may capture user speech and may process the user speech to identify a command. Speech processing, such as automatic speech recognition (ASR), natural language understanding (NLU), and speech synthesis may also be performed. However, in some instances, one or more remotely coupled computing devices may perform the speech processing and transmit a response or data associated within the user interaction. Upon identifying the command, the security camera device 100 may output a response, cause actions to be performed, or elicit feedback from the user. To accomplish the functions of the security camera device 100, one or more printed circuit boards (PCBs), processors, memory, circuits, transformers, power supplies, network interfaces (e.g., Wi-Fi, Bluetooth, ZigBee, LTE, Bluetooth Low Energy (BLE), thermal pads, loudspeakers, antennas, and so forth may mount to or within the security camera device 100. Such components may be disposed in the head 104 and/or the body 102, and may be communicatively coupled to one another via one or more circuits (e.g., flex circuits) or connections.

Figure 2:
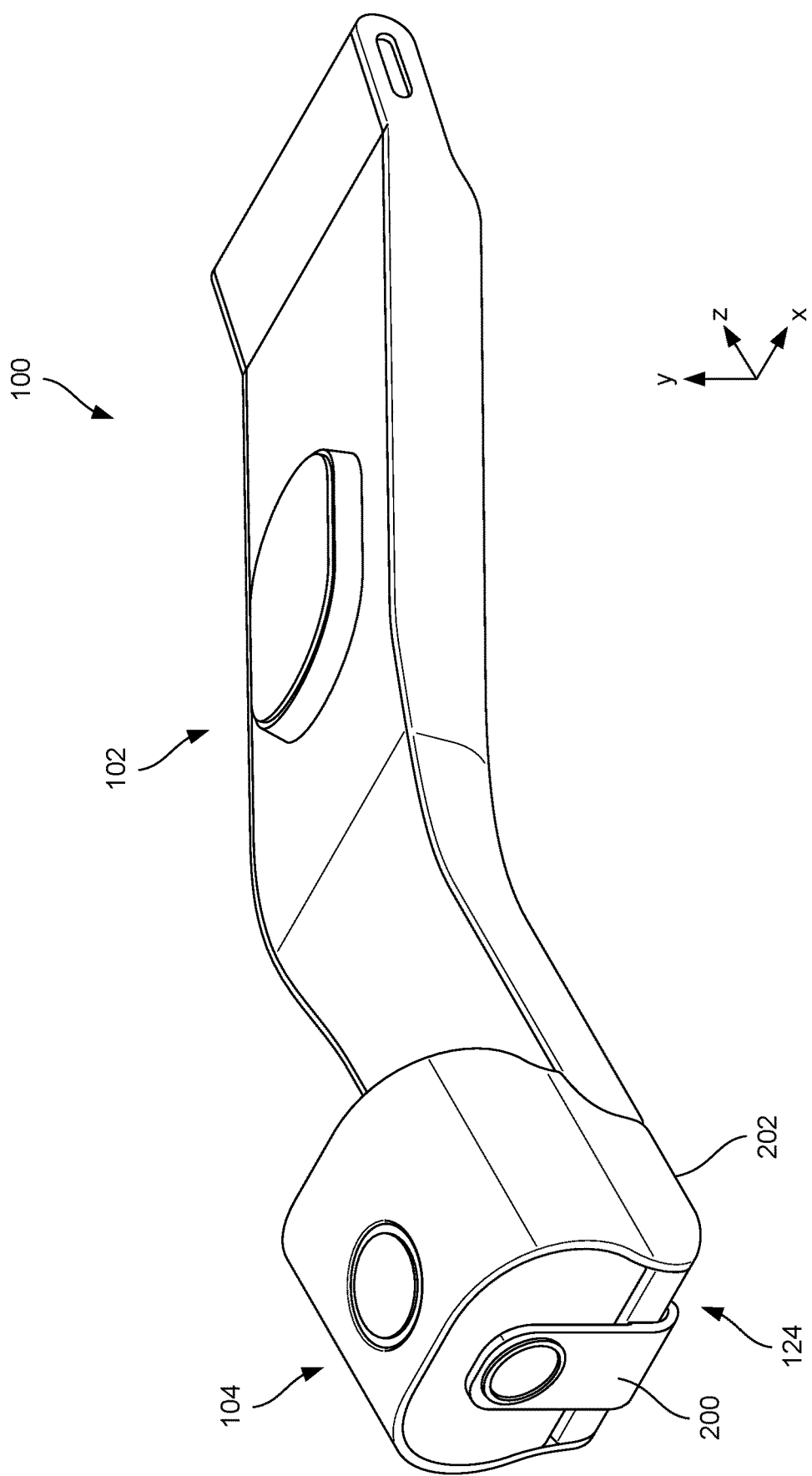
FIG. 2 illustrates a second perspective view of the security camera device of FIG. 1, showing an example privacy cover obscuring one or more camera(s) of the security camera device, according to an example of the present disclosure.

FIG. 2 illustrates the security camera device 100, showing a privacy cover 200 being disposed over the first camera 120, according to examples of the present disclosure. That is, compared to FIG. 1 in which the privacy cover 200 may be in a retracted position, the privacy cover 200 may be extended (as shown in FIG. 2) to occlude the first camera 120. In some instances, the privacy cover 200 rotates from a position adjacent to a bottom 202 of the head 104 (e.g., about the x-axis).

The privacy cover 200 occludes the first camera 120 and restricts the first camera 120 capturing image data and/or video data of the interior of the vehicle. In some instances, when disposed over the first camera 120, the privacy cover 200 also causes a switch (e.g., hall effect sensor) to deactivate (e.g., turn off) the first camera 120. For example, a magnetic element may be disposed in the privacy cover 200, and based on the hall effect sensor detecting the magnetic field, the first camera 120 may be deactivated. The hall effector sensor may be disposed on the front 124 of the head 104. Such switch may additionally or alternatively deactivate microphones of the security camera device 100. From the position shown in FIG. 2, the privacy cover 200 may be rotated downward towards a bottom 202 of the head 104 (e.g., about the x-axis) to a retracted position.

In some instances, the privacy cover 200 may be a piece of rigid plastic, composite, or metal. Additionally, foam or other padding of the privacy cover (e.g., gasket, O-ring, etc.) may engage with a lens of the first camera 120 to substantially seal around the first camera 120 and/or prevent scratching to the lens.

Figure 3:
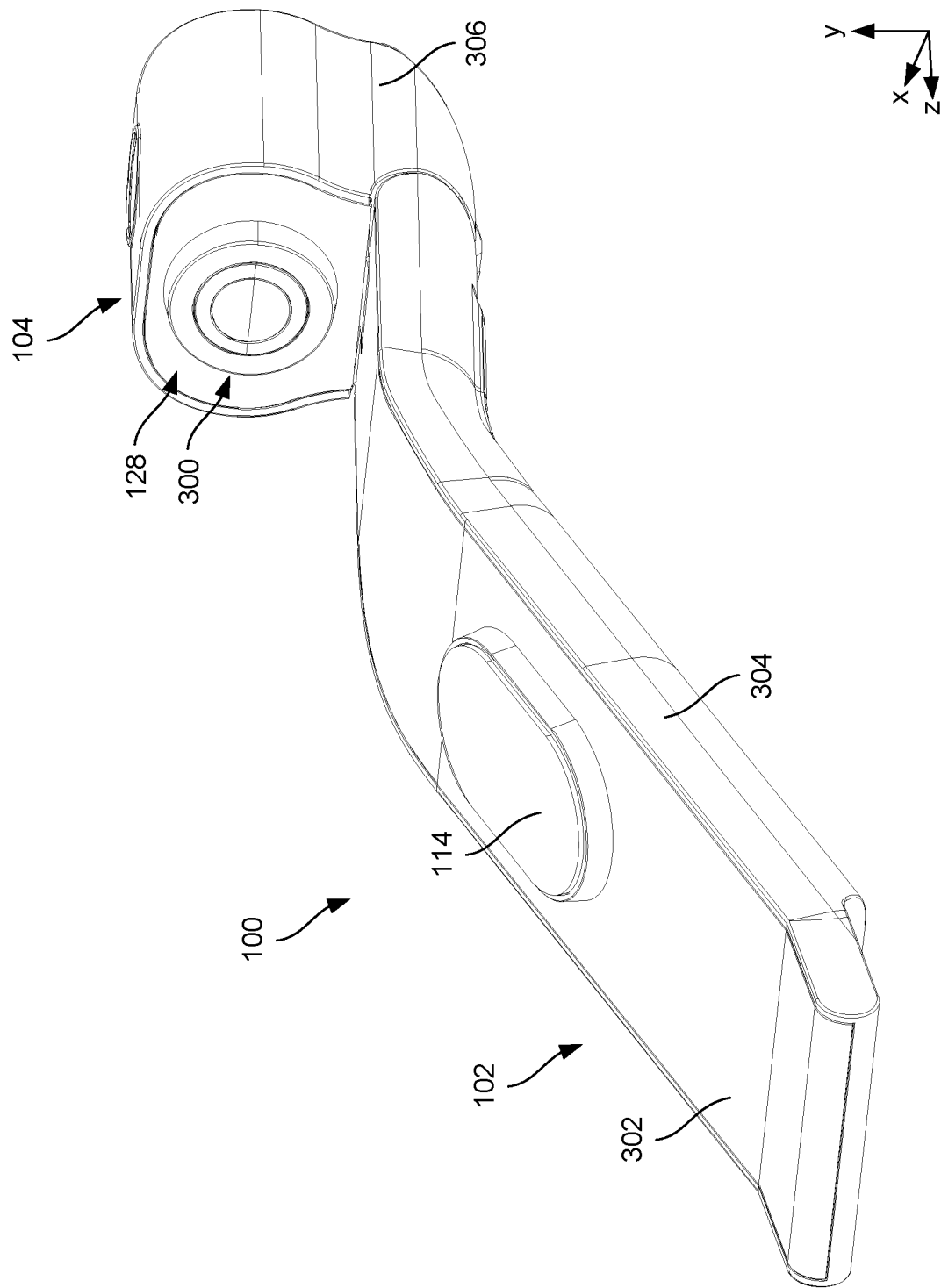
FIG. 3 illustrates a third perspective view of the security camera device of FIG. 1, according to an example of the present disclosure.

FIG. 3 illustrates the security camera device 100, such as a top and/or back of the security camera device 100, according to examples of the present disclosure. As introduced above, the security camera device 100 includes the head 104 pivotably coupled to the body 102. The adhesive 114 is shown for securing the security camera device 100 to the windshield of the vehicle.

The head 104 has the back 128, opposite the front 124, that includes a second camera 300 (or a lens of the second camera 300). The second camera 300 may represent an exterior facing camera that captures an environment of the vehicle. For example, the second camera 300 may be forward facing, relative to a direction of travel of the vehicle, to capture an environment in front of the vehicle. The pivotable nature of the head 104 may adjust a FoV, orientation, and so forth of the second camera 300 (in addition to the first camera 120). The second camera 300 is configured to capture image data and/or video data through the windshield of the vehicle. In some instances, the second camera 300 represents a red, green, blue, depth (RGBD) camera(s) and/or three-dimensional (3D) camera.

In some instances, the body 102 is formed via coupling a first housing 302 and a second housing together. Components may reside within the first housing 302 and the second housing 304 (e.g., an interior cavity formed therefrom). In some instances, the first housing 302 forms the top 110 of the body 102, while the second housing 304 may form the bottom 112 and/or the sides the body 102. Likewise, in some instances, the head 104 may include a housing 306. The housing 306 of the head 104 may be disposed over the top 122, and/or along sides of the head 104.

Figure 4:
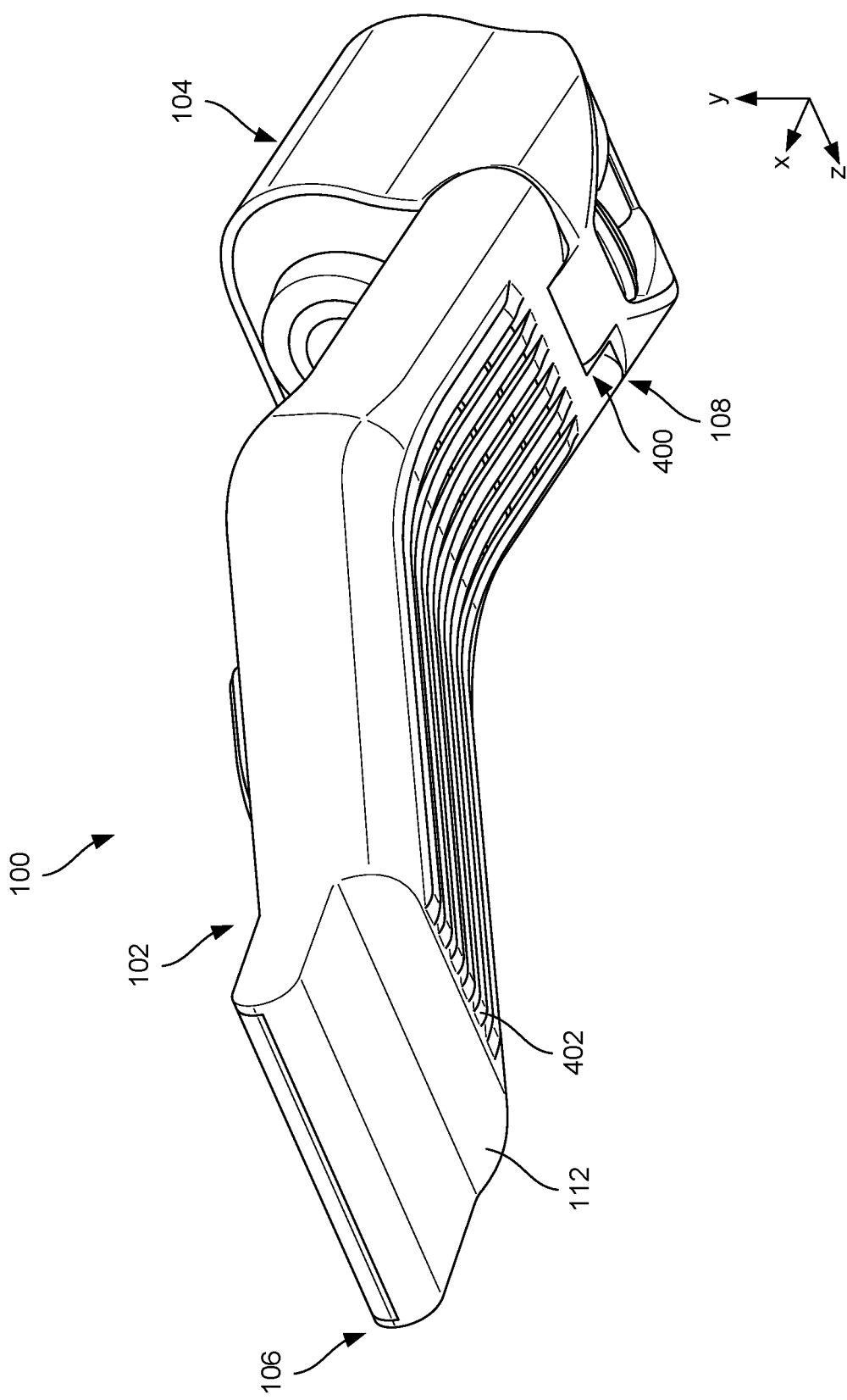
FIG. 4 illustrates a fourth perspective view of the security camera device of FIG. 1, according to an example of the present disclosure.

FIG. 4 illustrates the security camera device 100, such as a bottom and/or back of the security camera device 100, according to examples of the present disclosure. As introduced above, the security camera device 100 includes the head 104 pivotably coupled to the body 102. For example, a hinged connection 400 may be formed between the head 104 and the body 102. The body 102 and the head 104 may include one or more knuckles for forming the hinged connection 400. For example, as shown, a single knuckle of the head 104 may be received by two knuckles of the body 102.

The bottom 112 of the body 102 is shown including grooves 402. The grooves 402 are formed within an exterior surface of the body 102 and are complimentary with heat dissipating elements within the body 102. In some instances, the grooves 402 are formed within the second housing 304 of the body 102. Fins of the heat dissipating elements (within the body) may be received within the grooves 402 for transferring heat away from the security camera device 100. As shown, the grooves 402 may extend in a lengthwise direction between the first end 106 and the second end 108 of the body 102. Adjacent grooves may be spaced apart from one another, between sides of the body 102. For example, body 102 may include six grooves that extend from proximate the first end 106 to proximate the second end 108. The grooves 402 may also follow a curvature of the bottom 112 of the body 102.

Figure 5:
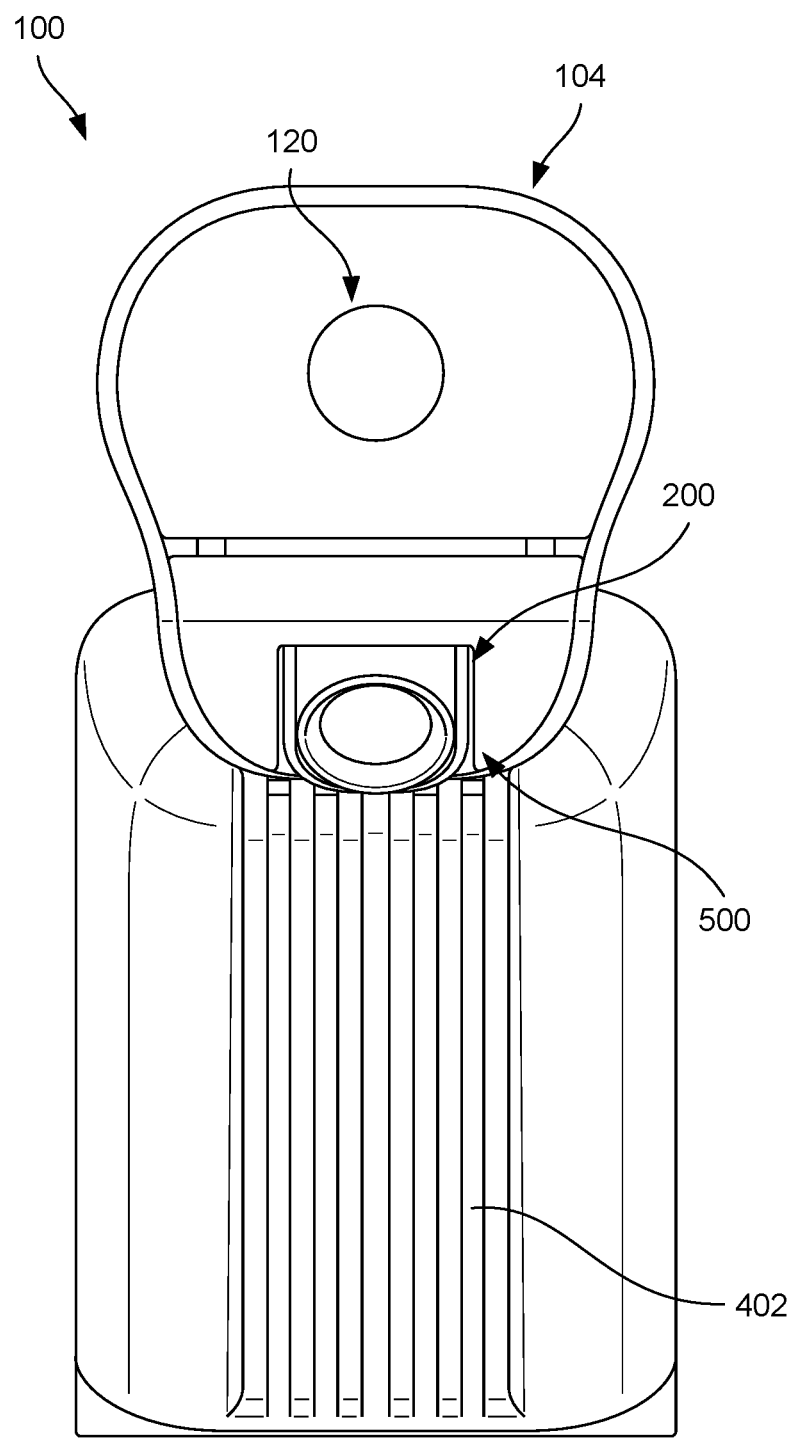
FIG. 5 illustrates a first end view of the security camera device of FIG. 1, according to an example of the present disclosure.

FIG. 5 illustrates a front view of the security camera device 100, according to examples of the present disclosure. The head 104 is shown including the first camera 120 and the privacy cover 200. The privacy cover 200 is shown in a retracted state so as to not occlude the first camera 120. As explained herein, the head 104 may include a receptacle 500 into which the privacy cover 200 retracts when not obscuring the first camera 120. The privacy cover 200 may be aligned (e.g., x-direction) with the first camera 120 such that upon rotation of the privacy cover 200, the first camera 120 is occluded. The receptacle 500 may reside on the bottom 202 of the head 104. The grooves 402 are further shown extending along the bottom 112 of the body 102.

Figure 6:
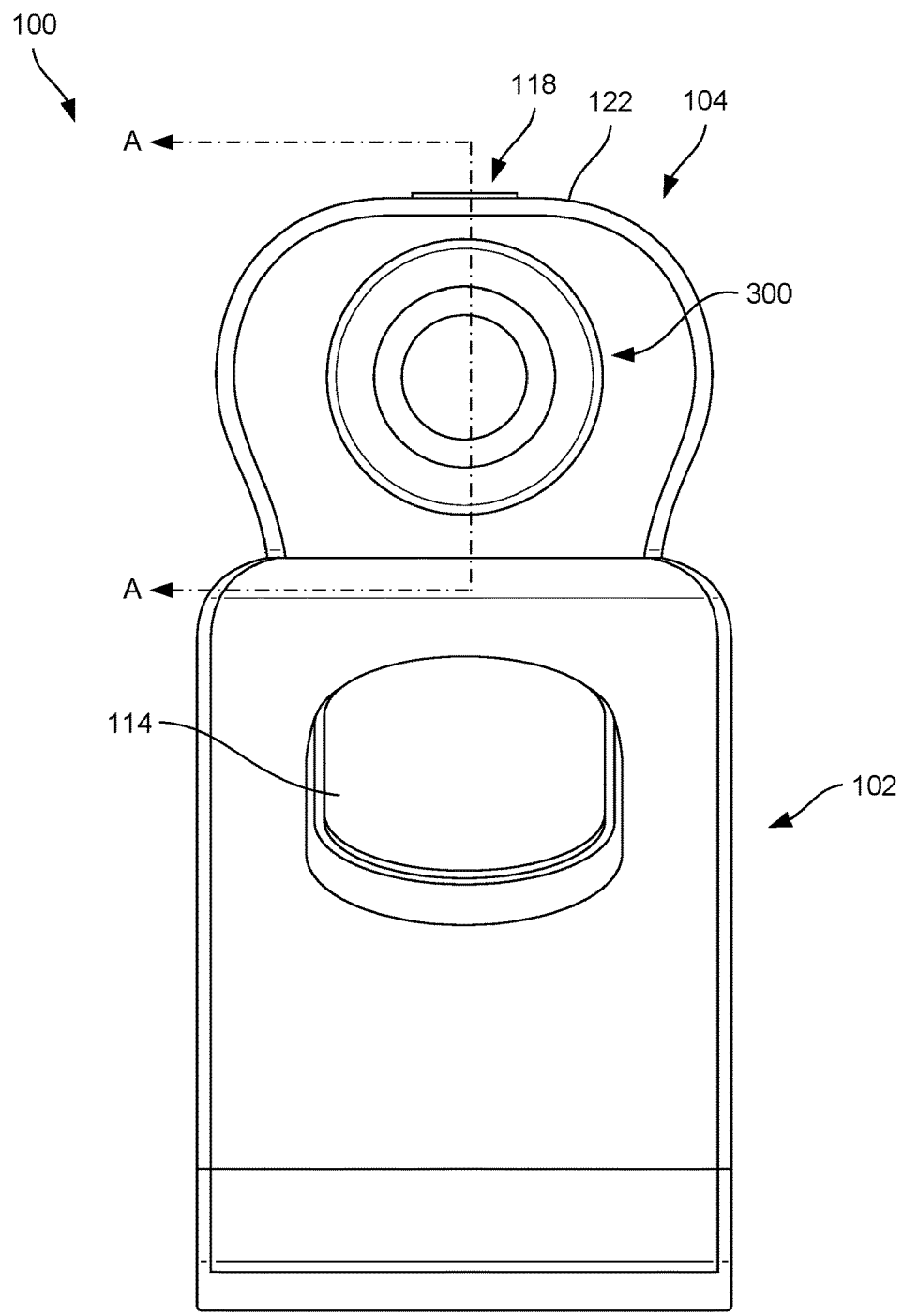
FIG. 6 illustrates a second end view of the security camera device of FIG. 1, according to an example of the present disclosure.

FIG. 6 illustrates a rear view of the security camera device 100, according to examples of the present disclosure. The head 104 is shown including the second camera 300, the button 118, while the body 102 is shown including the adhesive 114 for securing the security camera device 100 to the windshield, for example. In some instances, the second camera 300 may be centrally located (e.g., between sides and/or between the top 122 and the bottom 202) on the back 128 of the head 104. In some instances, the button 118 may extend beyond the top 122 of the head 104 (e.g., proud), or may be flush with the top 122 of the head 104. The light ring 126 may additionally or alternatively extend beyond the top 122 of the head 104, or may be flush with the top 122 of the head 104.

In some instances, the body 102 and the head 104 may include substantially the same width (e.g., x-direction), or may include different widths.

Figure 16:
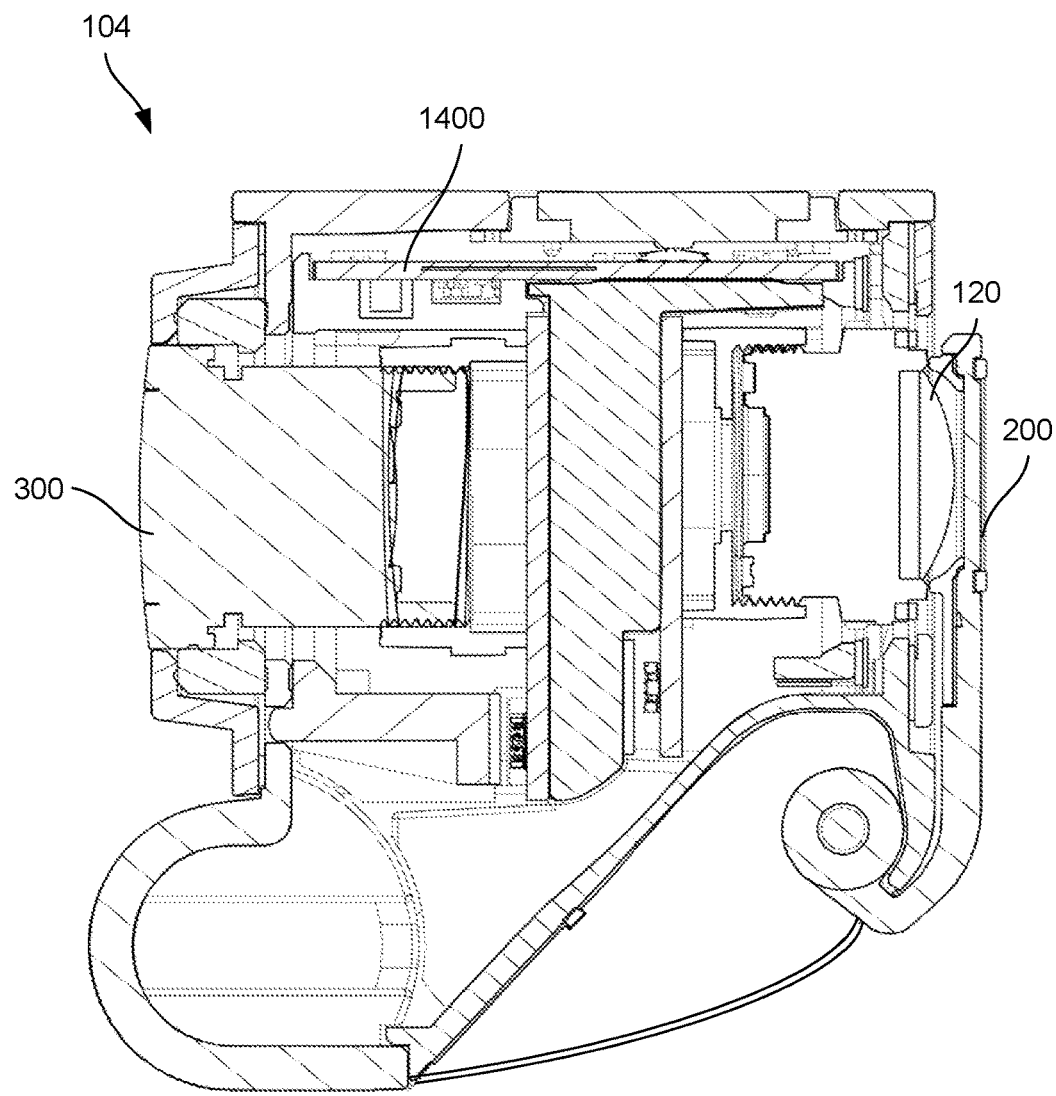
FIG. 16 illustrates a cross-sectional view of an example head of the security camera device of FIG. 1, taken along line A-A of FIG. 6, according to an example of the present disclosure.

A line A-A is shown, which is used to illustrate a cross-sectional view of the head 104 in FIG. 16.

Figure 7:
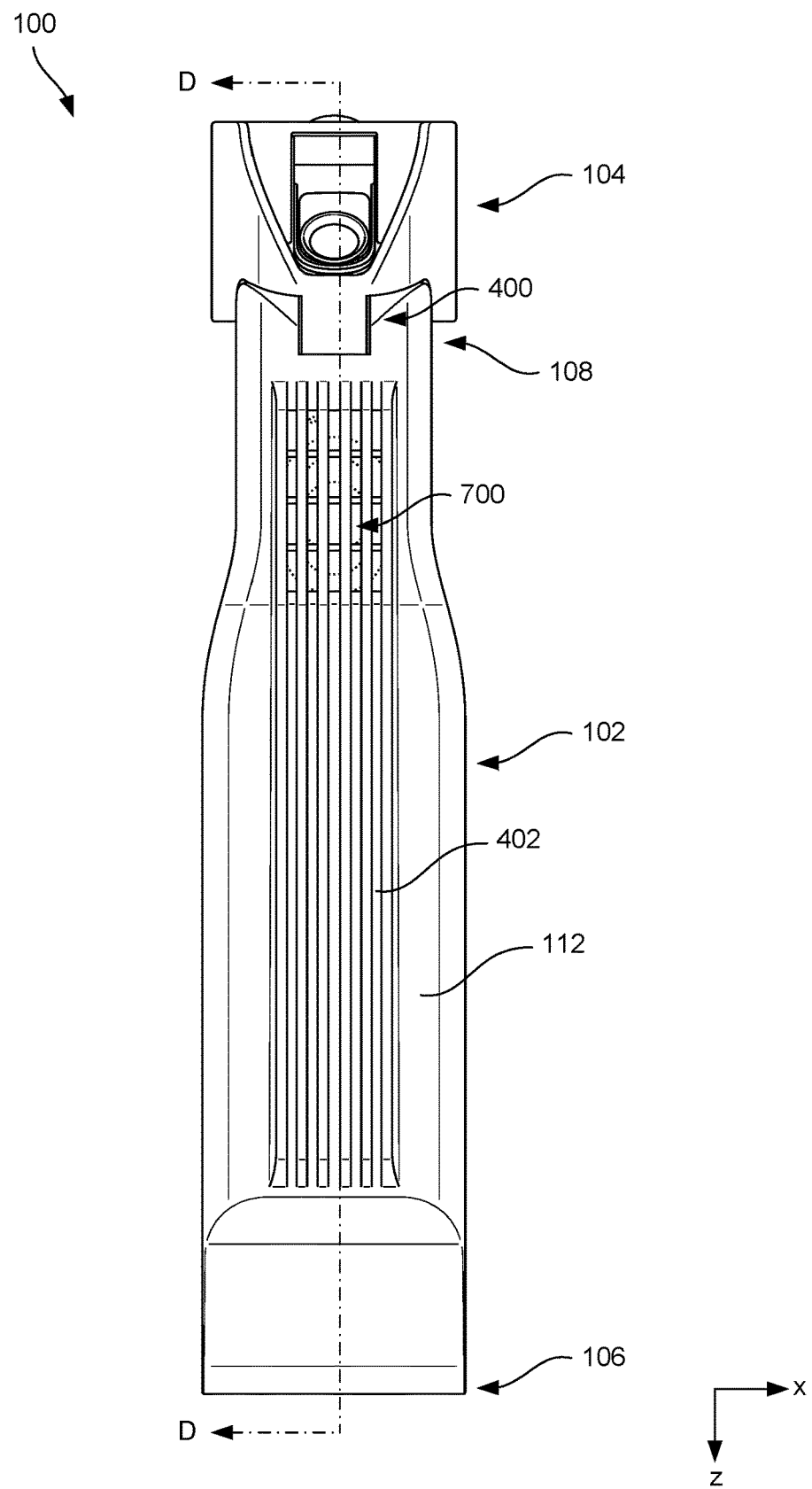
FIG. 7 illustrates a first side view of the security camera device of FIG. 1, according to an example of the present disclosure.

FIG. 7 illustrates a bottom view of the security camera device 100, according to examples of the present disclosure. The head 104 is shown pivotably coupled to the body 102, at the second end 108, via the hinged connection 400. Moreover, the bottom 112 includes the grooves 402 that span at least a portion of a length of the body 102, between the first end 106 and the second end 108.

The bottom 112 may further include orifices 700 (e.g., opening, slits, etc.) for dispersing sound generated by one or more loudspeaker(s) of the security camera device 100. The one or more loudspeaker(s) may reside within the body 102 and oriented to emit sound outward (from an interior of the security camera device 100) and away from the security camera device 100. The orifices 700 may be formed by or within the second housing 304 of the body 102. During use, and when disposed in the vehicle, the one or more loudspeaker(s) are configured to emit sound towards the dashboard of the vehicle (e.g., downward and outward from the vehicle). In some instances, the one or more loudspeaker(s) may be disposed more proximate to the second end 108 of the body 102 as compared to the first end 106 (e.g., closer to the head 104). The grooves 402 are shown being continuous across (e.g., over) the orifices 700 In other words, voids may be formed between adjacent grooves 402, so as to create the orifices 700, to allow sound generated by the loudspeakers to exit the security camera device 100.

Figure 22:
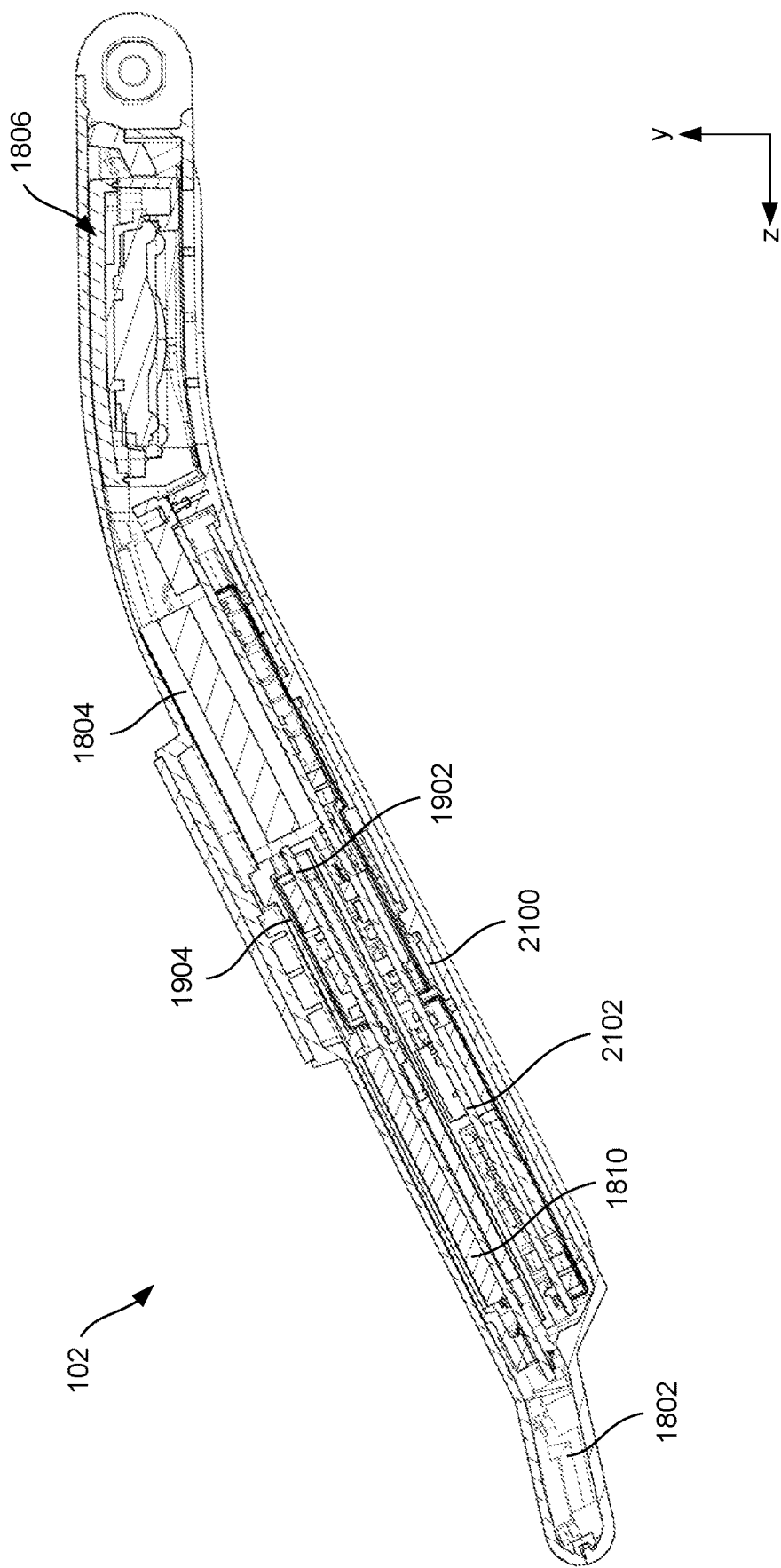
FIG. 22 illustrates a third cross-sectional view of an example body of the security camera device of FIG. 1, taken along line D-D of FIG. 7, showing example components disposed within the body, according to an example of the present disclosure.

A line D-D is further shown, which is used to illustrate a cross-sectional view of the security camera device 100 in FIG. 22.

Figure 8:
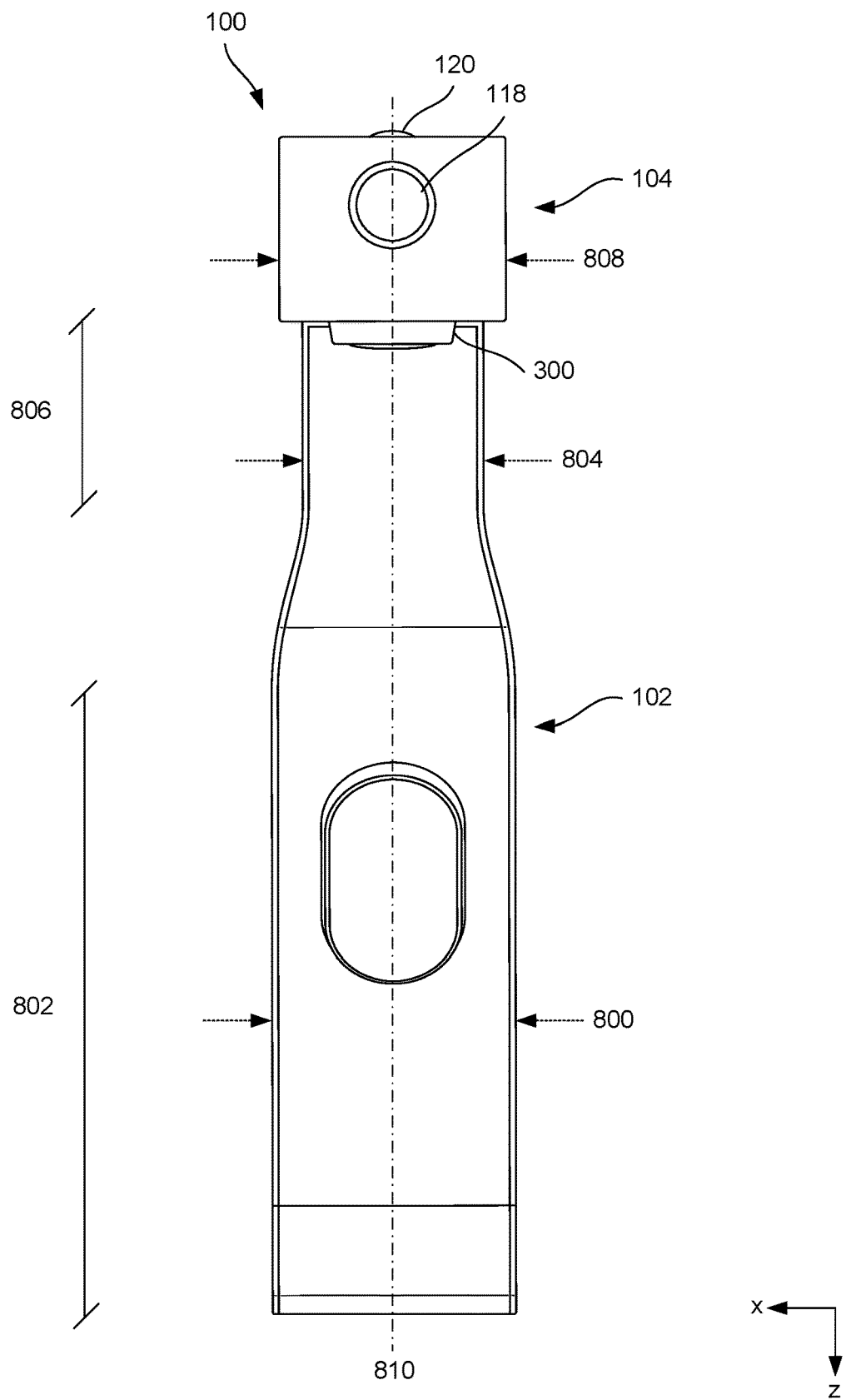
FIG. 8 illustrates a second side view of the security camera device of FIG. 1, according to an example of the present disclosure.

FIG. 8 illustrates a top view of the security camera device 100, according to examples of the present disclosure. In some instances, the first camera 120, the second camera 300, the button 118, and/or the adhesive 114 may be centrally aligned on the security camera device 100 along a plane 810 (e.g., along an X-Y plane). In some instances, the first camera 120 and the second camera 300 may be concentrically aligned along the plane 810 (e.g., in the x and y-directions). In some instances, the first camera 120 and/or the second camera 300 (or lenses thereof, respectively) may protrude from the front 124 and the back 128 of the head 104, respectively.

In some instances, the first camera 120 and the second camera 300 may have different characteristics. For example, one of the cameras may have a higher resolution, or a greater color depth, etc. In some instances, the first camera 120 may have a higher resolution than the second camera 300. However, in some instances, the first camera 120 has a lower resolution than the second camera 300.

In some instances, a lens of the first camera 120 and/or a lens of the second camera 300 may have different characteristics. For example, the lens of the first camera 120 may be configured to provide a field of view corresponding to a first horizontal angle and a first vertical angle, and the lens of the second camera 300 may be configured to provide a field of view corresponding to a second horizontal angle and a second vertical angle, where the first horizontal angle is different than the second horizontal angle and the first vertical angle is different than the second vertical angle. In some instances, the lens of the first camera 120 may provide a greater field of view than the lens of the second camera 300. However, in some instances, the lens of the first camera 120 provides a lesser field of view than a lens of the second camera 300.

As shown, the first camera 120 may be oriented in a first direction, the second camera 300 may be oriented in a second direction, and the button 118 may be oriented in a third direction. The first direction may be opposite to the second direction, vice versa, and the third direction may be perpendicular to the first direction and the second direction.

The body 102 may include a first width 800 (X-direction) disposed along at least a first portion 802 of a length (Z-direction) of the body 102, and a second width 804 (X-direction) disposed along at least a second portion 806 of the length of the body 102. The second width 804 may be less than the first width 800. As shown, the first end 106 of the body 102 may include the first width 800, while the second end 108 of the body 102 may include the second width 804. The body 102 may taper between the first width 800 and the second width 804. Additionally, in some instances, the head 104 may include a third width 808 (X-direction) that is less than the first width 800, but greater than the second width 804.

Figure 9A:
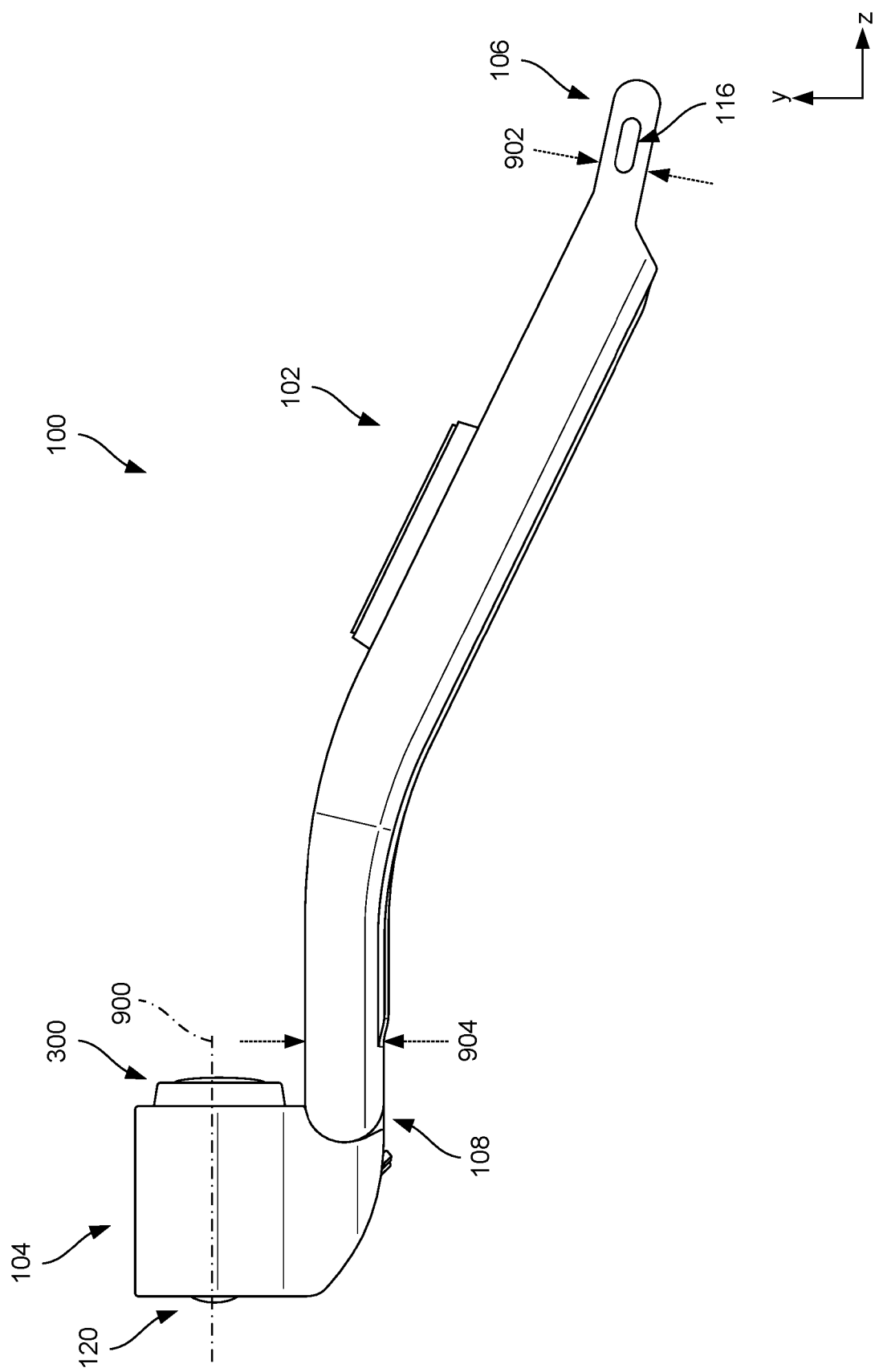
FIG. 9A illustrates a third side view of the security camera device of FIG. 1, according to an example of the present disclosure.
Figure 9B:
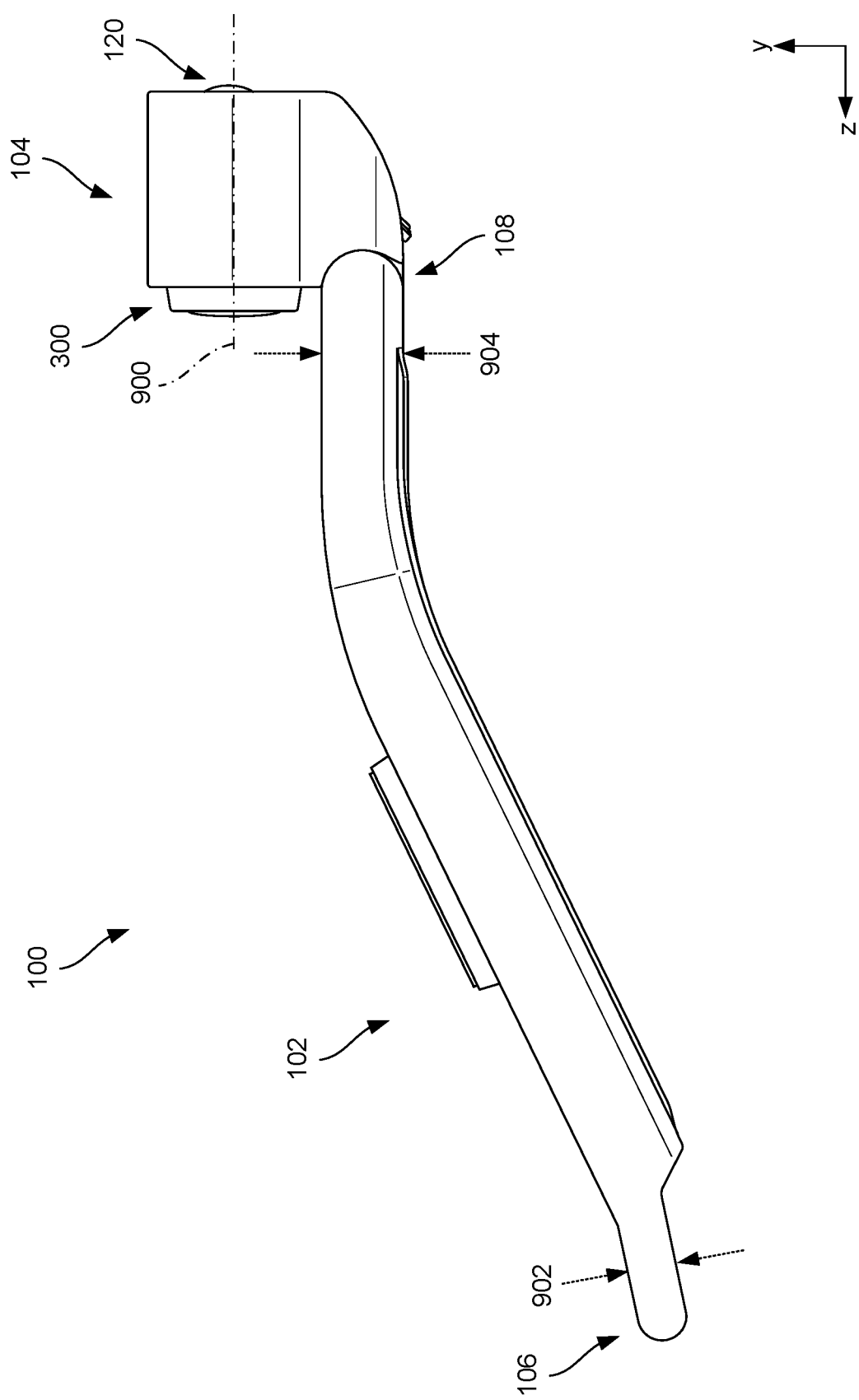
FIG. 9B illustrates a fourth side view of the security camera device of FIG. 1, according to an example of the present disclosure.

FIGS. 9A and 9B illustrate side views of the security camera device 100, according to examples of the present disclosure. FIG. 9A may represent a right side view of the security camera device 100, while FIG. 9B may illustrate a left side view of the security camera device 100.

The first camera 120 and the second camera 300 are shown being concentrically aligned along an axis 900 of the head 104. In some instances, the body 102 includes various thickness disposed along the length of the body 102. For example, given that the first end 106 of the body 102 is configured to wedge between the windshield and the dashboard, the first end 106 (or a portion of the body 102 proximate to the first end 106) may include a thickness that is less than remaining portions of the body 102. The body 102 may include a first thickness 902 (e.g., Y-direction) at or proximate to the first end 106, and a second thickness 904 at or proximate to the second end 108. The port 116 may be disposed along the body 102, within the first thickness 902. The second thickness 904 may be greater than the first thickness 902. In some instances, the body 102 may include other thicknesses between the first end 106 and the second end 108 that are different than the first thickness 902 and/or the second thickness 904.

Generally, the body 102 may include a curved profile, from the first end 106 to the second end 108, so as to extend the head 104 away from the windshield and the dashboard in a first direction (e.g., Z-direction) as well as to extend the head 104 away from the dashboard in a second direction (Y-direction). For example, the body 102 may include a slightly "S-shaped" curvature along the length of the body 102. In some instances, the curve may be approximately twenty-four degrees with respect to a lengthwise axis of a portion of the body proximate the first end 106.

In some instances, the front 124 and the back 128 of the head 104 may be substantially planar (e.g., parallel) to one another. The top 122, in some instances, may be perpendicular to the front 124 and/or the back 128. In some instances, a sleeve may be coupled to the first end 106 of the body to increase the first thickness 902. For example, the sleeve may include a thickness, that when placed over the first end 106, increases the first thickness. In some instances, this increase in thickness may accommodate different configurations of vehicles.

Figure 10:
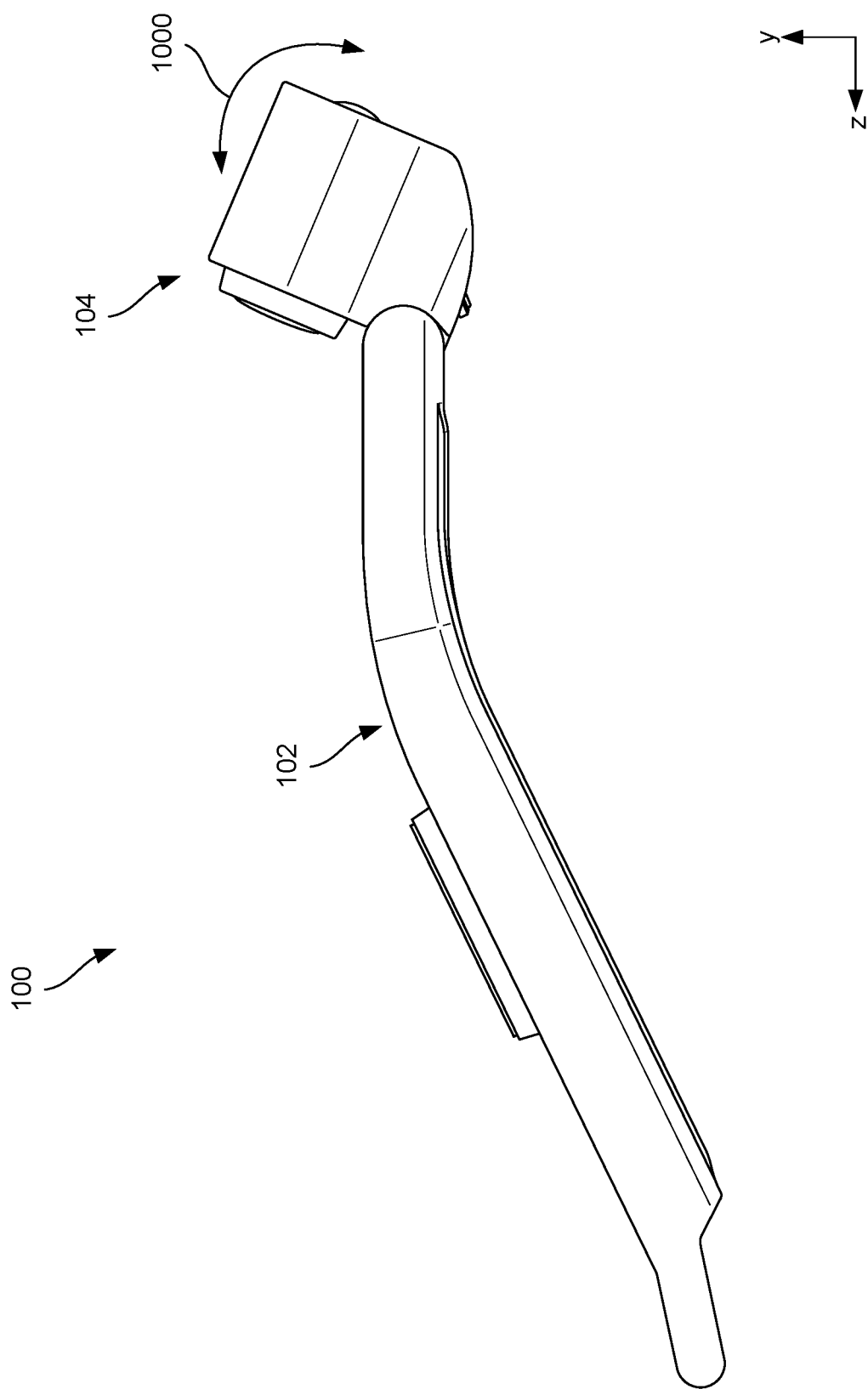
FIG. 10 illustrates the fourth side view of the security camera device of FIG. 1, showing a pivotable nature of an example head of the security camera device of FIG. 1, according to an example of the present disclosure.

FIG. 10 illustrates side view of the security camera device 100, showing a pivoting nature of the head 104, according to examples of the present disclosure. For example, from the side views shown in FIGS. 9A and 9B, the head 104 may rotate (e.g., about the x-axis) in a rotation direction 1000 to the position shown in FIG. 10. In some instances, the position of the head 104 shown in FIGS. 9A and 9B may represent the head 104 rotated to a first limit such that the head 104 may not be rotated in the counterclockwise direction. However, the head 104 may be rotated in a clockwise direction to the position shown in FIG. 10. In some instances, the position of the head 104 shown in FIG. 10 may represent the head 104 being rotated to a second limit such that the head 104 may not be rotated in the clockwise direction. Rotation of the head 104 may adjust an orientation of the first camera 120 and the second camera 300 to change a FoV of the first camera 120 and the second camera 300, respectively.

Figure 11A:
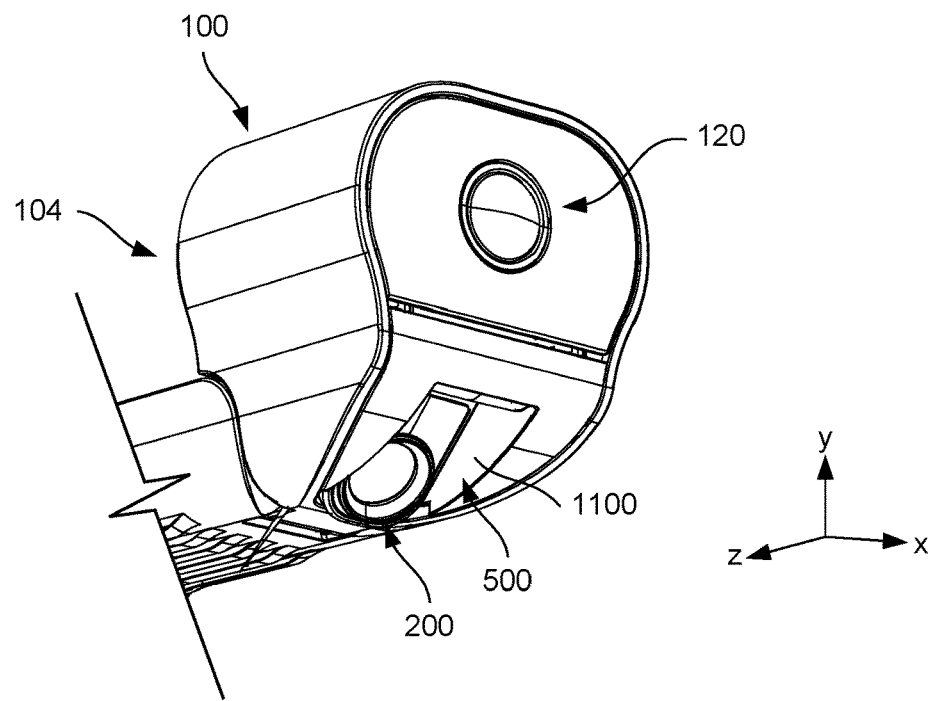
FIG. 11A illustrates a first perspective view of an example head of the security camera device of FIG. 1, showing an example privacy cover in a retracted state, according to an example of the present disclosure.
Figure 11B:
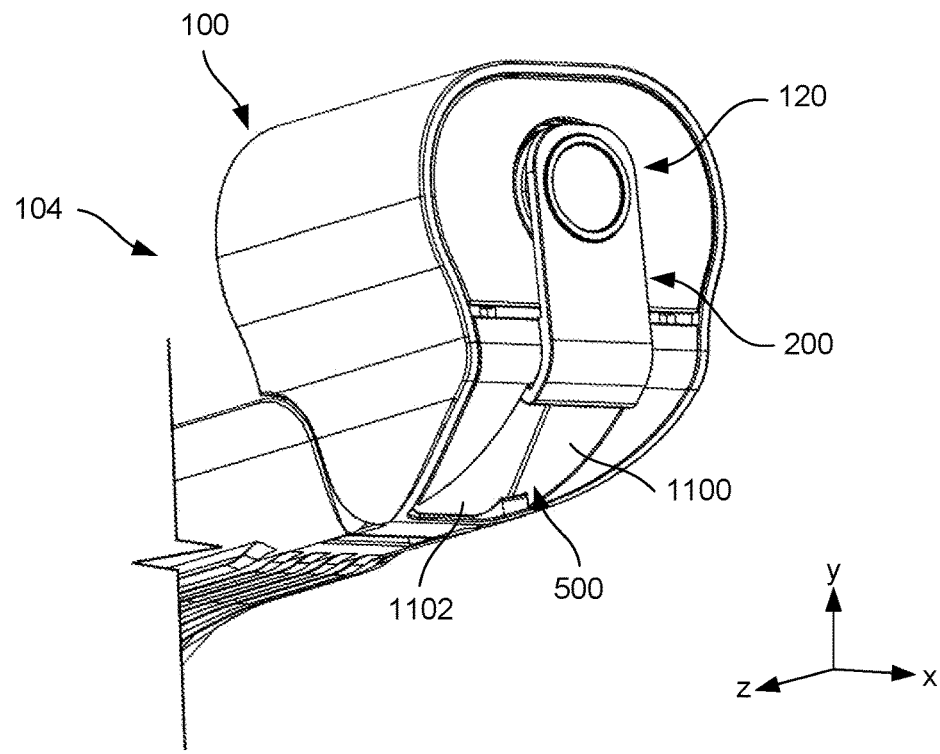
FIG. 11B illustrates a second perspective view of an example head of the security camera device of FIG. 1, showing an example privacy cover in an extended state, according to an example of the present disclosure.

FIGS. 11A and 11B illustrate an operation of the privacy cover 200, according to examples of the present disclosure. FIG. 11A illustrates the privacy cover 200 in the retracted state in which the privacy cover 200 does not obscure and/or disable the first camera 120. FIG. 11B, comparatively, illustrates the privacy cover 200 in the extended state in which the privacy cover 200 obscures and/or disables the first camera 120. Additionally, as noted above, the privacy cover 200 in the extended state may disable the one or more microphone(s) of the security camera device 100.

The head 104 includes the receptacle 500 for receiving the privacy cover 200 (e.g., in the retracted state). The privacy cover 200 may rotate (e.g., about the x-axis) to the extended state. Generally, the receptacle 500 may represent a pocket or cavity within the bottom 202 of the head 104 for receiving the privacy cover 200. In some instances, during a transition of the privacy cover 200 between the retracted state and the extended state, the privacy cover 200 may knock-over-center to the extended state and the retracted state. For example, from the retracted state shown in FIG. 11A, upon rotating the privacy cover 200 a predetermined amount (e.g., counterclockwise about the x-axis), the privacy cover 200 may knock-over-center into the extended position. Conversely, from the extended state shown in FIG. 11B, upon rotating the privacy cover 200 a predetermined amount (e.g., clockwise about the x-axis), the privacy cover 200 may knock-over-center into the retracted position. A coil spring, for example, may provide the biasing and snapping nature of the privacy cover 200.

The receptacle 500 may be defined by opposing sidewalls 1100 (e.g., spaced apart in the x-direction) and a backwall 1102. A front of the receptacle 500 is open such that the privacy cover 200 may transition to the extended state.

Figure 12A:
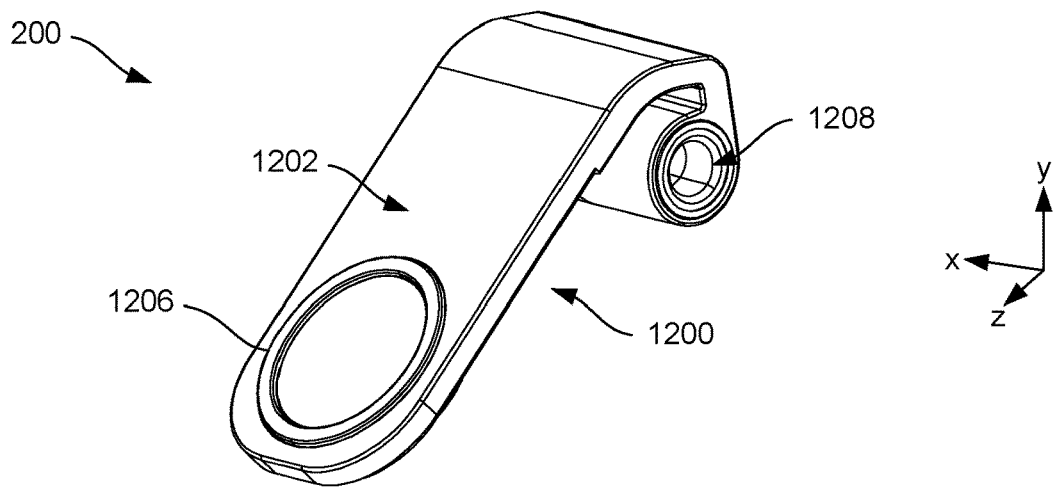
FIGS. 12A-12C illustrate an example privacy cover of the security camera device of FIG. 1, according to an example of the present disclosure.
Figure 12B:
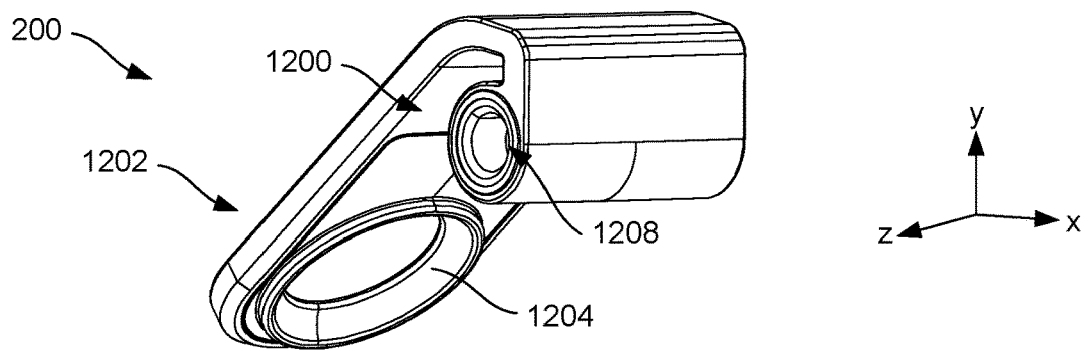
Figure 12C:
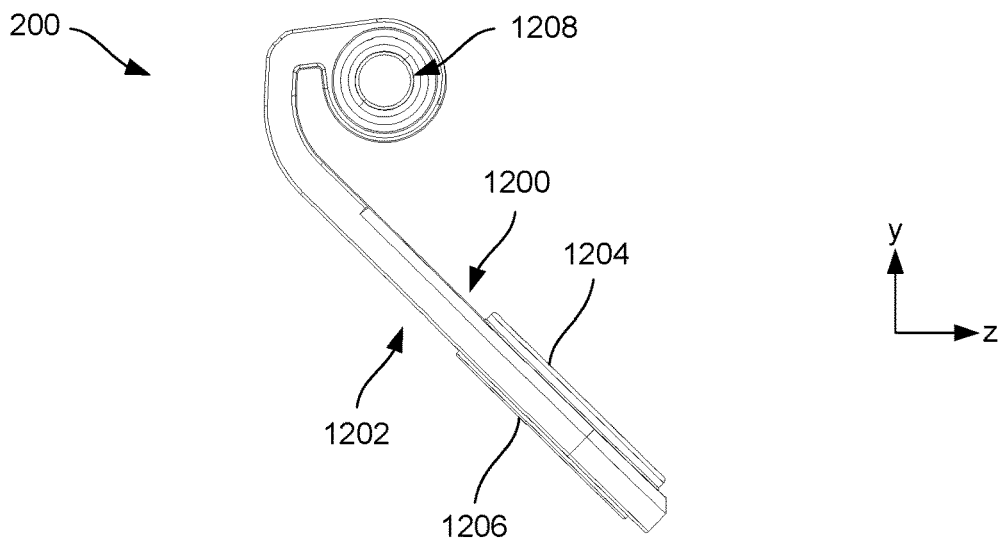

FIGS. 12A-12C illustrate various views of the privacy cover 200 of the security camera device 100, according to examples of the present disclosure. For example, FIG. 12A may illustrate an exterior perspective view of the privacy cover 200, FIG. 12B may illustrate an interior perspective view of the privacy cover 200, and FIG. 12C may illustrate a side view of the privacy cover 200.

The privacy cover 200 includes an interior side 1200 (or surface) and an exterior side 1202 (or surface), opposite the interior side 1200. The interior side 1200 may face, be oriented against, or abut the front 124 of the head 104 and/or the first camera 120 in the extended state, and face or be oriented outward from the security camera device 100 (e.g., towards the interior of the vehicle) in the retracted state. The exterior side 1202 may face or be oriented outward from the security camera device 100 (e.g., towards the interior of the vehicle) in the extended state, and may face, be oriented against, or abut the backwall 1102 of the receptacle 500 in the retracted state. In some instances, the interior side 1200 includes a gasket 1204 that seals against the lens of the first camera 120 in the extended state. The exterior side 1202 may include a cushion 1206 that abuts the backwall 1102 in the retracted state to prevent rattling or chatter between the privacy cover 200 and the backwall 1102.

The privacy cover 200 includes a channel 1208 formed through a body of the privacy cover 200. The channel 1208 may receive a rod (e.g., pin, post, etc.) for pivotably coupling the privacy cover 200 to the head 104. For example, the rod may be disposed through the channel 1208, between the sidewalls 1100 of the receptacle 500. A coil spring may be disposed within the channel 1208, the head 104 (e.g., the sidewalls 1100) to provide the biasing nature to the privacy cover 200.

The privacy cover 200 may, in some instances, include a magnet. The magnet may be disposed on the interior side 1200, the exterior side 1202, or within a body of the privacy cover 200. A hall effect sensor within the head 104 may be used to activate and deactivate the first camera 120. For example, when the hall effect sensor senses a magnetic field emitted by the magnet, such as when the privacy cover 200 transitions to the extended state, the first camera 120, the one or more microphone(s), and so forth may be deactivated. Comparatively, when the hall effector sensor no longer senses the magnetic field emitted by the magnet, such as when the privacy cover 200 transitions to the retracted state, the first camera 120, the one or more microphone(s), and so forth may be activated.

Figure 13A:
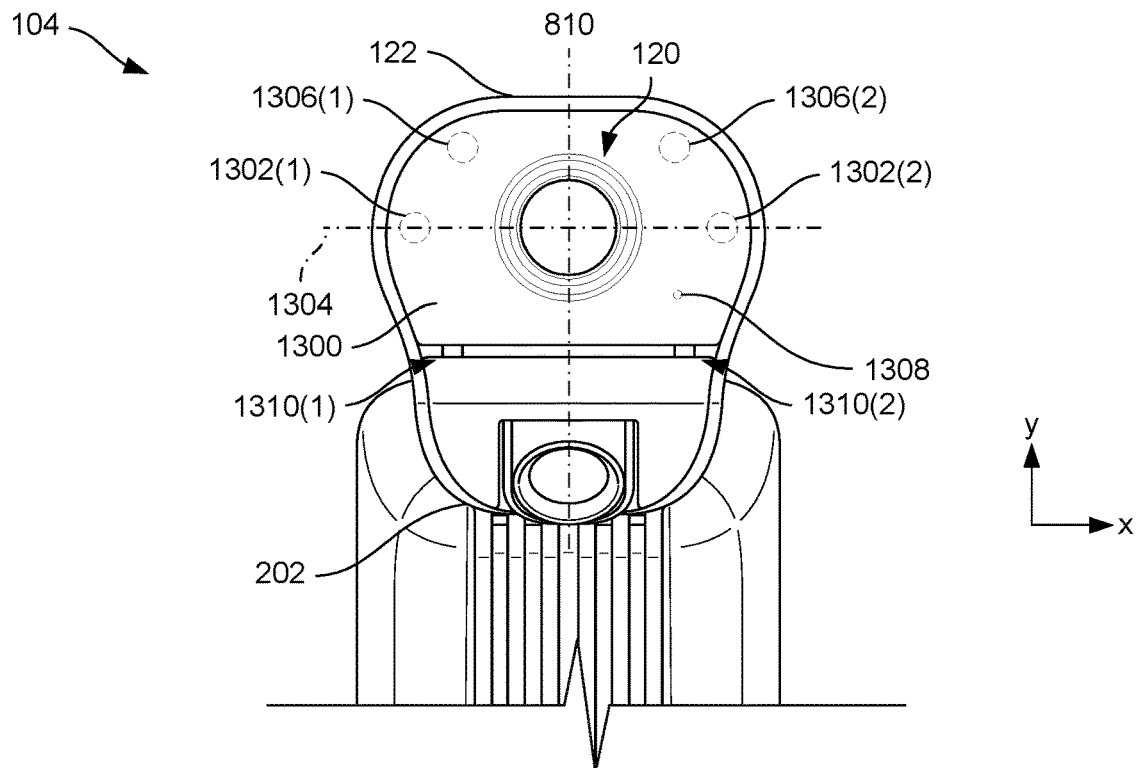
FIGS. 13A and 13B illustrate example sensor(s) of an example head of the security camera device of FIG. 1, according to an example of the present disclosure.
Figure 13B:
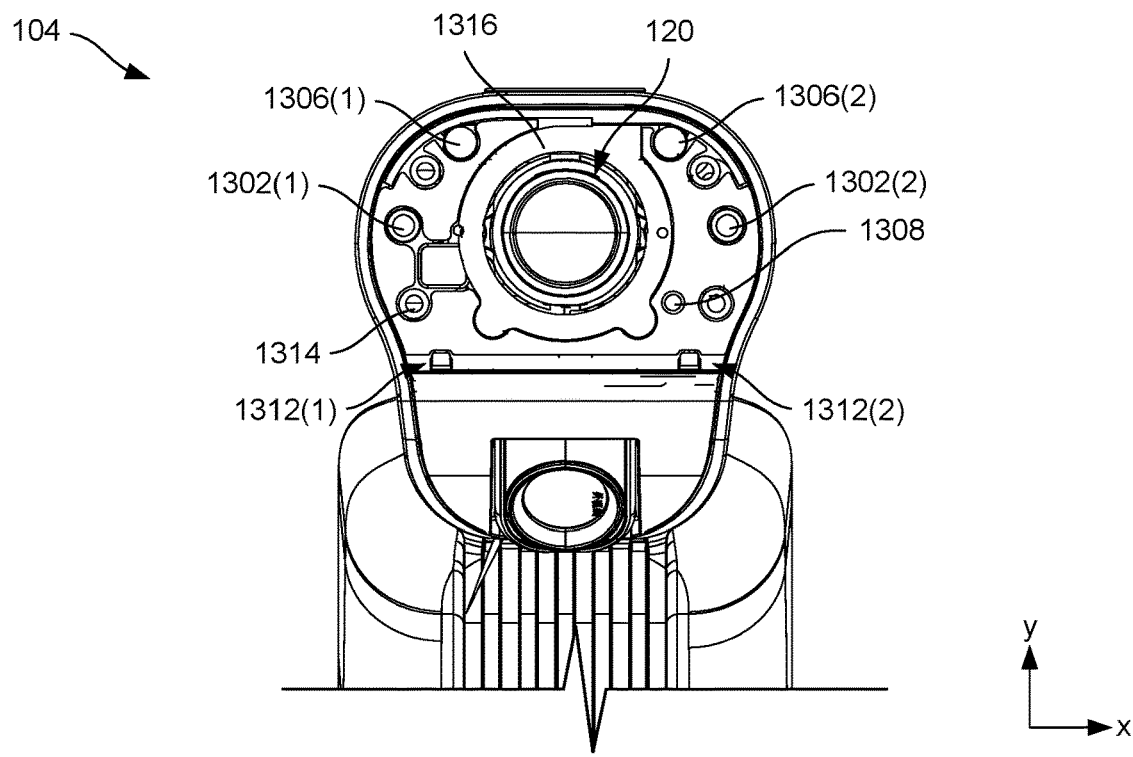

FIGS. 13A and 13B illustrate various views of the head 104 of the security camera device 100, according to examples of the present disclosure. For example, FIGS. 13A and 13B illustrate the front of the head 104, with FIG. 13A showing a cover 1300 coupled to the head 104 and FIG. 13B showing the cover 1300 removed from the head 104 to illustrate components residing therebeneath.

The head 104 includes one or more flood LEDs 1302 disposed beneath the cover 1300 (e.g., in the z-direction). In FIG. 13A, the one or more flood LEDs 1302 are shown in dashed lines to indicate their position behind the cover 1300. The one or more flood LEDs 1302 may emit light within the interior of the vehicle to enable the first camera 120 to capture image data and/or video data within the vehicle. In some instances, the one or more flood LEDs 1302 include a first flood LED 1302(1) arranged on a first side of the first camera 120 (e.g., left hand side) and a second flood LED 1302(2) arranged on a second side of the first camera 120 (e.g., right hand side). However, more than two of the flood LEDs 1302 may be included. In some instances, the one or more flood LEDs 1302 may be aligned with the first camera 120. For example, the one or more flood LEDs 1302 may be aligned with the first camera 120 along an axis 1304.

The head 104 includes one or more IR LEDs 1306 disposed beneath the cover 1300 (e.g., in the z-direction). In FIG. 13A, the one or more IR LEDs 1306 are shown in dashed lines to indicate their position behind the cover 1300. The IR LEDs 1306 may emit light within the interior of the vehicle to enable the first camera 120 to capture image data and/or video data within the vehicle (e.g., during nighttime). In some instances, the one or more IR LEDs 1306 include a first IR LED 1306(1) arranged on the first side of the first camera 120 (e.g., left hand side) and a second IR LED 1306(2) arranged on the second side of the first camera 120 (e.g., right hand side). However, more than two of the IR LEDs 1306 may be included.

In some instances, the one or more IR LEDs 1306 may be disposed closer to the top 122 of the head 104 compared to the first camera 120 and/or the one or more flood LEDs 1302. Additionally, or alternatively, the IR LEDs 1306 may be located closer to the plane 810 of the head 104 as compared to the flood LEDs 1302. For example, the first IR LED 1306(1) may be located more proximate to the plane 810 than the first flood LED 1302(1), and/or the second IR LED 1306(2) may be located more proximate to the plane 810 than the second flood LED 1302(2).

The head 104 may further include a recording LED 1308 that illuminates when the first camera 120 and and/or the microphones are recording. In this sense, the recording LED 1308 may serve as a light indicator that indicates an operational state of the first camera 120 and/or the microphones. In some instances, the recording LED 1308, for example, may output red light. As shown, the recording LED 1308 may be disposed vertically below the first camera 120, the one or more flood LEDs 1302, and/or the one or more IR LEDs 1306. As such, in some instances, the recording LED 1308 may be located closer to the bottom 202 of the head 104 than the first camera 120, the one or more flood LEDs 1302, and/or the one or more IR LEDs 1306. The recording LED 1308 may be disposed closer to the second side of the first camera 120 (e.g., right side). In some instances, the recording LED 1308 may be vertically aligned with the second IR LED 1306(2).

The front 124 defines microphone port(s) 1310 for channeling sound to one or more microphone(s) located in the head 104. For example a first microphone port 1310(1) and a second microphone port 1310(2) may be located on the front 124. The microphone port(s) 1310 may direct sound from an exterior of the security camera device 100 to within an interior of the security camera device 100. In some instances, the microphone port(s) 1310 may be sealed or covered with an acoustic mesh or membrane material that prevents or substantially prevents the ingress of debris (e.g., dust) or moisture into the interior of the security camera device 100, while allowing sound to permeate therethrough and reach the microphone(s). The mesh may also acoustically seal the microphones. In some instances, security camera device 100 may include a corresponding number of the microphone port(s) 1310 as microphones.

In some instances, the security camera device 100 may include an LED that indicates when the security camera device 100 is communicatively coupled to the vehicle. For example, if a cable is plugged into the port 116, an LED on the front (or other portion of the body 102 or head 104), may illuminate.

Turning to FIG. 13B, removing the cover 1300 exposes the first camera 120, the one or more flood LEDs 1302, the one or more IR LEDs 1306, the recording LED 1308, and one or more microphone(s) 1312, such as a first microphone 1312(1) and a second microphone 1312(2) that are aligned with the first microphone port 116(1) and the second microphone port 116(2), respectively. The head 104 includes various frames, mounts, printed circuit boards (PCBs), and the like to which the first camera 120, the one or more flood LEDs 1302, the one or more IR LEDs 1306, the recording LED 1308, and one or more microphone(s) 1312 couple. In some instances, a frame within the head 104 includes slots 1314 that receive prongs or other tabs of the cover 1300 for aligning the cover 1300 onto the head 104.

The head 104 may further include a MPS 1316 that encircles (e.g., donut shape) the first camera 120. In some instances, the MPS 1316 may at least partially encircle the first camera 120 (e.g., horseshoe shape). The MPS 1316 may be oriented towards the interior of the vehicle to detect moving objects (e.g., presence detection). In response to detecting motion, the first camera 120 may be triggered to begin capturing image data and/or video data within the vehicle.

The cover 1300 may include a substantially continuous surface and may be at least partially translucent (e.g., such as clear, transparent, etc.) such that the one or more flood LEDs 1302, the one or more IR LEDs 1306, and/or recording LED 1308 of the security camera device 100 may omit light therethrough. For example, in some instances, the cover 1300 may include glass, clear plastic, or any other material that allows light to pass therethrough. The translucent nature of the cover 1300 also permits the MPS 1316 to sense motion. The continuous surface of the cover 1300 may also provide the security camera device 100 with a uniform and aesthetic appearance.

Although the first camera 120, the one or more flood LEDs 1302, the one or more IR LEDs 1306, the recording LED 1308, the microphone port(s) 1310, the microphone(s) 1312, and the MPS 1316 are shown in certain positions, the first camera 120, the one or more flood LEDs 1302, the one or more IR LEDs 1306, the recording LED 1308, the microphone port(s) 1310, the microphone(s) 1312, and the MPS 1316 may be located on the head 104 differently than shown.

Figure 14A:
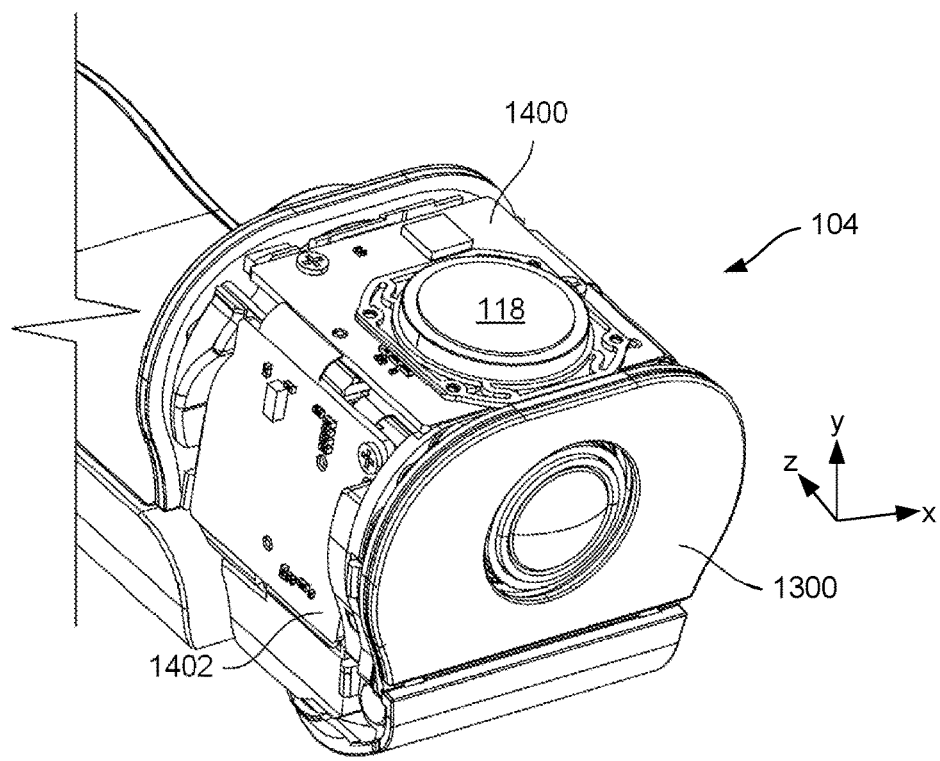
FIGS. 14A-14C illustrate components of an example head of the security camera device of FIG. 1, according to an example of the present disclosure.
Figure 14B:
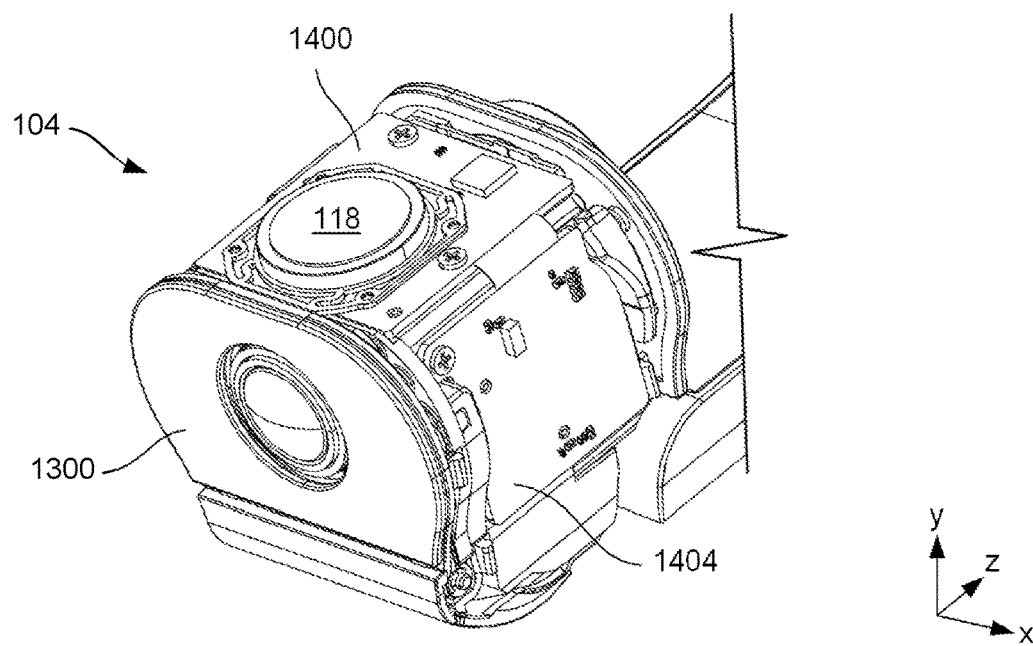
Figure 14C:
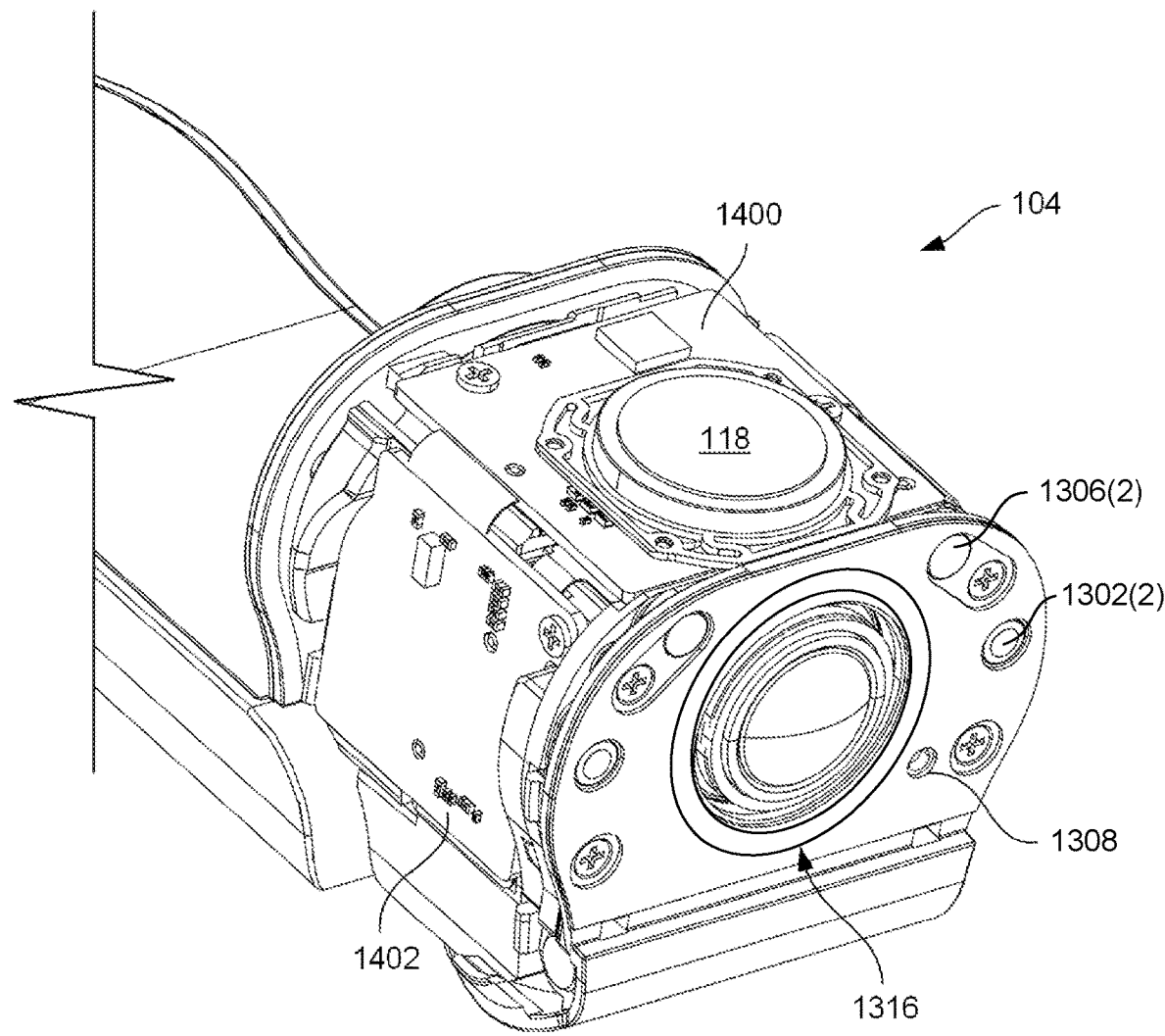

FIGS. 14A-14C illustrate various views of the head 104 of the security camera device 100, according to examples of the present disclosure. In FIGS. 14A-14C, the housing 306 is shown removed to illustrate components of the head 104. FIG. 14C further shows the cover 1300 removed to illustrate the one or more flood LEDs 1302, the one or more IR LEDs 1306, the recording LED 1308, and the MPS 1316.

The head 104 may include a button PCB 1400 that receives input from the button 118, a first camera PCB 1402 for the first camera 120, and a second camera PCB 1404 for the second camera 300. In some instances, the button PCB 1400 may be arranged on top of the head 104, while the first camera PCB 1402 and/or the second camera PCB 1404 are arranged on sides of the head 104. For example, the first camera PCB 1402 may be arranged on a left side of the head 104, while the second camera PCB 1404 may be arranged on a right side of the head 104. The button PCB 1400, the first camera PCB 1402, and/or the second camera PCB 1404 may communicatively couple to one another via various circuits (e.g., flex circuits).

The button 118 may be mechanical (e.g., having physically movable components) and/or electronic (e.g., capacitive sensors, optical sensors, or the like). The button PCB 1400 may communicatively couple to the button 118 to receive data indicative of a press (or touch) of the button. In some instances, a button mount may provide haptic feedback to the button 118. The first camera PCB 1402 and/or the second camera PCB 1404 receive image data and/or video data capture by the first camera 120 and the second camera 300, respectively.

While certain PCBs are illustrated and discussed, additional or alternative PCBs may reside within the head 104. For example, a PCB may communicatively couple to the MPS 1316. The head 104 may also include a microphone PCB on which the microphone(s) 1312 are disposed. Additionally, the head 104 may include frames, mounts, and the like to which the various PCBs of the head 104 mount, shielding elements, heat dissipating elements, foam, and so forth.

Figure 15A:
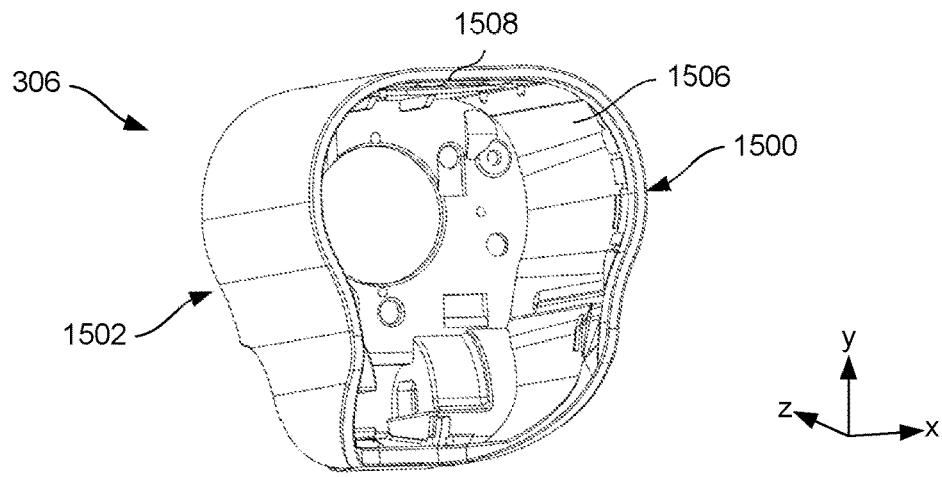
FIGS. 15A-15C illustrate an example housing of an example head of the security camera device of FIG. 1, according to an example of the present disclosure.
Figure 15B:
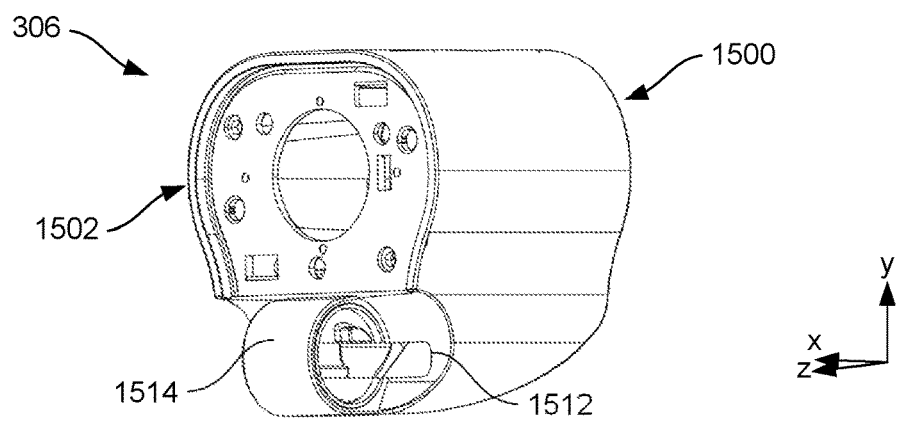
Figure 15C:
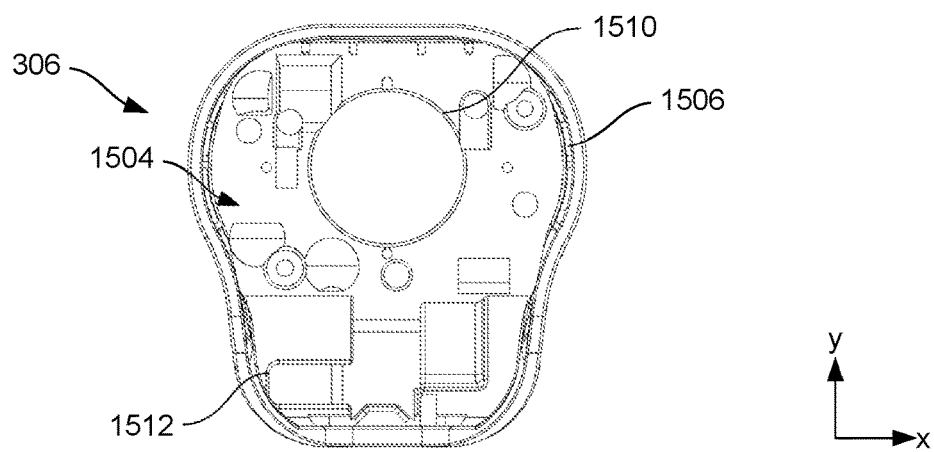

FIGS. 15A-15C illustrate various views of the housing 306 of the security camera device 100, according to examples of the present disclosure. The housing 306 may include a first side 1500 and a second side 1502 (opposite the first side 1500, and spaced apart in the z-direction). The first side 1500 may correspond to or be associated with the front 124 of the head 104, while the second side 1502 may correspond to or be associated with the back 128 of the head 104.

The housing 306 includes a cavity 1504 defined between the first side 1500 and the second side 1502, and which receives components of the head 104. For example, frames, mounts, the button PCB 1400, the first camera PCB 1402, the second camera PCB 1404, and so forth may reside within the cavity 1504 when the security camera device 100 is assembled together. An interior surface 1506 of the housing 306 may include various grooves, slots, tabs, prongs, and the like that engage with corresponding features of the frames, mounts, the button PCB 1400, the first camera PCB 1402, the second camera PCB 1404, and so forth. Such engagement may align the frames, mounts, the button PCB 1400, the first camera PCB 1402, the second camera PCB 1404, and so forth within the head 104.

A first opening 1508 in a top of the housing 306 provides a passageway through which the button 118 is at least partially disposed. A second opening 1510 in the second side 1502 of the housing 306 provides a passageway through which the second camera 300 is at least partially disposed. Additionally, a third opening 1512 provides a passageway through which one or more FPCAs or flex circuits are disposed. The FPCAs and/or flex circuits may communicatively couple computing components within the head 104 (e.g., the button PCB 1400) with computing component in the body 102 (e.g., loudspeaker(s)). As shown, the third opening 1512 may at least partially be formed within, or through, a portion of the hinged connection 400 between the head 104 and the body 102. For example, the head 104 may include, or the housing 306 may form, a knuckle 1514 that mates or engages with knuckles of the body 102. The third opening 1512 that accommodates the FPCAs or flex circuits may be disposed through the knuckle 1514.

FIG. 16 illustrates a cross-sectional view of the head 104, taken along line D-D of FIG. 6 showing components residing within the head 104, according to examples of the present disclosure. The first camera 120 and the second camera 300 are shown residing within the housing 306, in a concentric relationship. The housing 306 also receives the privacy cover 200. As shown in FIG. 16, the privacy cover 200 is in the extended state. The housing 306 also includes the button PCB 1400, arranged above the first camera 120 and the second camera 300.

Figure 17A:
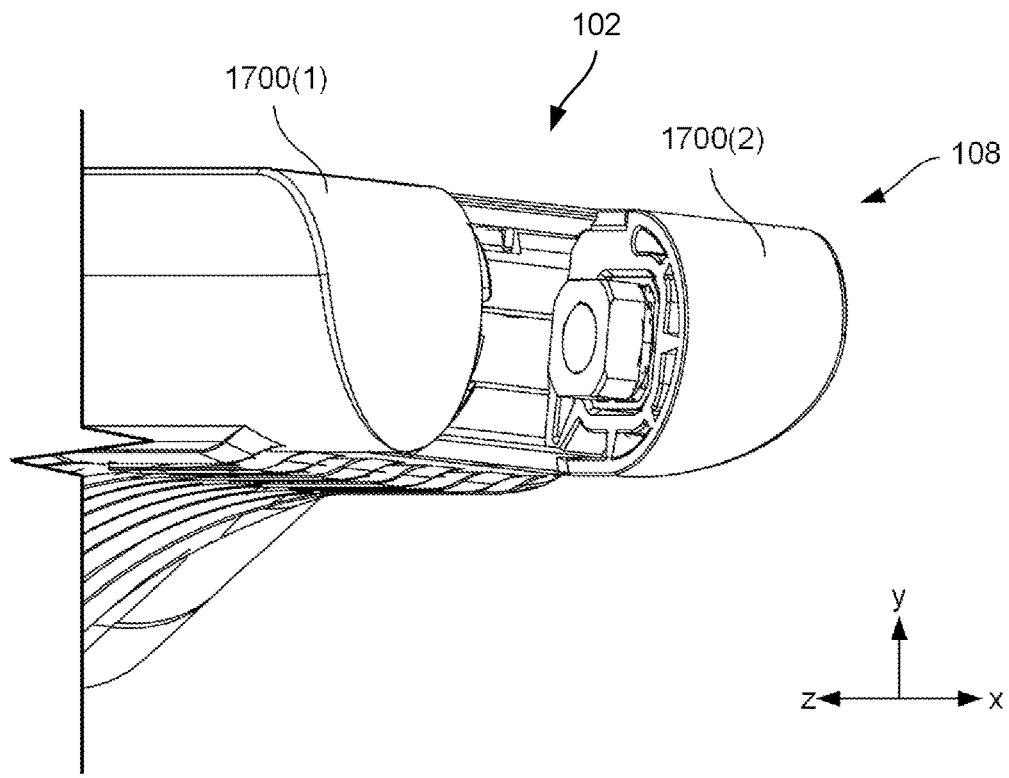
FIGS. 17A and 17B illustrate a pivotable coupling between an example body and an example head of the security camera device of FIG. 1, according to an example of the present disclosure.
Figure 17B:
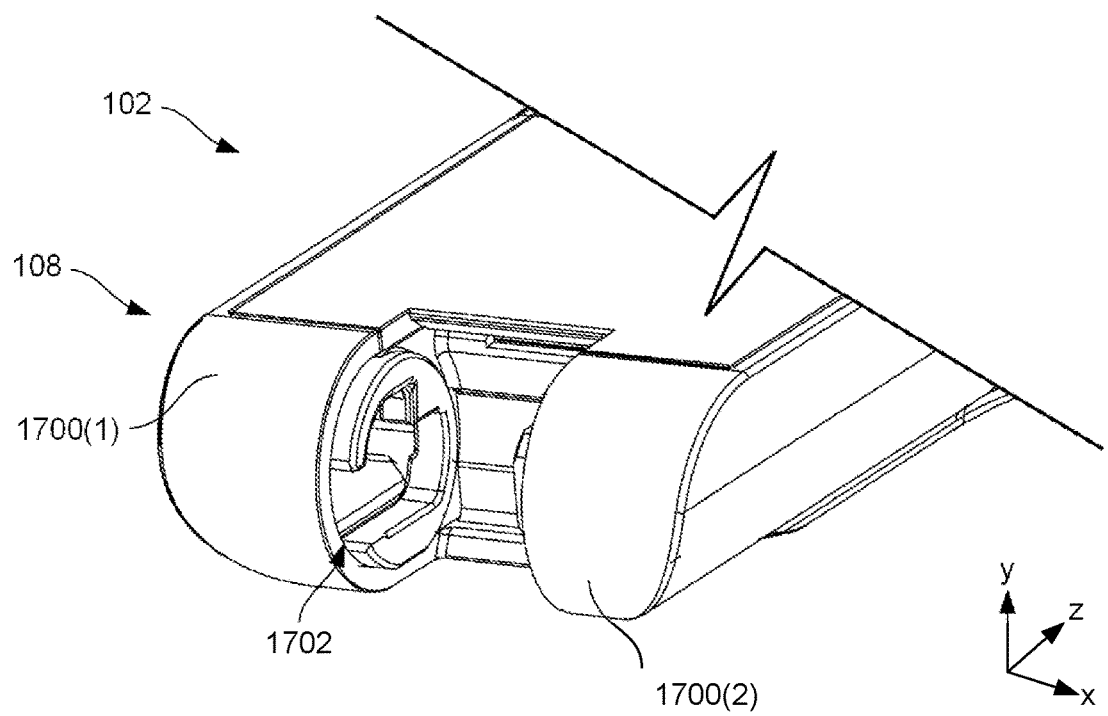

FIGS. 17A and 17B illustrate a receptacle of the body 102 for receiving and coupling to the head 104, according to examples of the present disclosure. In some instances, the second end 108 of the body 102 may include two knuckles 1700, such as a first knuckle 1700(1) and a second knuckle 1700(2), for receiving the knuckle 1514 of the head 104. For example, the knuckle 1514 of the head 104 may couple to the body 102 at a location between the first knuckle 1700(1) and the second knuckle 1700(2). Collectively, the knuckle 1514 of the head 104, the first knuckle 1700(1) of the body 102, and the second knuckle 1700(2) of the body 102 may form the hinged connection 400 between the head 104 and the body 102. The first knuckle 1700(1) and/or the second knuckle 1700(2) may be formed via the first housing 302 and/or the second housing 304 of the body 102.

As shown, and in some instances, the body 102 may include various slots, ribs, grooves, and so forth for aligning the head 104 and the body 102. For example, in some instances, the knuckle 1514 may snap into features on the first knuckle 1700(1) and/or the second knuckle 1700(2) to couple the head 104 and the body 102, to align the head 104 and the body 102, and so forth. Additionally, or alternatively, the head 104 and the body 102 may be secured to one another via pressure fit connections, fasteners, and so forth.

The first knuckle 1700(1) may include a passageway 1702 for receiving the FPCAs and/or the flex circuits routed to and/or from the head 104. For example, the passageway 1702 may provide access to an interior cavity of the body 102. As the head 104 couples to the body 102, the third opening 1512 and the passageway 1702 may align for channeling the FPCAs and/or the flex circuits between the body 102 and the head 104. As such, the computing components within the body 102 may be communicatively coupled to computing components in the head 104.

Figure 18:
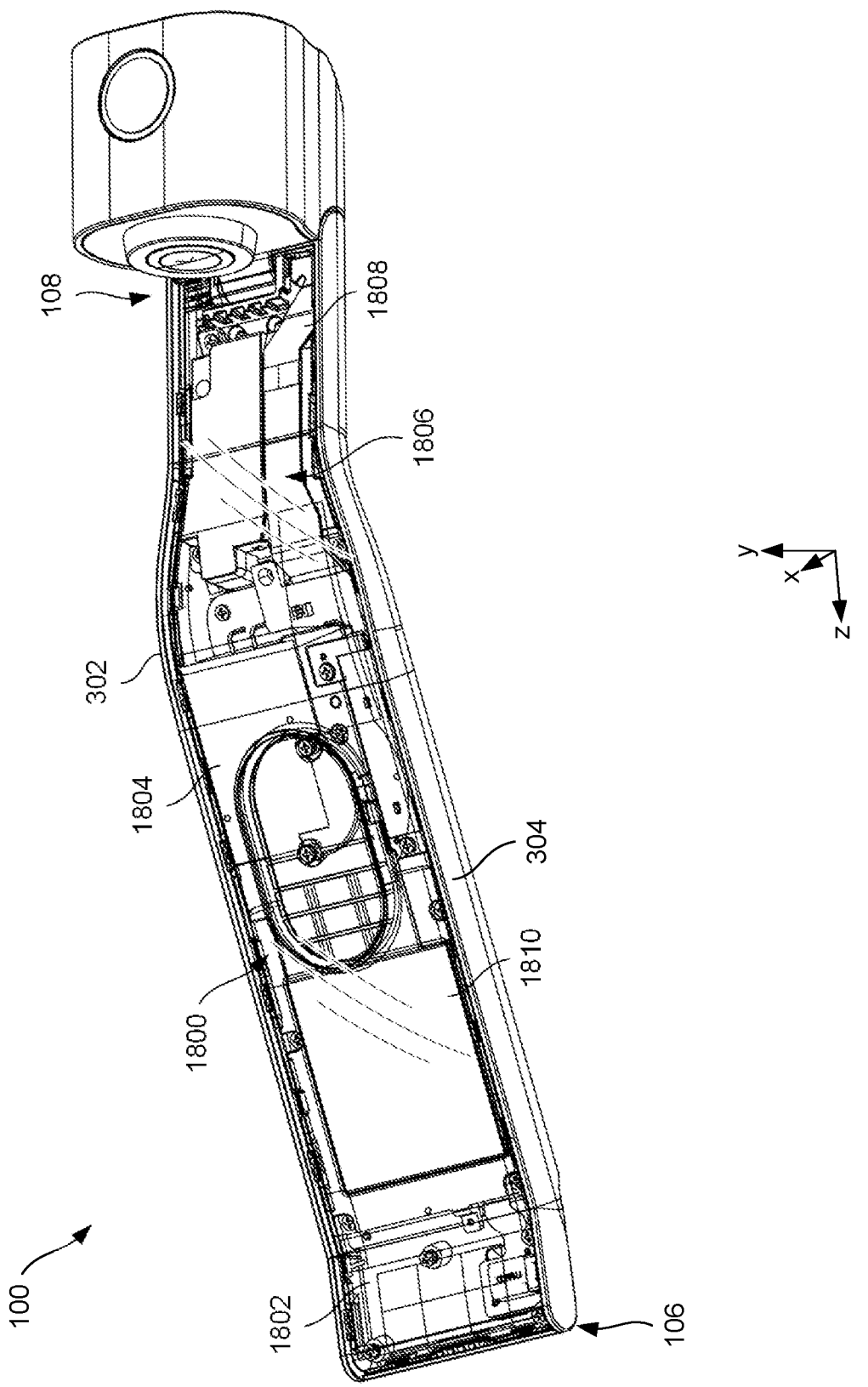
FIG. 18 illustrates example components disposed within an example body of the security camera device of FIG. 1, according to an example of the present disclosure.

FIG. 18 illustrates an interior view of the body 102, according to examples of the present disclosure. In FIG. 18, the first housing 302 of the body 102 is shown as transparent to illustrate computing components residing within the body 102.

The first housing 302 and the second housing 304 define an interior cavity 1800 within which the computing components of the body 102 reside. In some instances, the computing components may include a LTE antenna 1802, a supercapacitor 1804, a loudspeaker assembly 1806, and a FPCA 1808. The LTE antenna 1802 is shown disposed at, or proximate to, the first end 106 of the body 102 (e.g., within the foot). The supercapacitor 1804 may provide power to the security camera device 100 when the vehicle is powered off. For example, while the vehicle is running, the supercapacitor 1804 may be charged to power the security camera device 100 when the vehicle is not running. Such charging may come by way of a cable coupling between the vehicle (e.g., via an OBD port) and the port 116 of the security camera device 100. The loudspeaker assembly 1806, as explained herein, may include a loudspeaker box and a loudspeaker at least partially residing therein.

The FPCA 1808 routes between the head 104 and the body 102, for example, through the passageway 1702 of the body 102 and the third opening 1512 in the head 104. The FPCA 1808 may communicatively couple components in the body 102, such as the supercapacitor 1804, to components in the head 104, such as the button PCB 1400, the first camera PCB 1402, the second camera PCB 1404, and so forth. Additionally, although not shown, but as will be explained and discussed herein, the body 102 may include various PCBs and additional computing components that communicatively couple together.

The body 102 may include various shielding elements, heat dissipating elements, and so forth. For example, various plates 1810 may be disposed over computing components of the body 102. In some instances, the plates 1810 may be manufactured from metals to attract heat away from computing components disposed in the body 102 (e.g., PCBs). Various fasteners are further shown for coupling the loudspeaker assembly 1806, the plates 1810, and so forth to the body 102 (or the first housing 302 and/or the second housing 304).

Figure 19:
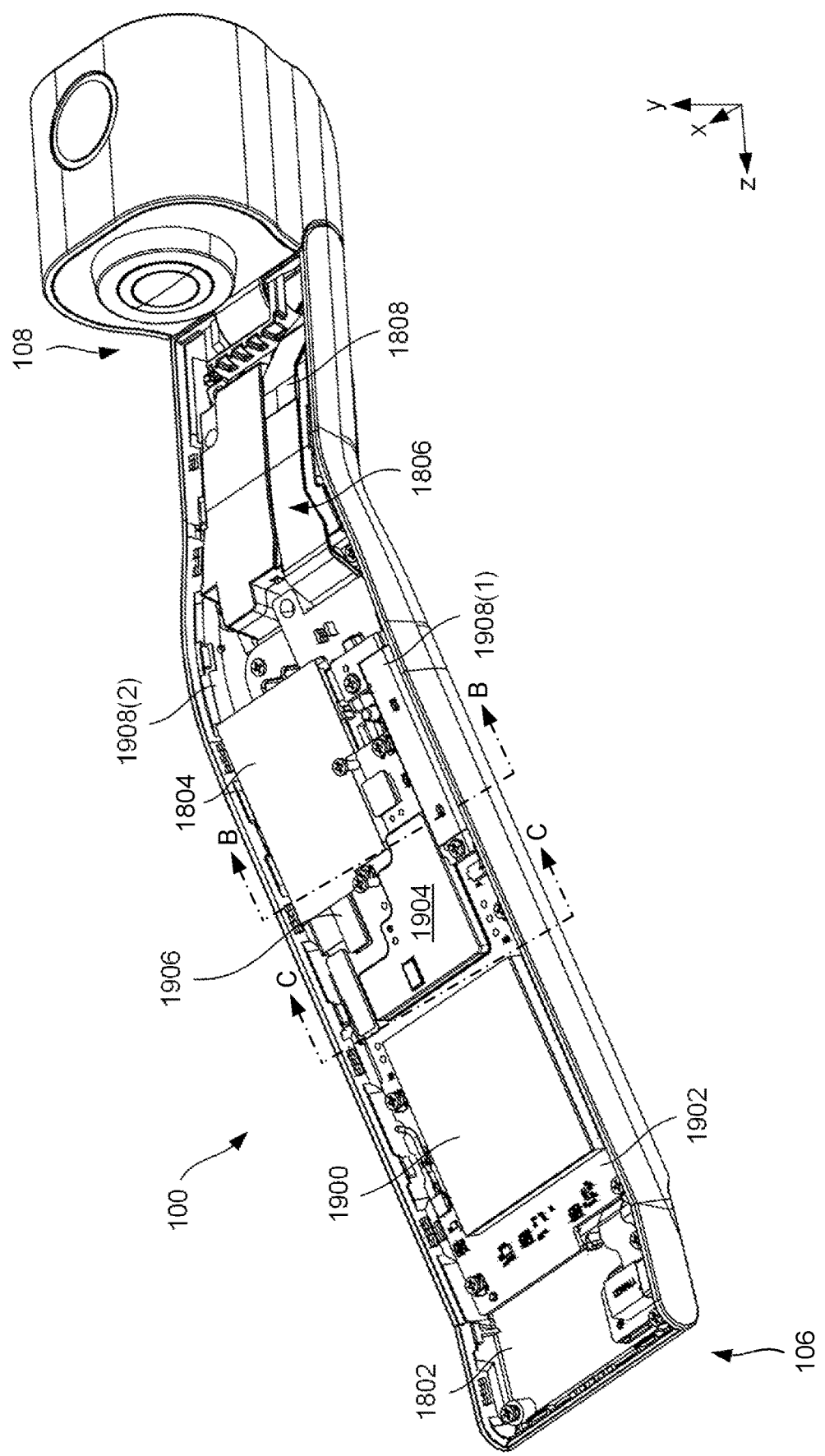
FIG. 19 illustrates example components disposed within an example body of the security camera device of FIG. 1, according to an example of the present disclosure.

FIG. 19 illustrates an interior view of the body 102, according to examples of the present disclosure. The plates 1810, as introduced above in FIG. 18, are shown removed to illustrate further components of the body 102.

The body 102 may include an LTE module 1900 communicatively coupled to the LTE antenna 1802. The LTE module 1900 and the LTE antenna 1802 are shown disposed away from the first camera 120 and the second camera 300 to reduce potential interferences. For example, the LTE antenna 1802 may be disposed closer to the first end 106, as compared to the first camera 120 and the second camera 300. Additionally, the LTE module 1900 may be disposed closer to the first end 106, as compared to the first camera 120 and the second camera 300.

The LTE module 1900 communicatively couples to a main PCB 1902 of the body 102. The main PCB 1902 may reside within a portion of the body 102 between the first end 106 and the second end 108. The main PCB 1902 may also communicatively to the port 116 and the supercapacitor 1804 for receiving and distributing power. The body 102 may include shielding plates 1904 disposed over components of the main PCB 1902 as well as other components to reduce potential interferences. Additionally, various pieces of foam 1906 may be disposed at or along the main PCB 1902 to reduce vibrations imparted to the main PCB 1902 and/or components of the body 102. In some instances, antennas may line, or be disposed along, an interior surface of the body 102. For example, a first antenna 1908(1) (e.g., LORA) may be disposed along an interior surface of the body 102, and/or a second antenna 1908(2) (e.g., Wi-Fi and/or Bluetooth) may be disposed along the interior surface of the body 102.

The FPCA 1808 is further shown routing over the loudspeaker assembly 1806, between the main PCB 1902 and computing components in the head 104. As shown, the loudspeaker assembly 1806 may reside closer to the second end 108 of the body 102 as compared to the first end 106 of the body 102.

Figure 21A:
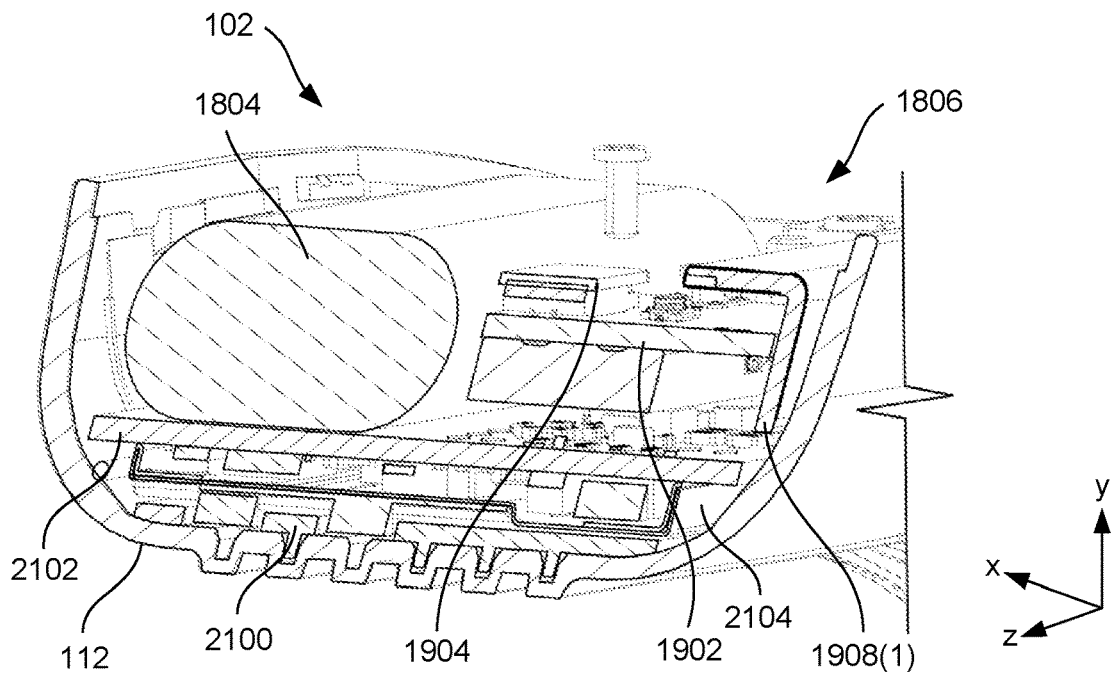
FIG. 21A illustrates a first cross-sectional view of an example body of the security camera device of FIG. 1, taken along line B-B of FIG. 19, showing example components disposed within the body, according to an example of the present disclosure.
Figure 21B:
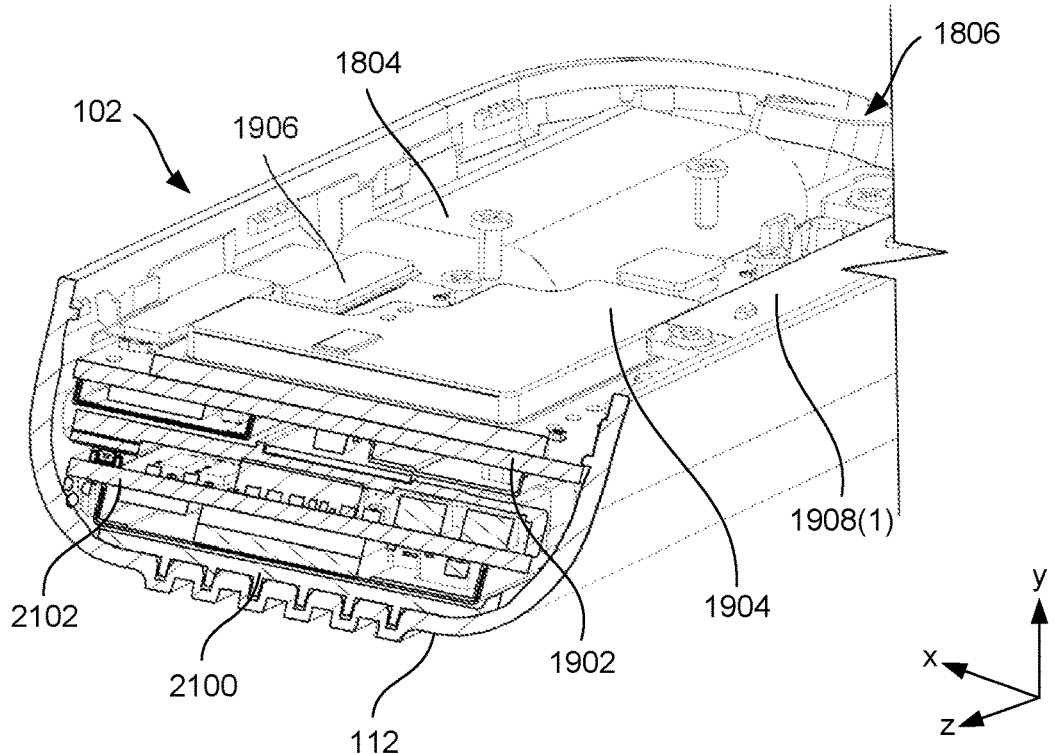
FIG. 21B illustrates a second cross-sectional view of an example body of the security camera device of FIG. 1, taken along line C-C of FIG. 19, showing example components disposed within the body, according to an example of the present disclosure.

A line B-B and a line C-C are shown, which are used to illustrate cross-sectional views of the body 102 in FIGS. 21A and 21B, respectively.

Figure 20A:
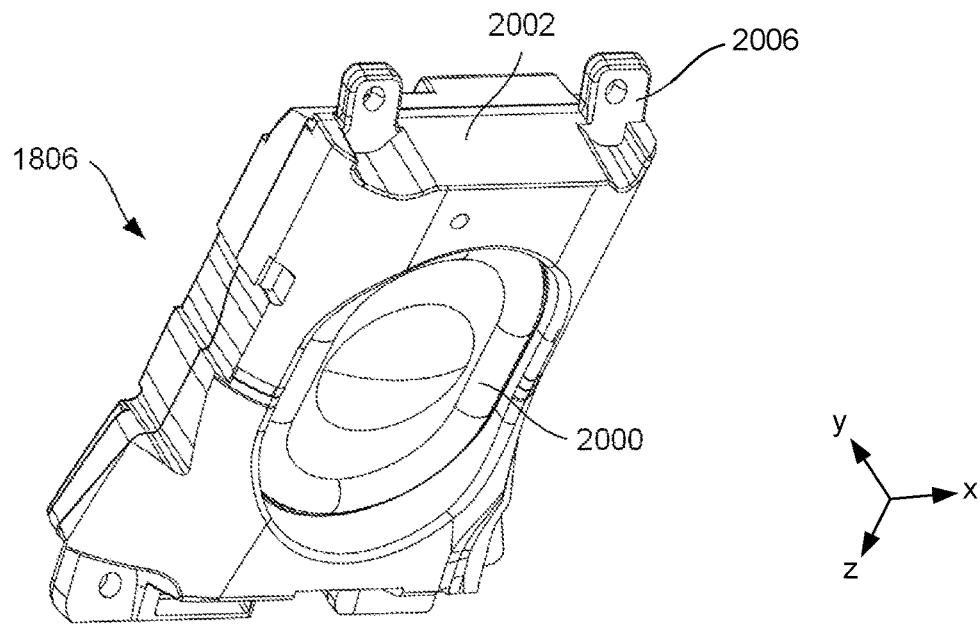
FIGS. 20A and 20B illustrate an example loudspeaker assembly of the security camera device of FIG. 1, according to an example of the present disclosure.
Figure 20B:
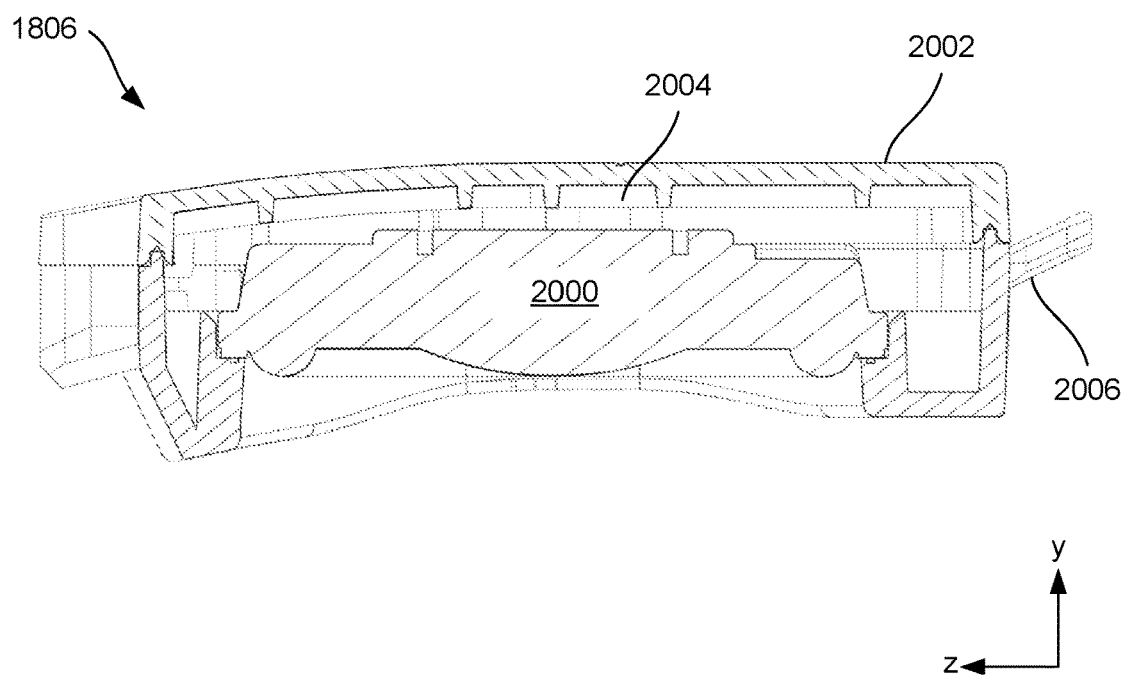

FIGS. 20A and 20B illustrate the loudspeaker assembly 1806, according to examples of the present disclosure. The loudspeaker assembly 1806 may include a loudspeaker box 2002 and a loudspeaker 2000 that resides at least partially within the loudspeaker box 2002. The loudspeaker box 2002 may provide a back volume 2004 for the loudspeaker 2000 during firing. In some instances, the loudspeaker box 2002 may be manufactured from coupling two pieces (e.g., halves, parts, etc.) together.

When coupled to the body 102, for example, the second housing 304, the loudspeaker 2000 may be oriented to emit sound towards or outwards from the bottom 112 of the body 102. The loudspeaker 2000 may fire in a direction towards the orifices 700. For example, the loudspeaker 2000 may be disposed behind the orifices 700 in the second housing 304 of the body 102 such that sound is emitted outward from the security camera device 100. The loudspeaker box 2002 may include various flanges 2006 for mounting the loudspeaker assembly 1806 to the body 102 (e.g., the second housing 304). Screws, for example, may be disposed through holes in the flanges 2006.

In some instances, the loudspeaker 2000 may be a tweeter loudspeaker, a mid-range loudspeaker, or a subwoofer loudspeaker. Although the loudspeaker assembly 1806 is described as residing at a certain location within the security camera device 100 (e.g., in the body 102), other locations are contemplated. For example, the loudspeaker assembly 1806 (or a loudspeaker) may reside within the head 104. Additionally, or alternatively, the security camera device 100 may include more than one loudspeaker.

FIGS. 21A and 21B illustrate cross-sectional views of the body 102 and components residing within the body 102, according to examples of the present disclosure. FIG. 21A is a cross-section view of the body 102 taken along line B-B of FIG. 19, while FIG. 21B is a cross-sectional view of the body 102 taken along line C-C of FIG. 19.

The computing components within the body 102 are shown being in a stacked relationship, adjacent to one another, and on top of one another to create a compact enclosure. The body 102 is shown including the supercapacitor 1804, the main PCB 1902, the first antenna 1908(1), the shielding plates 1904, the loudspeaker assembly 1806, the foam 1906, and the FPCA 1808. Given the compact nature of the components within the body 102, heat dissipating elements 2100 may be included to disperse heat away from the body 102. For example, the heat dissipating elements 2100 may residing proximate the bottom 112 of the body 102 and include fins that are disposed within the grooves 402 of the second housing 304. The heat dissipating elements 2100 may contact (e.g., abut) the computing components within the body 102 transfer the heat away from the computing components and out of the body 102.

In some instances, the body 102 may include a secondary PCB 2102 arranged between the main PCB 1902 and the heat dissipating elements 2100. However, the body 102 may include additional or alternative computing components other than those listed, and/or may be arranged differently than shown. A shielding plate 2104 may reside at least partially over a portion of, or components of, the secondary PCB 2102. Regardless, the computing components may be communicatively coupled to one another view various connections, circuits, and so forth. Various shielding plates, foams, and the like may also be distributed throughout the body 102.

FIG. 22 illustrates a cross-sectional view of the body 102 and components residing within the body 102, according to examples of the present disclosure. The body 102 is shown including the supercapacitor 1804, the main PCB 1902, the shielding plates 1904, the LTE antenna 1802, the loudspeaker assembly 1806, the secondary PCB 2102, the LTE module 1900, and the heat dissipating elements 2100.

Figure 23:
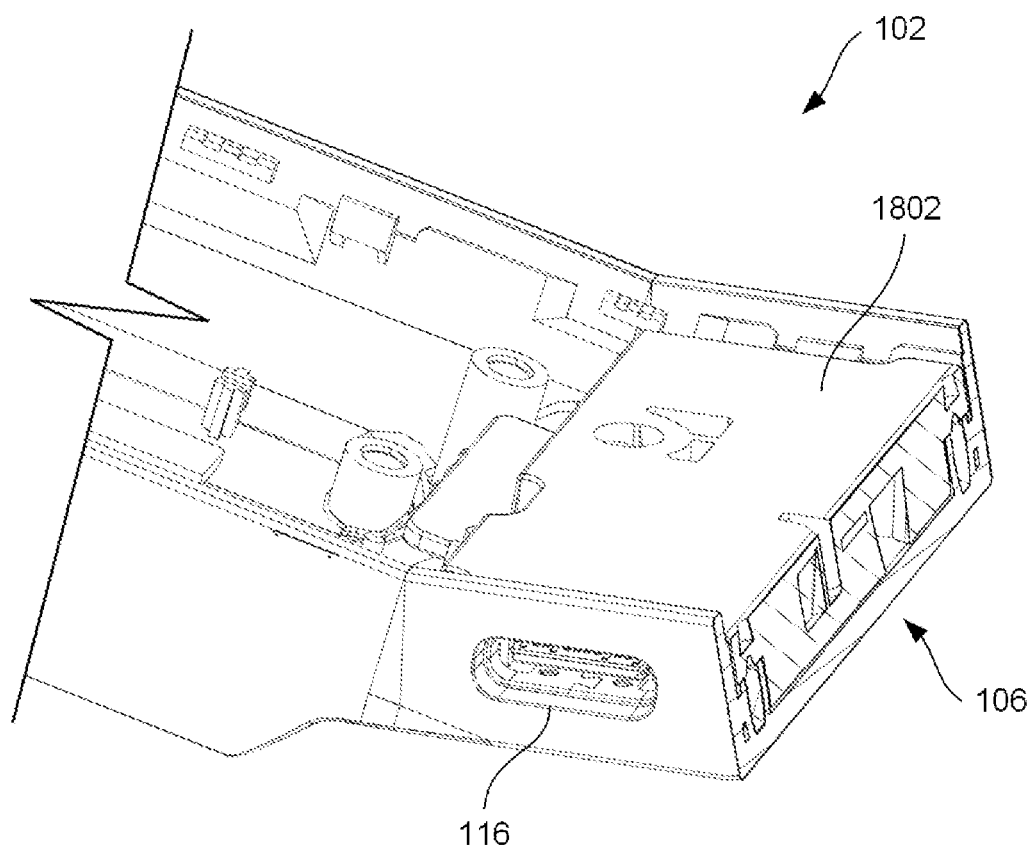
FIG. 23 illustrates example components disposed within an example body of the security camera device of FIG. 1, according to an example of the present disclosure.

FIG. 23 illustrates a view of the first end 106 of the body 102, according to examples of the present disclosure. The first end 106 includes the LTE antenna 1802 and the port 116. In some instances, placing the LTE antenna 1802 at the first end 106, spaced apart from the first camera 120 and the second camera 300, may reduce potential interferences being imparted to data sent to communicatively coupled devices (e.g., mobile device, cloud etc.) and/or data received by the communicatively coupled devices.

Figure 24A:
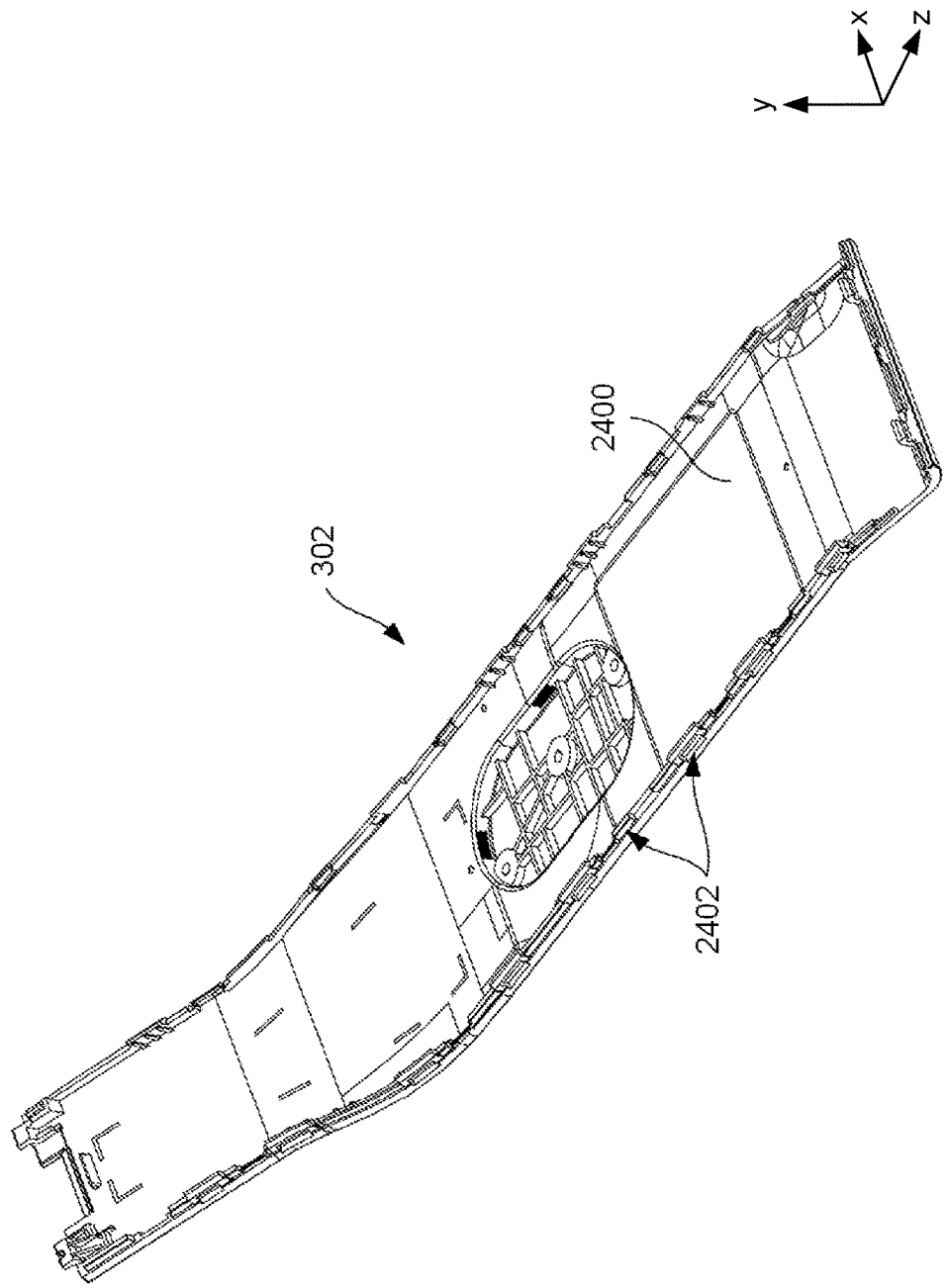
FIGS. 24A and 24B illustrate an example first housing of an example body of the security camera device of FIG. 1, according to an example of the present disclosure.
Figure 24B:
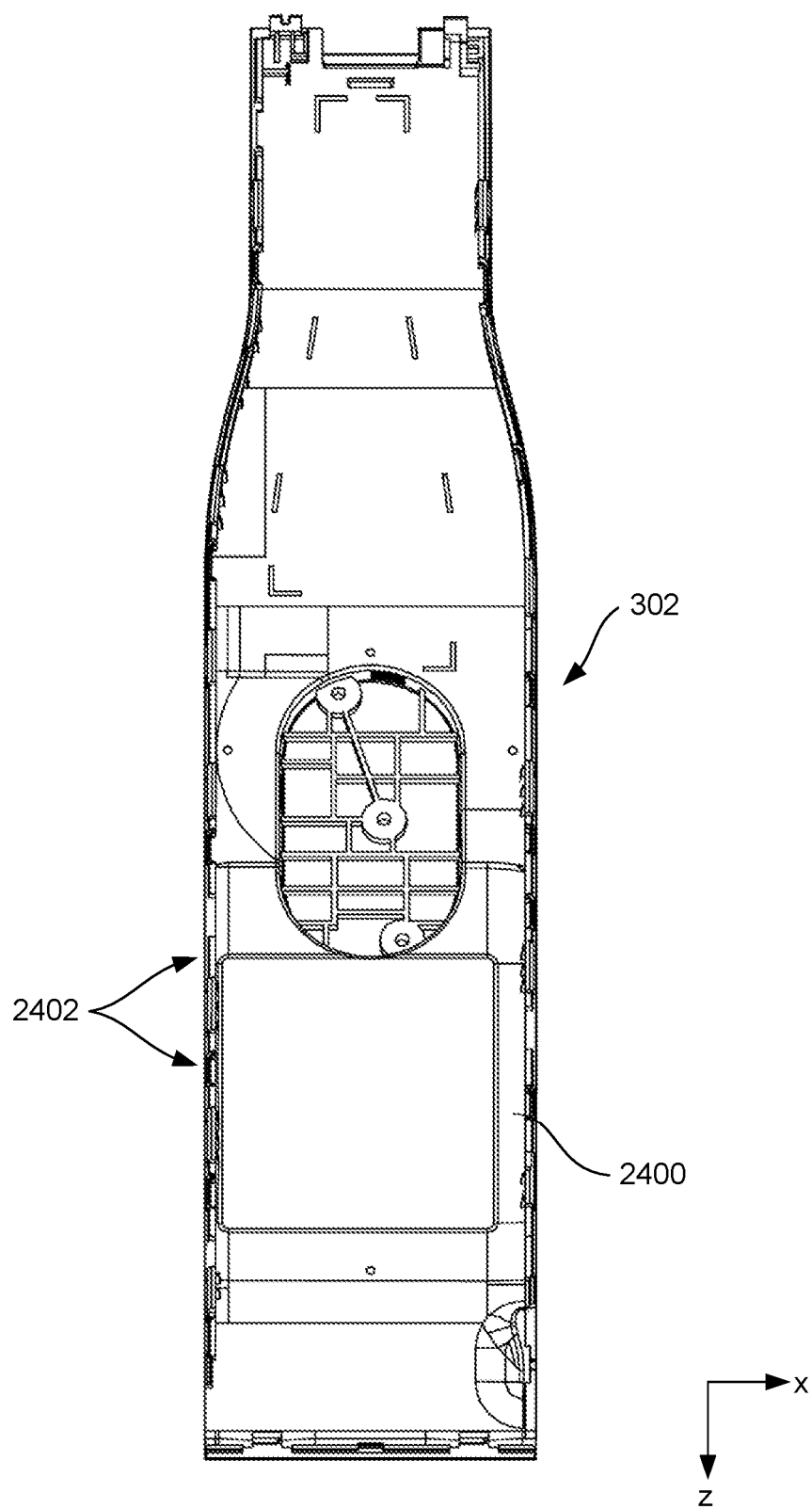

FIGS. 24A and 24B illustrate various views of the first housing 302 of the body 102, according to examples of the present disclosure. An interior surface 2400 of the first housing 302 may include first attachment mechanisms 2402 that engage or correspond to second attachment mechanisms of the second housing 304. The first attachment mechanisms 2402 may represent flanges, slots, keyways, and the like that engage with corresponding features on the second housing 304. Such engagement may secure the first housing 302 and the second housing 304 together. For example, the first attachment mechanisms 2402 and the second attachment mechanisms may snap together, slide together, or press fit together. The first attachment mechanisms 2402 may be disposed around a perimeter or periphery of the first housing 302. In some instances, adhesives or fasteners may also be used to secure the first housing 302 and the second housing 304 together. Seals and/or gaskets may also be disposed at an interface between the first housing 302 and the second housing 304.

Figure 25A:
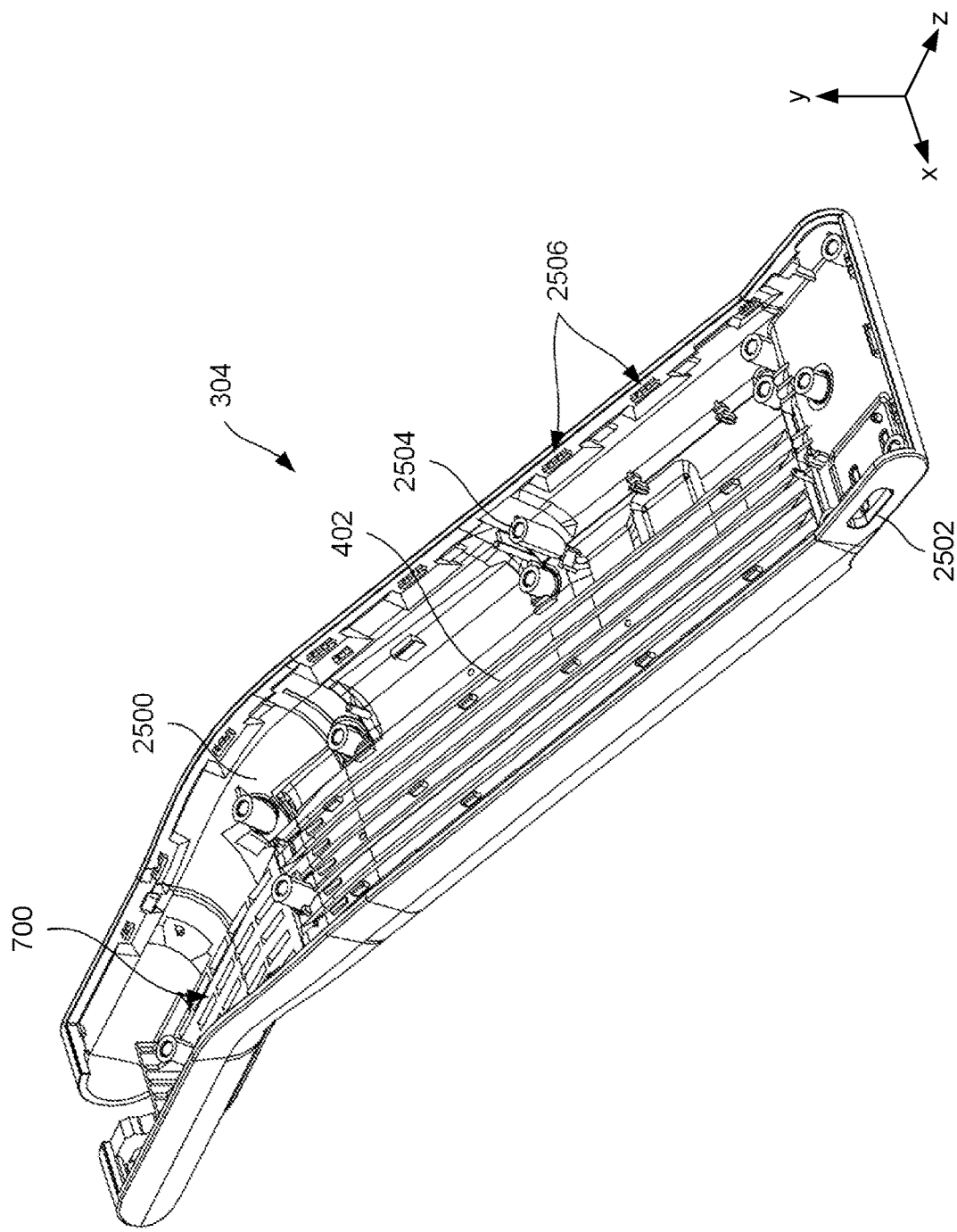
FIGS. 25A and 25B illustrate an example second housing of an example body of the security camera device of FIG. 1, according to an example of the present disclosure.
Figure 25B:
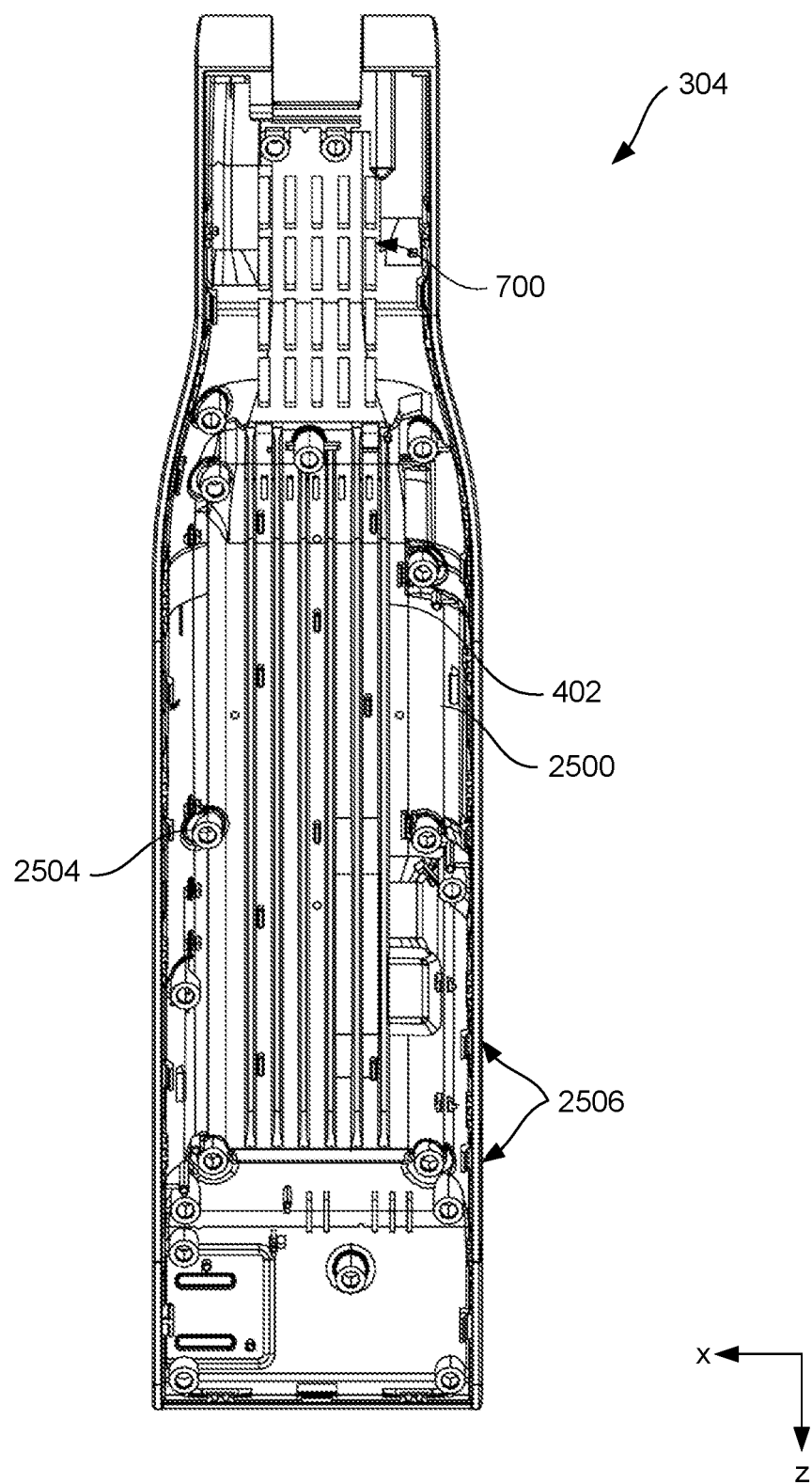

FIGS. 25A and 25B illustrate various views of the second housing 304 of the body 102, according to examples of the present disclosure. The second housing 304 includes the grooves 402 that receive the fins of the heat dissipating elements 2100 arranged along an interior surface 2500 of the second housing 304. The second housing 304 also forms the orifices 700 for dispersing sound generated by the loudspeaker 2000. A hole 2502 is formed through a sidewall of the second housing 304 for accommodating the port 116 of the security camera device 100. The interior surface 2500 may also include various posts, tabs, or prongs 2504 for receiving computing components disposed within the body 102. For example, fasteners disposed through the computing components (e.g., loudspeaker box 2002, main PCB 1902, etc.) may be received within or by the prongs 2504 to couple such components to the body 102.

The interior surface 2500 may include second attachment mechanisms 2506 that engage or correspond to first attachment mechanisms 2402 of the first housing 302. The second attachment mechanisms 2506 may represent flanges, slots, keyways, and the like that engage with corresponding features of the first attachment mechanisms 2402. Such engagement may secure the first housing 302 and the second housing 304 together. The second attachment mechanisms 2506 may be disposed around a perimeter or periphery of the second housing 304.

Figure 26:
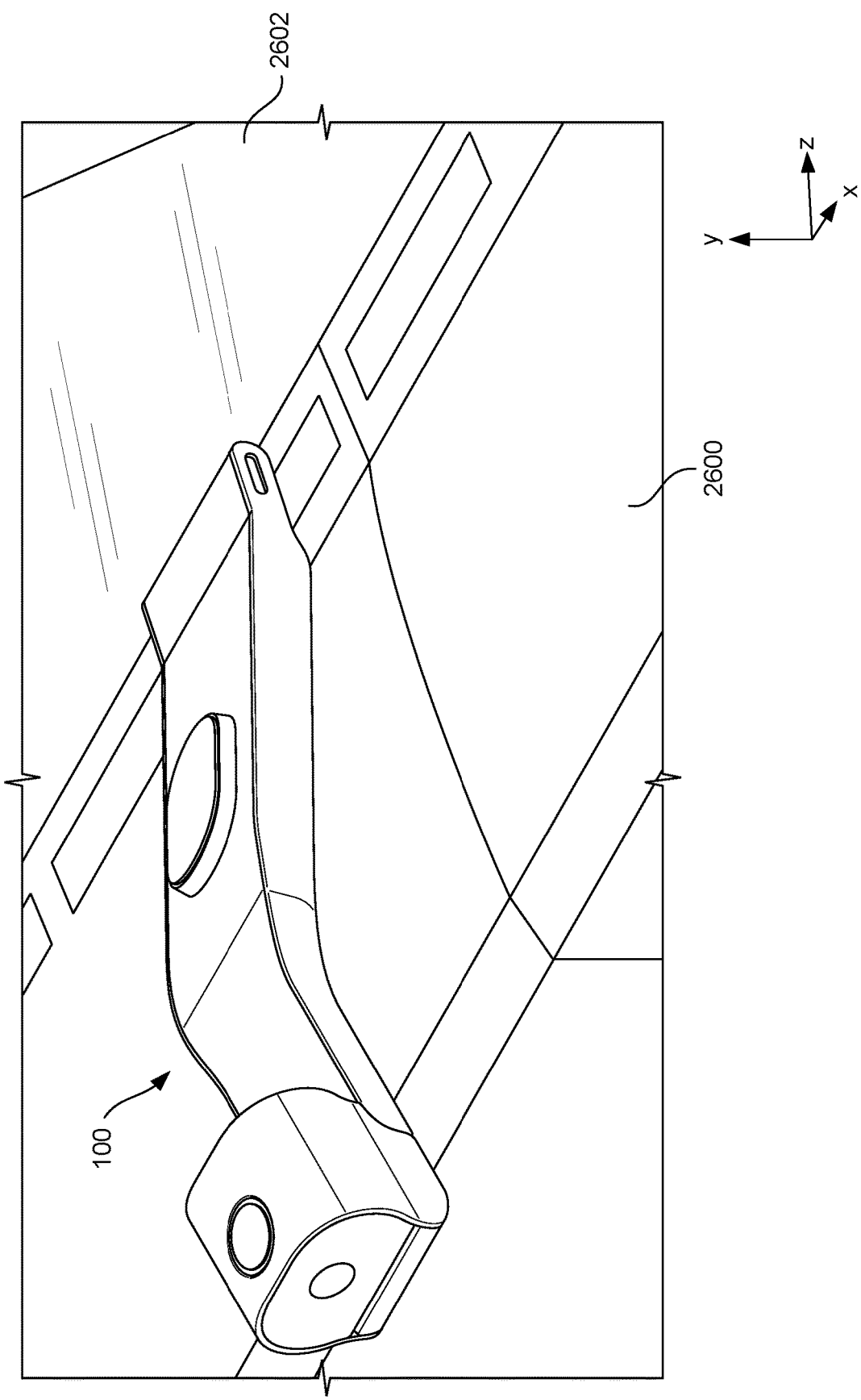
FIG. 26 illustrates the security camera device of FIG. 1 being disposed within a vehicle environment, according to an example of the present disclosure.

FIG. 26 illustrates the security camera device 100 being disposed within a vehicle, according to examples of the present disclosure. As introduced herein, the security camera device 100 may wedge between a dashboard 2600 and a windshield 2602. The first camera 120 is oriented towards an interior of the vehicle, while the second camera 300 is oriented towards an exterior of the vehicle (e.g., through the windshield 2602). The head 104 is shown disposed above the dashboard 2600 to increase a FoV of the first camera 120 and/or the second camera 300, as well as to permit the head 104 to pivot (e.g., about the x-axis). The positioning of the head 104 about the dashboard 2600 may be accomplished, at least in part, via the curvature of the body 102 between the first end 106 and the second end 108 (e.g., "s-shaped" profile).

Figure 27:
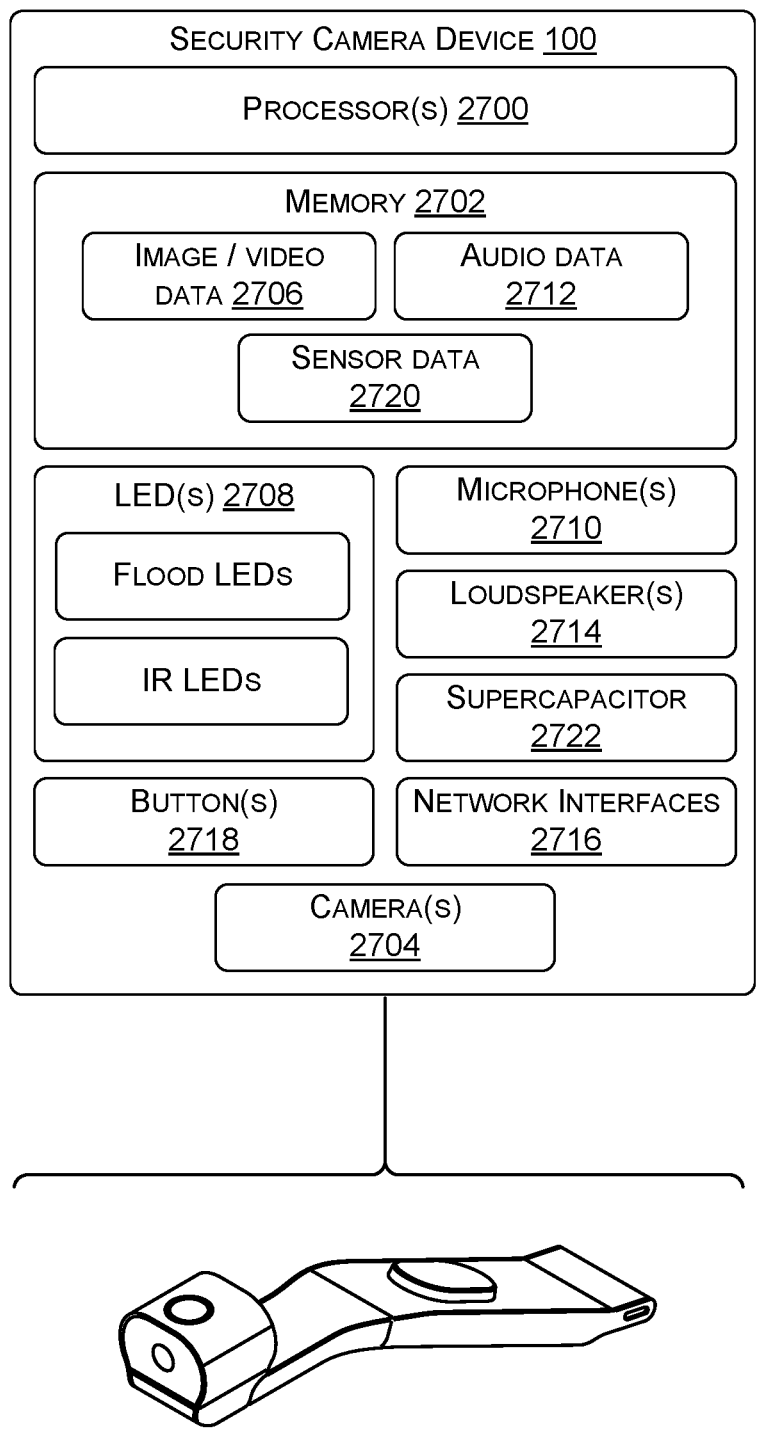
FIG. 27 illustrates select components of the security camera device of FIG. 1, according to an example of the present disclosure.

FIG. 27 illustrates select components of the security camera device 100, according to examples of the present disclosure. The security camera device 100 is shown including processor(s) 2700 and memory 2702, where the processor(s) 2700 may perform various functions associated with controlling an operation of the security camera device 100, and the memory 2702 may store instructions executable by the processor(s) 2700 to perform the operations described herein.

The security camera device 100 includes camera(s) 2704, such as an interior-facing camera and an exterior facing camera, for capturing image/video data 2706 within an interior of the vehicle and exterior to the vehicle, respectively. In some instances, the camera(s) 2704 may include red, green, blue, depth (RGBD) camera(s) and/or three-dimensional (3D) sensors.

The security camera device 100 is shown including LEDs 2708, such as the flood LEDs and/or IR LEDs, for illuminating and/or emitting light within the interior of the vehicle. Any number of flood LEDs and/or IR LEDs may be included. The LEDs 2708 may be arranged around one or more of the camera(s) 2704. In addition, the LEDs 2708 may include an LED that illuminates to indicate when the security camera device 100 is recording (e.g., audio, video, etc.).

Microphone(s) 2710 of the security camera device 100 generate audio data 2712. In some instances, the microphone(s) 2710 may be oriented towards the interior of the vehicle. Loudspeaker(s) 2714 may output sound in a direction away from the security camera device 100. Network interface(s) 2716 permit the security camera device 100 to communicate over one or more networks. Example network interface(s) include, without limitation, Wi-Fi, LORA, Bluetooth, ZigBee, Bluetooth Low Energy (BLE), LTE, and so forth. The network interface(s) 2716 permit communication with remote device(s), such as mobile devices (e.g., phone), systems (e.g., cloud), and so forth. The network(s) may be representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

In some instances, a network interface of the security camera device 100 includes one or more wireless radios. In some instances, the security camera device 100 includes a wireless radio configured to transmit and receive sub-GHz signals, e.g. at or around 900 MHz. In some instances, the security camera device 100 includes electronic components, circuitry, and/or software configured to modulate and demodulate signals in a variety of formats.

In some instances, a network interface includes a baseband processor and modulator. In some embodiments, the baseband processor and the modulator are separate integrated circuits or chipsets. In at least one embodiment, the baseband processor and the modulator reside on a common carrier substrate die of an integrated circuit. In other embodiments, the baseband processor and the modulator are disposed on a printed circuit board (PCB) along with radio frequency front-end circuitry, such as a power amplifier, the modulator, or the like. The baseband processor is operable to generate signals to radiate electromagnetic energy via one or more antennas. In some cases, the baseband processor, modulator, the power amplifier, or any combination thereof can be implemented in a wireless module, such as a chipset implementing the Wi-Fi® technology.

A wireless interface may include one or more radios specific to one or more frequency bands of interest. A processing device coupled to the baseband processor may be an application processor that implements other operations of the security camera device 100. In another embodiment, an application-specific integrated circuit (ASIC), a field-programmable gate array (FPGA), or other mixed-signal integrated circuits may be used to implement operations.

In one embodiment, the baseband processor includes one or more transceivers that can operate at 2.45 Gigahertz (GHz) and 5 GHz. The baseband processor can implement the Wi-Fi® technology. It should be noted that the Wi-Fi® technology is the industry name for wireless local area network communication technology related to the IEEE 802.11 family of wireless networking standards by Wi-Fi Alliance. For example, a dual-band WLAN RF transceiver allows an electronic device to exchange data or connect to the Internet using radio waves in two WLAN bands (2.4 GHz band, 5 GHz band) via one or multiple antennas. For example, a dual-band WLAN RF transceiver includes a 5 GHz WLAN channel and a 2.4 GHz WLAN channel. The WLAN radio may include additional transceivers that operate in the 2.45 GHZ, 5 GHZ, or both.

In some instances, another wireless module includes a transceiver that also operates at 2.4 GHz and may implement the Bluetooth® technology or the Zigbee® technology. Various radios can be individual chipsets, even chipsets provided by different vendors. Different radios may be implemented in the same chipset or on a common carrier substrate with a processing device, such as a System on Chip (SoC) architecture. In another embodiment, other wireless radios may be used to implement other technologies, such as the LTE technology, or the like. For example, wireless circuitry may include other radios, such as a wireless area network (WAN) radio, personal area network (PAN) radio, Global Navigation satellite system (GNSS) radio (e.g., global positioning system (GPS) radio), or the like. In other embodiments, the antenna architecture may include additional wireless radios and/or other communication modules, such as a WLAN radio, a GPS receiver, a near field communication (NFC) radio, an amplitude modulation (AM) radio receiver, a frequency modulation (FM) radio receiver, a Bluetooth® radio, Zigbee® radio, a GNSS receiver, or the like. The wireless circuitry may also include receivers and/or transmitters, filters, amplifiers, mixers, switches, and/or other electrical components. The wireless circuitry may be coupled to a modem that allows the user device to handle both voice and non-voice communications (such as communications for text messages, multi-media messages, media downloads, web browsing, etc.) with a wireless communication system. The modem may provide network connectivity using any type of digital mobile network technology, including, for example, LTE, LTE advanced (4G), CDPD, GPRS, EDGE, UMTS, Rett, EVDO, HSDPA, WLAN (e.g., Wi-Fi® network), 5G, etc. The modem can use wireless circuitry to radiate electromagnetic energy on one or more antennas to communicate data to and from the device in the respective frequency ranges. In other embodiments, the modem may communicate according to different communication types (e.g., WCDMA, GSM, LTE, CDMA, WiMAX, etc.) in different cellular networks. It should be noted that radiation enables the functionality of both transmitting and receiving data using reciprocity.

Button(s) 2718 may control an operation of the security camera device 100, such as power button, a wireless connectivity button, a mute button, volume buttons, sync buttons, or any other type of button or control. The button(s) 2718, may in some instances, be multi-function buttons. The button(s) 2718 may be mechanical (e.g., having physically movable components) and/or electronic (e.g., capacitive sensors, optical sensors, touch screen, or the like). A supercapacitor 2722 may store energy for use by the security camera device 100. For example, when the vehicle is turned off, energy stored within the supercapacitor 2722 may power components of the security camera device 100. In some instances, the security camera device 100 includes a battery, e.g. a rechargeable Lithium-ion battery.

In some instances, the security camera device 100 include one or more computer readable media containing computer executable instructions for detecting and responding to various events. In some instances, the security camera device 100 include one or more computer readable media containing computer executable instructions representing event module software for responding to various events.

Although certain components of the security camera device 100 are illustrated, it is to be understood that the security camera device 100 may include additional or alternative components. For example, the security camera device may include additional sensor(s) (e.g., accelerometer, gyroscope, etc.) that generate sensor data 2720, other input/output devices (e.g., display screen), heat dissipating elements, computing components (e.g., PCBs), antennas, ports (e.g., USB), and so forth.

As used herein, a processor, such as the processor(s) 2700 may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory, such as the memory 2702 may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Figure 28:
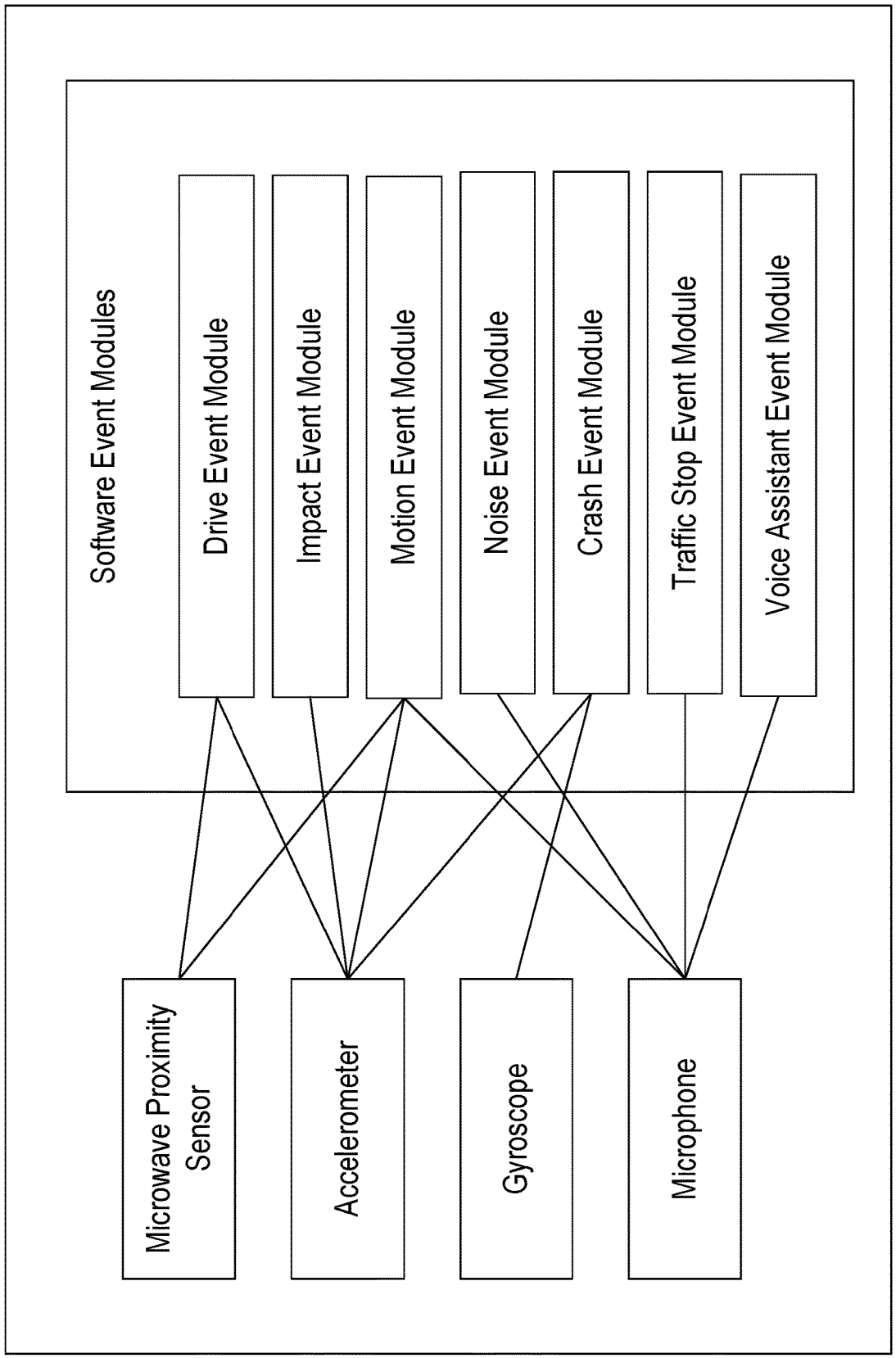
FIG. 28 illustrates exemplary software event modules of the security camera device of FIG. 1, according to an example of the present disclosure.

FIG. 28 illustrates exemplary software event modules of the security camera device 100. FIG. 28 illustrations exemplary connection of these software event modules to sensors for which data is used by the connected software event module. In some instances, functionality of these modules may be implemented in more or less modules.

In some instances, the security camera device 100 includes one or more computer readable media containing computer executable instructions representing a drive event module including a drive start algorithm. In some instances, a drive start algorithm determines that a vehicle has started driving based on a MPS or accelerometer data, such as based on comparing data to one or more thresholds or based on an output of a machine learning model taking as input MPS and/or accelerometer data. In some instances, a drive start algorithm determines that a vehicle has started driving based on onboard diagnostic system data. In some instances, an engine on algorithm determines that an engine has been turned on based on accelerometer or microwave proximity sensor data, or based on on-board diagnostic system data.

In some instances, the security camera device 100 includes one or more computer readable media containing computer executable instructions representing an impact event module including an impact event algorithm. In some instances, an impact event algorithm determines that an impact event has occurred (e.g., that an object has run into or fallen onto a vehicle) based on accelerometer data exceeding a threshold. In some instances, the security camera device 100 includes one or more computer readable media containing computer executable instructions representing a motion event module including a motion event algorithm. In some instances, a motion event algorithm determines that a motion event has occurred (e.g. motion within an interior of a vehicle, motion exterior to a vehicle, person opening or closing a door of a vehicle, etc.) based on the MPS, accelerometer, and/or microphone data, such as based on comparing data to one or more thresholds or based on an output of a machine learning model taking as input the MPS, accelerometer, and/or audio data.

In some instances, the security camera device 100 includes one or more computer readable media containing computer executable instructions representing a crash event module including a crash event algorithm. In some instances, a crash event algorithm determines that a crash event has occurred based on accelerometer, microphone, or gyroscope data, such as based on comparing data to one or more thresholds or based on an output of a machine learning model taking as input accelerometer, gyroscope, and/or audio data.

In some instances, the security camera device 100 includes one or more computer readable media containing computer executable instructions representing a loud noise event module including a noise event algorithm. In some instances, a noise event algorithm determines that a noise event has occurred based on microphone data, such as based on comparing data to one or more thresholds or based on an output of a machine learning model taking as input audio data.

In some instances, the security camera device 100 includes one or more computer readable media containing computer executable instructions representing a traffic stop event module including a wakeword engine. In some instances, a wakeword engine determines that a user has indicated that a traffic stop is occurring, such as by saying "Alexa record".

Speech processing systems and speech generation systems can be combined with other services to create virtual "assistants" that a user can interact with using natural language inputs such as speech, text inputs, or the like. The assistant can leverage different computerized voice-enabled technologies. Automatic speech recognition (ASR) is a field of computer science, artificial intelligence, and linguistics concerned with transforming audio data associated with speech into text or other type of word representative data of that speech. Similarly, natural language understanding (NLU) is a field of computer science, artificial intelligence, and linguistics concerned with enabling computers to derive meaning from text or other natural language meaning representation data. ASR and NLU may be used together as part of a speech processing system, sometimes referred to as a spoken language understanding (SLU) system. Text-to-speech (TTS) is a field of computer science concerning transforming textual and/or other meaning representation data into audio data that is synthesized to resemble human speech. ASR, NLU, and TTS may be used together to act as a virtual assistant that can respond to spoken commands and respond with synthesized speech. For example, an audio-controlled user device and/or one or more speech-processing systems may be configured to receive human speech and detect a wakeword used to activate the device and/or other natural language input. The device and/or system may determine a command represented by the user input, and use TTS and/or other system command to provide a response (e.g., in the form of synthesized speech, command to send audio to a different device/system component, etc.).

Speech-processing systems may be configured to determine when a user input requests control of a device process. A device process may involve controlling a process that involves some action to be performed by a device. Such a device process control may include, for example, starting/stopping a timer, setting/stopping an alarm, playing/stopping media content (such as a song, video, podcast, etc.), controlling output content (such as skipping a song, going back a song, extending/snoozing a timer/alarm, stopping synthesized speech output, etc.), setting a temperature (for example if a device may operate as a thermostat), activating/deactivating a component of the device (such as a camera, light, etc.), controlling a device setting (such as volume, brightness, sensitivity, etc.), setting/controlling a reminder, initiating/controlling/terminating a call or call request, or the like. A device process control may thus control a device to transition from a first state (e.g., outputting audio, showing something on a display) to a second state (e.g., ceasing output of audio, outputting audio at a different volume, showing something else on the display, removing something from the display, etc.).

Although sometimes referred to herein as "speech-processing systems", such systems may also be considered natural language processing systems in that they may be configured to process natural language inputs that may not necessarily be spoken and may be input using some other method such as text inputs to an application (or the like) where the application may correspond to a particular assistant/system. Thus, inputs and outputs from the device need not be in (or represent) spoken language. In some implementations, the user may be able to input natural language inputs via text, braille, American Sign Language (ASL), etc., depending on system configuration. Other inputs to trigger a processing system are also possible, such as an acoustic event (e.g., baby crying, footsteps), a button press, etc.

The device may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The device and techniques can be implemented on a geographic basis to ensure compliance with laws in various jurisdictions and entities in which the components of the system and/or user are located.

In some instances, the security camera device 100 is configured to utilize a natural language/speech processing system and form part of a virtual assistant system. The security camera device 100 may receive audio corresponding to a spoken natural language input originating from a user (not illustrated). The security camera device 100 may process audio following detection of a wakeword. A wakeword may be a word or phrase that, when detected, may cause the security camera device 100 to invoke a speech-processing system for processing audio data that accompanies or includes the wakeword. The wakeword may be specific to a particular speech-processing system. Thus if the security camera device 100 detects a first wakeword it may route data corresponding to the speech to a first speech-processing system while if the security camera device 100 detects a second wakeword the security camera device 100 may route data corresponding to the speech to a second speech-processing system. The security camera device 100 may also be configured to detect any number of wakewords having any correlation with the set of available speech-processing systems such that no wakeword is associated with more than one speech-processing system. The security camera device 100 may generate audio data corresponding to the audio/speech, and may send the audio data to the first system and/or the second system. The security camera device 100 may send the audio data to the systems via one or more applications installed on the security camera device 100. An example of such an application is the Amazon Alexa application. In some implementations, the security camera device 100 may receive text data corresponding to a natural language input originating from the user, and send the text data to one of the systems. The security camera device 100 may receive output data from the system, and generate a synthesized speech output and/or perform some action. The security camera device 100 may include a camera for capturing image and/or video data for processing by the systems.

The security camera device 100 may include supporting components of local and/or remote system(s) such as a group of computing components located geographically remote from the security camera device 100 but accessible via a network (for example, servers accessible via the internet). The security camera device 100 may also include a remote system that is physically separate from the security camera device 100 but located geographically close to the security camera device 100 and accessible via a network (for example a home server located in a same residence as the security camera device 100). However, some combination thereof, for example where certain components/operations are performed via on device components or others are performed via a geographically remote server(s). Although the figures and discussion of the present disclosure illustrate certain steps in a particular order, the steps described may be performed in a different order (as well as certain steps removed or added) without departing from the present disclosure.

The security camera device 100 may include a microphone for receiving audio and a speaker for emitting audio. The security camera device 100 may include one or more wakeword detectors capable of detecting one or more wakewords. In some implementations, a wakeword detector may be embedded in a processor chip; for example, a digital signal processor (DSP). In some implementations, a wakeword detector may be an application-driven software component. In certain instances a single wakeword detector may be capable of detecting multiple wakewords for more than one system. In other instances the security camera device 100 may include multiple wakeword detectors, such as a first wakeword detector and a second wakeword detector, each capable of detecting its own wakeword. For example, a first wakeword detector may detect one or more wakewords associated with the first system, and a second wakeword detector may detect one or more wakewords associated with the second system.

The security camera device 100 may include one or more assistant components including the first assistant component and the second assistant component. The assistant component(s) may interface with one or more of the systems. In an example system, the first assistant component communicates with the first system, and the second assistant component communicates with the second system. In some implementations, a single assistant component may handle communications with more than one system. The security camera device 100 may have a dedicated assistant component for a system, or a single assistant component communicating with all systems.

The security camera device 100 may also include a set of components to store/track state data. As noted below, state data can be separately tracked and maintained by each assistant component. Such state data may indicate the state of the security camera device 100 (and/or a user profile corresponding to the security camera device 100) and may correspond to one or more processes of the device. Examples of state data may include volume level, data indicating what is being shown on a display, time data, network access data, timer status, or the like. The state data may be stored on the security camera device 100 or potentially on another device such as a remote device, home server, or the like.

The systems may include various components for processing natural language commands. A system may include a language processing component for performing operations related to understanding natural language such as ASR, NLU, entity resolution, etc. The system may include a language output component for performing operations related to generating a natural language output, such as TTS. The system may also include a component to track system state data. Such system state data may indicate the state of operations of the respective system for example with respect to the security camera device 100, user profile, or the like. For example, state data may include dialog data, indications of previous utterance(s), whether the system has any ongoing processes for the security camera device 100/user profile, or the like. The system may include one or more skill components. The skill components may perform various operations related to executing commands such as online shopping, streaming media, controlling smart-home appliances, and the like.

One of the skills available to the system may include a device skill. Such a device skill may be configured to handle and manage specific utterances that involve controlling a device process or a device state. Each system may have its own device skill and/or a central device skill may be accessible to multiple systems. Each device skill may be associated with its own skill processing components (discussed below).

A device skill may be configured to communicate with the security camera device 100 through the assistant component(s). Thus the device skill may send commands to control the security camera device 100 through the assistant component(s).

The microphone may receive an audio signal and send audio data to the wakeword detector. The audio data may represent, for example, a natural language command such as: "Alexa, set a timer for 10 minutes." The wakeword detector may detect the wakeword "Alexa," corresponding with the first speech-processing system and the first assistant component. The wakeword detector may provide a notification to another component that the first wakeword was detected in the input.

In some implementations, the security camera device 100 may receive input data in other formats, such as typed or scanned text, braille, or American Sign Language (ASL) (for example as detected by processing image data and/or sensor data representing a user communicating in ASL). The security camera device 100 may determine that the input data is to be processed by the first system based on other indications, such as a button press or because the first system represents a default system for executing commands from the security camera device 100.

The security camera device 100 may operate using various components. The various components may be located on same or different physical devices. Communication between various components may occur directly or across a network(s). The security camera device 100 may include audio capture component(s), such as a microphone or array of microphones of the security camera device 100, captures audio and creates corresponding audio data. Once speech is detected in audio data representing the audio, the security camera device 100 may determine if the speech is directed at the security camera device 100/system. In at least some embodiments, such determination may be made using a wakeword detection component. The wakeword detection component may be configured to detect various wakewords. In at least some examples, a wakeword may correspond to a name of a different digital assistant. An example wakeword/digital assistant name is "Alexa." In another example, input to the system may be in form of text data, for example as a result of a user typing an input into a user interface of the security camera device 100. Other input forms may include indication that the user has pressed a physical or virtual button on the security camera device 100, the user has made a gesture, etc. The security camera device 100 may also capture images using camera(s) of the security camera device 100 and may send image data representing those image(s) to the system. The image data may include raw image data or image data processed by the security camera device 100 before sending to the system.

The wakeword detector of the security camera device 100 may process the audio data, representing the audio, to determine whether speech is represented therein. The security camera device 100 may use various techniques to determine whether the audio data includes speech. In some examples, the security camera device 100 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the security camera device 100 may implement a classifier configured to distinguish speech from background noise. The classifier may be implemented by techniques such as linear classifiers, support vector machines, and decision trees. In still other examples, the security camera device 100 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection may be performed without performing linguistic analysis, textual analysis, or semantic analysis. Instead, the audio data, representing the audio, is analyzed to determine if specific characteristics of the audio data match pre-configured acoustic waveforms, audio signatures, or other data corresponding to a wakeword.

Thus, the wakeword detection component may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detector and/or input is detected by an input detector, the security camera device 100 may "wake" and begin transmitting audio data, representing the audio, to the system(s). The audio data may include data corresponding to the wakeword; in other embodiments, the portion of the audio corresponding to the wakeword is removed by the security camera device 100 prior to sending the audio data to the system(s). In the case of touch input detection or gesture based input detection, the audio data may not include a wakeword.

In some implementations, the security camera device 100 may include more than one system. The systems may respond to different wakewords and/or perform different categories of tasks. A system may be associated with its own wakeword such that speaking a certain wakeword results in audio data be sent to and processed by a particular system. For example, detection of the wakeword "Alexa" by the wakeword detector may result in sending audio data to system for processing while detection of the wakeword "Mandy" by the wakeword detector may result in sending audio data to system for processing. The system may have a separate wakeword and system for different skills/systems (e.g., "Dungeon Master" for a game play skill/systemc) and/or such skills/systems may be coordinated by one or more skill(s) of one or more systems.

Upon receipt by the system(s), the audio data may be sent to an orchestrator component. The orchestrator component may include memory and logic that enables the orchestrator component to transmit various pieces and forms of data to various components of the system, as well as perform other operations as described herein.

The orchestrator component may send the audio data to a language processing component. The language processing component (sometimes also referred to as a spoken language understanding (SLU) component) includes an automatic speech recognition (ASR) component and a natural language understanding (NLU) component. The ASR component may transcribe the audio data into text data. The text data output by the ASR component represents one or more than one (e.g., in the form of an N-best list) ASR hypotheses representing speech represented in the audio data. The ASR component interprets the speech in the audio data based on a similarity between the audio data and pre-established language models. For example, the ASR component may compare the audio data with models for sounds (e.g., acoustic units such as phonemes, senons, phones, etc.) and sequences of sounds to identify words that match the sequence of sounds of the speech represented in the audio data. The ASR component sends the text data generated thereby to an NLU component, via, in some embodiments, the orchestrator component. The text data sent from the ASR component to the NLU component may include a single top-scoring ASR hypothesis or may include an N-best list including multiple top-scoring ASR hypotheses. An N-best list may additionally include a respective score associated with each ASR hypothesis represented therein.

The speech processing system may further include a NLU component. The NLU component may receive the text data from the ASR component. The NLU component may attempts to make a semantic interpretation of the phrase(s) or statement(s) represented in the text data input therein by determining one or more meanings associated with the phrase(s) or statement(s) represented in the text data. The NLU component may determine an intent representing an action that a user desires be performed and may determine information that allows a device (e.g., the security camera device 100, the system(s), a skill component, skill processing component(s), etc.) to execute the intent. For example, if the text data corresponds to "play the$^{th}$ Symphony by Beethoven," the NLU component may determine an intent that the system output music and may identify "Beethoven" as an artist/composer and "5th Symphony" as the piece of music to be played. For further example, if the text data corresponds to "what is the weather," the NLU component may determine an intent that the system output weather information associated with a geographic location of the security camera device 100. In another example, if the text data corresponds to "turn off the lights," the NLU component may determine an intent that the system turn off lights associated with the security camera device 100 or the user.

A skill component may be software running on the system(s) that is akin to a software application. That is, a skill component may enable the system(s) to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system(s) may be configured with more than one skill component. For example, a weather service skill component may enable the system(s) to provide weather information, a car service skill component may enable the system(s) to book a trip with respect to a taxi or ride sharing service, a restaurant skill component may enable the system(s) to order a pizza with respect to the restaurant's online ordering system, etc. A skill component may operate in conjunction between the system(s) and other devices, such as the security camera device 100, in order to complete certain functions. Inputs to a skill component may come from speech processing interactions or through other interactions or input sources. A skill component may include hardware, software, firmware, or the like that may be dedicated to a particular skill component or shared among different skill components.

Skill processing component(s) may communicate with a skill component(s) within the system(s) and/or directly with the orchestrator component or with other components. A skill processing component(s) may be configured to perform one or more actions. An ability to perform such action(s) may sometimes be referred to as a "skill." That is, a skill may enable a skill processing component(s) to execute specific functionality in order to provide data or perform some other action requested by a user. For example, a weather service skill may enable a skill processing component(s) to provide weather information to the system(s), a car service skill may enable a skill processing component(s) to book a trip with respect to a taxi or ride sharing service, an order pizza skill may enable a skill processing component(s) to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system(s) may be configured with a skill component dedicated to interacting with the skill processing component(s). Unless expressly stated otherwise, reference to a skill, skill device, or skill component may include a skill component operated by the system(s) and/or skill operated by the skill processing component(s). Moreover, the functionality described herein as a skill or skill may be referred to using many different terms, such as an action, bot, app, or the like. The skill and or skill processing component(s) may return output data to the orchestrator.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems may recognize, retain, and use information collected during more than one input during a back-and-forth or "multi-turn" interaction with the user; for example, information regarding a language in which a dialog is being conducted.

The system may include a dialog manager component that manages and/or tracks a dialog between a user and a device, and in some cases between the user and one or more systems. As used herein, a "dialog" may refer to data transmissions (such as relating to multiple user inputs and system outputs) between the system and a user (e.g., through device(s)) that all relate to a single "conversation" between the system and the user that may have originated with a single user input initiating the dialog. Thus, the data transmissions of a dialog may be associated with a same dialog identifier, which may be used by components of the overall system to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier. Further, other non-natural language inputs (e.g., image data, gestures, button presses, etc.) may relate to a particular dialog depending on the context of the inputs. For example, a user may open a dialog with the system to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The dialog manager component may associate a dialog session identifier with the dialog upon identifying that the user is engaging in a dialog with the user. The dialog manager component may track a user input and the corresponding system generated response to the user input as a turn. The dialog session identifier may correspond to multiple turns of user input and corresponding system generated response. The dialog manager component may transmit data identified by the dialog session identifier directly to the orchestrator component or other component. Depending on system configuration the dialog manager may determine the appropriate system generated response to give to a particular utterance or user input of a turn. Or creation of the system generated response may be managed by another component of the system (e.g., the language output component, NLG, orchestrator, etc.) while the dialog manager selects the appropriate responses. Alternatively, another component of the system(s) may select responses using techniques discussed herein. The text of a system generated response may be sent to a TTS component for creation of audio data corresponding to the response. The audio data may then be sent to a user device (e.g., the security camera device 100) for ultimate output to the user. Alternatively (or in addition) a dialog response may be returned in text or some other form.

The dialog manager may receive the ASR hypothesis/hypotheses (i.e., text data) and make a semantic interpretation of the phrase(s) or statement(s) represented therein. That is, the dialog manager determines one or more meanings associated with the phrase(s) or statement(s) represented in the text data based on words represented in the text data. The dialog manager determines a goal corresponding to an action that a user desires to be performed as well as pieces of the text data that allow a device (e.g., the security camera device 100, the system(s), a skill, a skill processing component(s), etc.) to execute the intent. If, for example, the text data corresponds to "what is the weather," the dialog manager may determine that that the system(s) is to output weather information associated with a geographic location of the security camera device 100. In another example, if the text data corresponds to "turn off the lights," the dialog manager may determine that the system(s) is to turn off lights associated with the device(s) or the user(s).

The dialog manager may send the results data to one or more skill(s). If the results data includes a single hypothesis, the orchestrator component may send the results data to the skill(s) associated with the hypothesis. If the results data includes an N-best list of hypotheses, the orchestrator component may send the top scoring hypothesis to a skill(s) associated with the top scoring hypothesis.

The system includes a language output component. The language output component includes a natural language generation (NLG) component and a text-to-speech (TTS) component. The NLG component can generate text for purposes of TTS output to a user. For example the NLG component may generate text corresponding to instructions corresponding to a particular action for the user to perform. The NLG component may generate appropriate text for various outputs as described herein. The NLG component may include one or more trained models configured to output text appropriate for a particular input. The text output by the NLG component may become input for the TTS component (e.g., output text data discussed below). Alternatively or in addition, the TTS component may receive text data from a skill or other system component for output.

The NLG component may include a trained model. The NLG component generates text data from dialog data received by the dialog manager such that the output text data has a natural feel and, in some embodiments, includes words and/or phrases specifically formatted for a requesting individual. The NLG may use templates to formulate responses. And/or the NLG system may include models trained from the various templates for forming the output text data. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component.

The TTS component may generate audio data (e.g., synthesized speech) from text data using one or more different methods. Text data input to the TTS component may come from a skill component, the orchestrator component, or another component of the system. In one method of synthesis called unit selection, the TTS component matches text data against a database of recorded speech. The TTS component selects matching units of recorded speech and concatenates the units together to form audio data. In another method of synthesis called parametric synthesis, the TTS component varies parameters such as frequency, volume, and noise to create audio data including an artificial speech waveform. Parametric synthesis uses a computerized voice generator, sometimes called a vocoder. The TTS component may be capable of generating output audio representing natural language speech in one or more natural languages (e.g., English, Mandarin, French, etc.).

The system (either on the security camera device 100, system, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on the security camera device 100, the user profile (associated with the presented login information) may be updated to include information about the security camera device 100, for example with an indication that the device is currently in use. Each user profile may include identifiers of skills that the user has enabled. When a user enables a skill, the user may give the system permission to allow the skill to execute with respect to the user's natural language user inputs. If a user does not enable a skill, the system may not invoke the skill to execute with respect to the user's natural language user inputs.

The profile storage may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The profile storage may include data corresponding to state data. For example, the profile storage may indicate the device process control capabilities of one or more devices associated with a particular user profile. Such state data may be updated by one or more device(s) as user(s) interact with the device(s) to maintain an updated record of the state of the device. Alternatively (or in addition) the profile storage may include, for a particular user profile, state data reflecting capability data indicating the device process control operations that may be performed by the security camera device 100.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A security device, comprising:
    a body including:
        one or more orifices, and
        a speaker configured to output sound through the one or more orifices; and
    a head pivotably coupled to the body, the head including:
        a front,
        a back opposite the front,
        a top,
        a first camera disposed on the front and facing a first direction,
        a second camera disposed on the back and facing a second direction that is opposite the first camera,
        a button disposed on the top,
        one or more microphones,
        a privacy cover configured to transition between (i) a first position in which the first camera is unobstructed and enabled and (ii) a second position in which the first camera is obstructed and disabled, and
        a microwave proximity sensor (MPS) at least partially encircling the first camera, the MPS being configured to sense motion within a field of view of the first camera.

2. The security device of claim 1, wherein the head further includes at least one of:
    one or more visible-light light emitting diodes (LEDs) disposed on the front; or
    one or more infrared LEDs disposed on the front.

3. The security device of claim 1, further comprising:
    a first light indicator disposed on the top and at least partially around the button, the first light indicator being configured to indicate an operational state of the security device; and
    a second light indicator disposed on the front, the second light indicator being configured to indicate an operational state of at least one of the first camera or the one or more microphones.

4. An electronic device, comprising:
    a body;
    a camera housing coupled to the body via a hinge, the camera housing including:
        a first camera having a first lens disposed on a first side of the camera housing, the first camera facing a first direction,
        a second camera having a second lens disposed on a second side of the camera housing, the second camera facing a second direction that is different than the first direction,
        a privacy cover coupled to the camera housing;
        a microwave proximity sensor (MPS) disposed beneath the privacy cover and at least partially encircling the first camera,
        an infrared (IR) light emitting diode (LED) disposed beneath the privacy cover and oriented to emit first light,
        the privacy cover transitionable between a first position in which the first camera is unobstructed and a second position in which the first camera is at least partially obstructed,
        a biasing element configured to (i) bias the privacy cover toward the first position when moving the privacy cover from the second position toward the first position and (ii) bias the privacy cover toward the second position when moving the privacy cover from the first position toward the second position, and
        a sensor,
    one or more processors; and
    one or more non-transitory computer-readable media storing computer-executable instructions that, when executed by the one or more processors, cause the one or more processors to perform operations comprising:
        receiving, via the sensor, sensor data indicative of the privacy cover being in the second position, and
        based at least in part on the sensor data, disabling the first camera.

5. The electronic device of claim 4, further comprising:
    a button disposed on the camera housing; and
    a light indicator at least partially encircling the button, the light indicator indicating an operational state of the electronic device.

6. The electronic device of claim 4, wherein the privacy cover is rotatable between the first position and the second position.

7. The electronic device of claim 4, wherein the camera housing comprises a cavity and the privacy cover is rotatable between the first position in which the privacy cover is received at least partially within the cavity and the second position in which the privacy cover covers the first lens of the first camera.

8. The electronic device of claim 4, further comprising one or more microphones, the operations further comprising based at least in part on the sensor data, disabling the one or more microphones.

9. The electronic device of claim 4, wherein:
the privacy cover includes a magnet; and
the sensor is a Hall-effect sensor.

10. The electronic device of claim 4, further comprising:
an antenna; and
a speaker.

11. The electronic device of claim 4, wherein:
the body further includes a first surface disposed on a first side of the body, the first surface having one or more grooves; and
an adhesive is disposed on a second side of the body, the second side of the body being opposite the first side of the body.

12. The electronic device of claim 4, wherein:
the body includes a first end and a second end opposite the first end;
a first portion of the body proximate the first end has a first thickness; and
a second portion of the body proximate the second end has a second thickness, the second thickness being greater than the first thickness.

13. The electronic device of claim 4, further comprising a microwave proximity sensor (MPS).

14. The electronic device of claim 13, further comprising a cover coupled to the camera housing, wherein the MPS is located behind the cover.

15. The electronic device of claim 4, further comprising a supercapacitor.

16. The electronic device of claim 4, further comprising a sub-Ghz wireless radio.

17. The electronic device of claim 4, wherein:
the body includes a curved surface that is sized, shaped, and dimensioned to be wedged between a windshield and a dashboard; and
the body includes a portion protruding outward from the body that includes adhesive on a surface thereof.

18. The electronic device of claim 17, wherein:
the body includes a first end and a second end opposite the first end;
the body includes a plurality of grooves disposed on a side of the body; and
the body is shaped such that, when the side of the body is oriented facing downwards, the portion of the body curves generally downwards moving from the second end of the body to the first end of the body.

19. The electronic device of claim 4, further comprising a transmitter, a receiver, and a wireless interface, the operations further comprising:
transmitting, using the transmitter, a first signal;
receiving, using the receiver, a second signal representing a reflection of the first signal;
generating sample data representing the second signal;
determining, based on comparing the sample data to data corresponding to the first signal, frequency shift information for the second signal;
determining, based on the frequency shift information for the second signal, that motion has been detected; and
sending, based on determining that motion has been detected and using the wireless interface, a notification that motion has been detected.

20. The electronic device of claim 4, further comprising a wireless interface and a microphone, the operations further comprising:
generating, using the microphone, audio data representing audio;
determining, based on the audio data, that the audio corresponds to a wakeword; and
based on determining that the audio corresponds to a wakeword, powering on one or more components of the electronic device.

21. The electronic device of claim 4, further comprising a wireless interface and a microphone, the operations further comprising:
generating, using the microphone, audio data representing audio;
determining, based on the audio data, that the audio corresponds to a wakeword; and
based on determining that the audio corresponds to a wakeword, sending, using the wireless interface, the audio data to a remote computing system.

22. The electronic device of claim 4, further comprising a wireless interface and a microphone, the operations further comprising:
generating, using the microphone, audio data representing audio;
determining, based on the audio data, that the audio corresponds to a wakeword; and
based on determining that the audio corresponds to a wakeword, generating, using the first camera and the second camera, image data.

23. The electronic device of claim 4, further comprising a wireless interface and a microphone, the operations further comprising:
generating, using the microphone, audio data representing audio; and
based on the audio data, generating, using the first camera and the second camera, image data.

24. A device, comprising:
a first housing;
a second housing pivotably coupled to the first housing, the second housing including:
a first camera having a first lens disposed on a first side of the second housing, the first camera having a first field of view (FoV) that is adjustable via pivoting the second housing,
a second camera having a second lens disposed on a second side of the second housing, the second camera having a second FoV that is adjustable via pivoting the second housing, the second FoV being different than the first FoV,
a privacy cover coupled to the second housing, the privacy cover being rotatable between:
a first position in which the privacy cover covers the first lens, and
a second position in which the privacy cover does not cover the first lens; and a receptacle, the privacy cover being at least partially disposed in the receptacle in the second position;
a cover coupled to the second housing;
at least one of: a microwave proximity sensor (MPS) disposed beneath the cover and at least partially encircling the first camera, one or more first light emitting diodes (LEDs) disposed beneath the cover and oriented to emit first light, or one or more second LEDs disposed beneath the cover and oriented to emit second light;
one or more microphones;
one or more processors; and
one or more non-transitory computer-readable media storing computer-executable instructions that, when executed by the one or more processors, cause the device to perform acts comprising:
receiving data associated with the privacy cover being in the first position, and
based at least in part on the data, causing the one or more microphones to be disabled.

25. The device of claim 24, wherein:
the second housing includes a front, a back opposite the front, and a top;
the first camera is disposed on the front;
the second camera is disposed on the back; and
a button is disposed on the top.

26. The device of claim 24, further comprising a sensor wherein the data is received via the sensor.

27. The device of claim 24, further comprising one or more connections communicatively coupling first computing components within the first housing to second computing components within the second housing, the one or more connections being routed at least partially through a hinged connection between the second housing and the first housing.

28. The device of claim 24, wherein:
the first housing includes:
a first end and a second end opposite the first end,
an LTE antenna located closer to the first end than the second end, and
a loudspeaker located closer to the second end than the first end; and
the second housing pivotably couples to the first housing at the second end.

29. The device of claim 24, further comprising:
one or more network interfaces disposed within the first housing; and
at least one of a supercapacitor or a battery disposed within the first housing.

30. The device of claim 24, further comprising an adhesive disposed on the first housing.

31. The device of claim 24, the acts further comprising:
receiving second data associated with the privacy cover being in the second position, and
based at least in part on the second data, permitting the one or more microphones to be enabled.

32. The device of claim 24, further comprising based at least in part on the data, causing at least one of the first camera or the second camera to be disabled.

33. The device of claim 24, further comprising a gasket disposed on the privacy cover and configured to engage the first lens in the first position.

* * * * *